(12) United States Patent
O'Hare et al.

(10) Patent No.: US 9,177,159 B2
(45) Date of Patent: Nov. 3, 2015

(54) SECURE DATA PARSER METHOD AND SYSTEM

(71) Applicant: Security First Corp., Rancho Santa Margarita, CA (US)

(72) Inventors: Mark S. O'Hare, Coto De Caza, CA (US); Rick L. Orsini, Flower Mound, TX (US); Roger S. Davenport, Campbell, TX (US); Steven Winick, Roslyn Heights, NY (US)

(73) Assignee: Security First Corp., Rancho Santa Margarita, CA (US)

( * ) Notice: Subject to any disclaimer, the term of this patent is extended or adjusted under 35 U.S.C. 154(b) by 0 days.

(21) Appl. No.: 13/915,518

(22) Filed: Jun. 11, 2013

(65) Prior Publication Data

US 2013/0275768 A1    Oct. 17, 2013

Related U.S. Application Data

(63) Continuation of application No. 13/371,363, filed on Feb. 10, 2012, which is a continuation of application No. 11/258,839, filed on Oct. 25, 2005, now Pat. No. 8,266,438.

(60) Provisional application No. 60/718,185, filed on Sep. 16, 2005, provisional application No. 60/622,146, filed on Oct. 25, 2004.

(51) Int. Cl.
*G06F 7/04* (2006.01)
*G06F 21/60* (2013.01)
(Continued)

(52) U.S. Cl.
CPC ............ *G06F 21/602* (2013.01); *G06F 21/606* (2013.01); *G06F 21/62* (2013.01);
(Continued)

(58) Field of Classification Search
CPC .......................... H04L 67/108; G06F 11/1092
USPC ........................................................ 726/30
See application file for complete search history.

(56) References Cited

U.S. PATENT DOCUMENTS 5,239,659 A   8/1993  Rudeseal et al.
6,009,173 A * 12/1999  Sumner ......................... 713/156
(Continued)

FOREIGN PATENT DOCUMENTS

EP   2309700 A1   4/2011
JP   2004-185573  7/2004
(Continued)

OTHER PUBLICATIONS

Xu et al.; Highly Available Distributed Storage System; 1999; Retrieved from the Internet <URL: http://download.springer.com/static/pdf/199/chp%253A10.1007%252FBFb0110096.pdf?auth66=1417657046_2193c7eca3e4f4a36e70e367d12cfe85&ext=.pdf>; pp. 1-24 as printed.*

(Continued)

*Primary Examiner* — Michael Chao
(74) *Attorney, Agent, or Firm* — Ropes & Gray LLP

(57) ABSTRACT

A secure data parser is provided that may be integrated into any suitable system for securely storing and communicating data. The secure data parser parses data and then splits the data into multiple portions that are stored or communicated distinctly. Encryption of the original data, the portions of data, or both may be employed for additional security. The secure data parser may be used to protect data in motion by splitting original data into portions of data, that may be communicated using multiple communications paths.

24 Claims, 36 Drawing Sheets

(51) Int. Cl.
*G06F 21/62* (2013.01)
*H04L 9/08* (2006.01)
*H04L 9/32* (2006.01)
*H04L 29/06* (2006.01)
*H04L 29/08* (2006.01)
*G06F 11/10* (2006.01)

(52) U.S. Cl.
CPC ............ *H04L 9/085* (2013.01); *H04L 9/3226* (2013.01); *H04L 9/3263* (2013.01); *H04L 63/04* (2013.01); *H04L 63/08* (2013.01); *H04L 63/0876* (2013.01); *H04L 69/14* (2013.01); *G06F 11/1092* (2013.01); *H04L 67/108* (2013.01); *H04L 2209/80* (2013.01)

(56) References Cited

U.S. PATENT DOCUMENTS

| | | |
|---|---|---|
| 6,058,188 A | 5/2000 | Chandersekaran et al. |
| 6,078,888 A | 6/2000 | Johnson, Jr. |
| 6,182,214 B1 | 1/2001 | Hardjono |
| 6,381,331 B1* | 4/2002 | Kato ........................... 380/37 |
| 6,473,860 B1 | 10/2002 | Chan |
| 6,519,262 B1 | 2/2003 | Stephens et al. |
| 6,557,123 B1 | 4/2003 | Wiencko, Jr. et al. |
| 6,662,299 B1 | 12/2003 | Price, III |
| 6,701,303 B1 | 3/2004 | Dunn et al. |
| 6,807,649 B1 | 10/2004 | Murthy |
| 6,853,988 B1 | 2/2005 | Dickinson et al. |
| 7,035,405 B1 | 4/2006 | Schwenk |
| 7,039,189 B1 | 5/2006 | Kienzle et al. |
| 7,076,651 B2 | 7/2006 | Droge |
| 7,171,685 B2 | 1/2007 | Batra et al. |
| 7,206,250 B2 | 4/2007 | Groux |
| 7,213,158 B2 | 5/2007 | Bantz et al. |
| 7,234,063 B1 | 6/2007 | Baugher et al. |
| 7,260,724 B1 | 8/2007 | Dickinson et al. |
| 7,260,727 B2 | 8/2007 | Fougeroux et al. |
| 7,346,773 B2 | 3/2008 | Cam-Winget et al. |
| 7,464,152 B2 | 12/2008 | Ishizaki et al. |
| 7,499,905 B2 | 3/2009 | Jaschek et al. |
| 7,548,556 B1 | 6/2009 | Wittenschlaeger |
| 7,549,061 B2 | 6/2009 | Nonaka et al. |
| 7,584,285 B2 | 9/2009 | Hudson et al. |
| 7,596,741 B2 | 9/2009 | LaVigne et al. |
| 7,609,687 B2 | 10/2009 | Kobayashi et al. |
| 7,657,760 B2 | 2/2010 | Teramoto et al. |
| 7,730,543 B1 | 6/2010 | Nath |
| 7,743,261 B2 | 6/2010 | Nonaka et al. |
| 7,934,100 B2 | 4/2011 | Fujimaki |
| 7,940,932 B2 | 5/2011 | Paksoy et al. |
| 7,983,994 B2 | 7/2011 | Hurry |
| 8,041,875 B1 | 10/2011 | Shah et al. |
| 8,060,832 B2 | 11/2011 | Kruempelmann et al. |
| 8,095,800 B2 | 1/2012 | Creary et al. |
| 8,112,622 B2 | 2/2012 | Qi |
| 8,135,980 B2 | 3/2012 | Dodgson et al. |
| 8,189,769 B2 | 5/2012 | Ramasamy et al. |
| 8,190,905 B1 | 5/2012 | Chang et al. |
| 8,205,090 B2 | 6/2012 | Oom Temudo de Castro et al. |
| 8,208,897 B2 | 6/2012 | Kaneko et al. |
| 8,213,387 B2 | 7/2012 | Xia et al. |
| 8,261,084 B2 | 9/2012 | Nonaka et al. |
| 8,341,115 B1 | 12/2012 | Natanzon et al. |
| 8,347,084 B2 | 1/2013 | Tavernier et al. |
| 8,396,895 B2 | 3/2013 | Miloushev et al. |
| 8,397,083 B1 | 3/2013 | Sussland et al. |
| 8,473,757 B2 | 6/2013 | Gladstone et al. |
| 8,578,076 B2 | 11/2013 | van der Linden et al. |
| 8,615,084 B2 | 12/2013 | Schneider |
| 8,635,456 B2 | 1/2014 | Fascenda |
| 8,755,322 B2 | 6/2014 | Miettinen et al. |
| 8,761,401 B2 | 6/2014 | Sprunk et al. |
| 8,959,199 B2 | 2/2015 | Peleg et al. |
| 2002/0075844 A1 | 6/2002 | Hagen |
| 2002/0178240 A1 | 11/2002 | Fiveash et al. |
| 2002/0178355 A1 | 11/2002 | D'Sa et al. |
| 2003/0055905 A1 | 3/2003 | Nishiyama et al. |
| 2003/0084397 A1* | 5/2003 | Peleg ........................... 714/770 |
| 2003/0126434 A1 | 7/2003 | Lim et al. |
| 2003/0188153 A1 | 10/2003 | Demoff et al. |
| 2003/0236943 A1 | 12/2003 | Delaney |
| 2004/0078542 A1* | 4/2004 | Fuller et al. ................... 711/172 |
| 2004/0193878 A1 | 9/2004 | Dillinger et al. |
| 2004/0268148 A1 | 12/2004 | Karjala et al. |
| 2005/0210243 A1 | 9/2005 | Archard et al. |
| 2005/0289218 A1 | 12/2005 | Rothman et al. |
| 2006/0075222 A1 | 4/2006 | Moloney et al. |
| 2006/0075225 A1 | 4/2006 | Flynn et al. |
| 2006/0090200 A1 | 4/2006 | Oie |
| 2007/0033644 A1 | 2/2007 | Thomas et al. |
| 2007/0064704 A1 | 3/2007 | Balay et al. |
| 2007/0071234 A1 | 3/2007 | Lagrange et al. |
| 2007/0122111 A1 | 5/2007 | Yamamoto et al. |
| 2007/0124584 A1 | 5/2007 | Gupta |
| 2007/0162744 A1 | 7/2007 | Hoshino et al. |
| 2008/0037557 A1 | 2/2008 | Fujita et al. |
| 2008/0270603 A1 | 10/2008 | Berger et al. |
| 2008/0297326 A1 | 12/2008 | Chakraborty et al. |
| 2009/0304004 A1 | 12/2009 | Huynh Van et al. |
| 2009/0316892 A1 | 12/2009 | Candelore |
| 2010/0046750 A1 | 2/2010 | Asfour |
| 2010/0054474 A1 | 3/2010 | Schneider |
| 2010/0077252 A1 | 3/2010 | Siewert et al. |
| 2010/0153686 A1 | 6/2010 | Frank |
| 2010/0191958 A1 | 7/2010 | Chen |
| 2010/0268966 A1 | 10/2010 | Leggette et al. |
| 2010/0293380 A1 | 11/2010 | Wiseman et al. |
| 2010/0306578 A1 | 12/2010 | Thornton et al. |
| 2011/0085667 A1 | 4/2011 | Berrios et al. |
| 2011/0135094 A1 | 6/2011 | Muto et al. |

FOREIGN PATENT DOCUMENTS

| | | |
|---|---|---|
| JP | 2005/244379 | 9/2005 |
| JP | 2005-267520 | 9/2005 |
| JP | 2007-334836 | 12/2007 |
| JP | 2008-103936 | 5/2008 |
| JP | 2008-250931 | 10/2008 |
| WO | WO-99/65207 | 12/1999 |
| WO | WO-2001-54370 | 7/2001 |
| WO | WO-2004001561 A2 | 12/2003 |

OTHER PUBLICATIONS

Kim et al.; Secure Group Key Management for Storage Area Networks; 2003; Retrieved from the Internet <URL: ieeexplore.ieee.org/xpls/abs_all.jsp?arnumber=1222723&tag=1; pp. 1-8 as printed.*
Kubiatowicz et al.; OceanStore: An Architecture for Global-Scale Persistent Storage; Retrieved from the Internet <URL: http://dl.acm.org/citation.cfm?id=357007>; pp. 1-12 as printed.*
Bendix; RAID and Informix Databases; 1995; Retrieved from the Internet <URL: informix.com.ua/articles/raid/raid.htm>; pp. 1-15 as printed.*
Xu, "Locality Driven Key Management Architecture for Mobile Ad-hoc Networks," 2004 IEEE International Conference on Mobile Ad-hoc and Sensor Systems, pp. 436-446.
Nacht, "The Spectrum of Modern Firewalls," Computers & Security, 16 (1997), pp. 54-56.
Shaw et al (eds.), Handbook on Electronic Commerce, Conway, Chapter 31, Springer-Verlag, Berlin Heidelbert, pp. 649-690 (2000).
Mondal, "Mobile IP," Chapter 7, Fluwer Academic/Plenum Publishers, New York, pp. 173-202 (2003).
Rosen, "BGP/MPLS VPNs," Network Working Group, RFC 2547, Mar. 1999, 25 pages.
Xu et al., "Highly Available Distributed Storage Systems," Retrieved from the Internet <URL: link.springer.com/chapter/10.1007%2FBFb0110096?LI=true>; pp. 1-24 as printed (1999).
Wells; The OceanStore Archive: Goals, Structures, and Self-Repair; 2001; Retrieved from the Internet <URL: oceanstore.org/publications/papers/pdf/>; pp. 1-20 as printed.

(56) References Cited

OTHER PUBLICATIONS

Wylie et al.; Selecting the right data distribution scheme for a survivable storage system; 2001; Retrieved from the Internet <URL: repository.cmu./edu/compsci/2164/?utm_source=repository.cmu.edu%2Fcompsci%2F2164&utm_medium=PDF&utm_campaign=PDFCoverPages.; pp. 1-25 as printed.

Buckhard et al., MSP Disk Array Storage System Reliability; 1993; Retrieved from the Internet <URL:ieexplore.ieee.org/xpls/abs_all.jsp?arnumber=627346&tag=1>; pp. 1-26 as printed.

Tewari et al.; High Availability in Clustered Multimedia Servers; 1996; Retrieved from the Internet <URL:ieeexplore.ieee.org/xpls/abs_all.jsp?arnumber=492215>; pp. 1-10 as printed.

Plank, James A., "A Tutorial on Reed-solomon Coding for Fault-Tolerance in RAID-like systems," Retrieved from the Internet <URL: citeseerx.ist.psu.edu/viewdoc/download?doi=10.1.1.160.4742&rep=rep1&type=pdf>; pp. 1-18 as printed (1997).

D'Arco et al.: "Fault Tolerant and distributed Broadcast Encryption"; 2003: Retrieved from the Internet<Url:link.springer.comichapter/10.100713-540-36563-x18#p.-1>; pp. 1-18 as printed.

Schwartz, Richard; "Using field encryption in applications"; 2001; Retrieved from the Internet<Url:ibm.com/developerworks/lotus/library/ls-filed_encryption/>; pp. 1-16 as printed.

Goodson et al."Efficient consistency for erasure-coded data via versioning servers"; Retrieved from the Internet<Url:oai.dtic.mil/oai/oai?verb=getRecord&metadataPrefix=html&identifier=ADA461126> pgs. 1-25 (2003).

Long et al., "A Distributed Raid System", Retrieved from the Internet<URL:http://citeseerx.ist.psu.edu/viewdoc/summary?doi=10.1.1.53.7183>pgs. 1-20 (1994).

* cited by examiner

| Enrollment Data Flow | | | | |
|---|---|---|---|---|
| Send | Receive | SSL | Action | |
| User | Transaction Engine (TE) | 1/2 | Transmit Enrollment Authentication Data (B) and the User ID (UID) encrypted with the Public Key of the Authentication Engine (AE) as (PUB_AE(UID,B)) | 905 |
| TE | AE | Full | Forward Transmission | 915 |
| | | | AE Decrypts and Splits Forwarded Data | 920 |
| AE | The Xth Depository (DX) | Full | Store Respective Portion of Data | 925 |
| When Digital Certificate Requested | | | | |
| AE | Cryptographic Engine (CE) | Full | Request Key Generation | 930 |
| | | | CE Generates and Splits Key | 935 |
| CE | TE | Full | Transmit Request for Digital Certificate | 945 |
| TE | Certification Authority (CA) | 1/2 | Transmit Request | 950 |
| CA | TE | 1/2 | Transmit Digital Certificate | 955 |
| TE | User | 1/2 | Transmit Digital Certificate | 960 |
| TE | MS | Full | Store Digital Certificate | |
| CE | DX | Full | Store Respective Portion of Key | 965 |

FIG. 9, Panel A

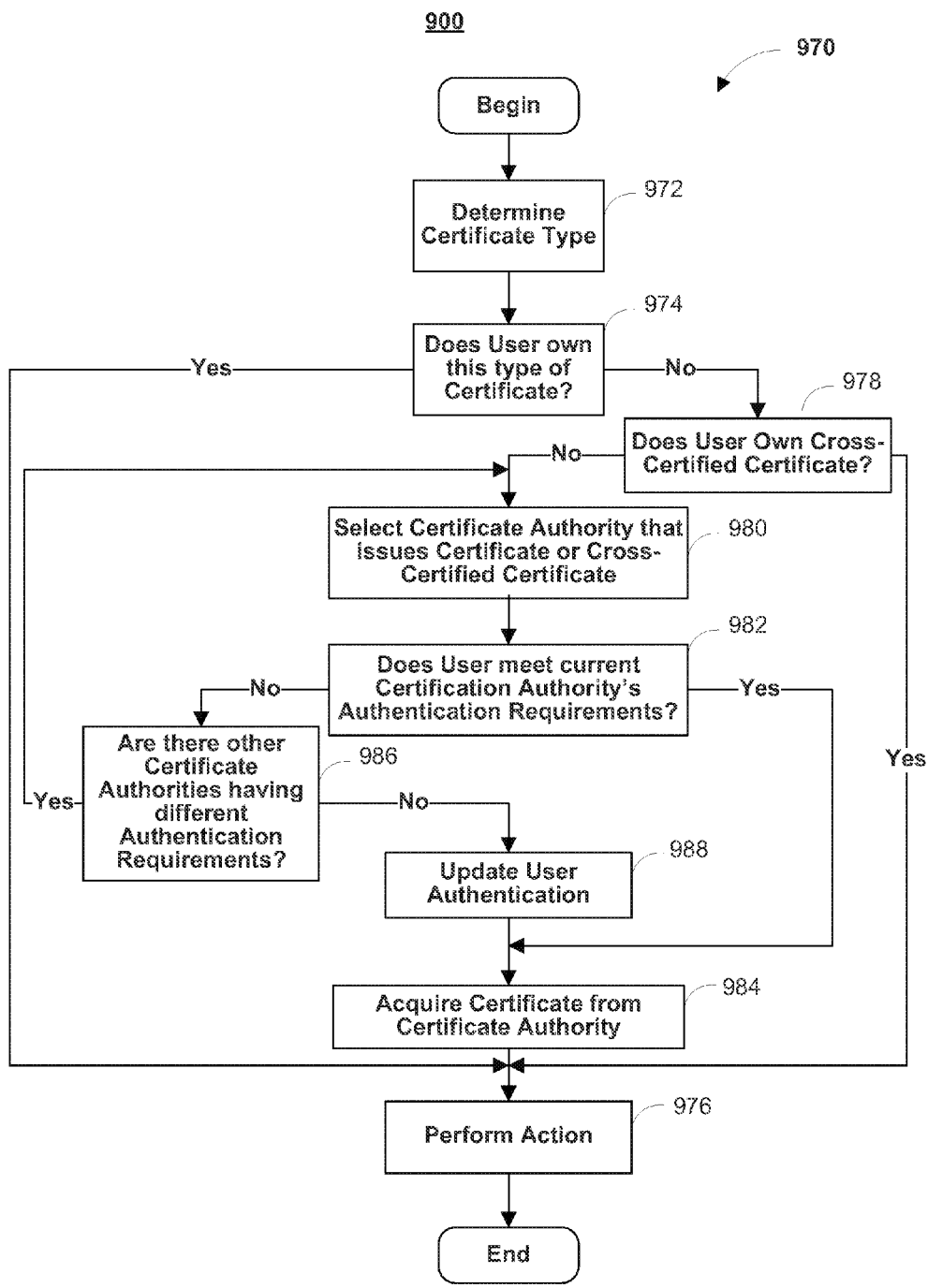
FIG. 9, Panel B

| Authentication Data Flow ||||
|---|---|---|---|
| SEND | RECEIVE | SSL | ACTION |
| 1005 User | Vendor | 1/2 | Transaction occurs, such as selecting purchase |
| 1010 Vendor | User | 1/2 | Transmit transaction ID (TID) and authentication request (AR) |
| | | | Authentication data (B') is gathered from User |
| 1015 User | TE | 1/2 | Transmit TID and B' wrapped in the Public Key of the Authentication Engine (AE), as (PUB_AE(TID, B')) |
| 1020 TE | AE | Full | Forward transmission |
| | | | Enrollment authentication data (B) is requested and gathered |
| 1025 Vendor | Transaction Engine (TE) | Full | Transmits TID, AR |
| 1030 TE | Mass Storage (MS) | Full | Create Record in database |
| 1035 TE | The Xth Depository (DX) | Full | UID, TID |
| 1040 DX | AE | Full | Transmit the TID and the portion of the authentication data stored at enrollment (BX) as (PUB_AE(TID, BX)) |
| 1045 | | | AE assembles B and compares to B' |
| 1050 AE | TE | Full | TID, the filled in AR |
| 1055 TE | Vendor | Full | TID, Yes/No |
| TE | User | 1/2 | TID, confirmation message |

FIG. 10

| Signing Data Flow ||||
|---|---|---|---|
| SEND | RECEIVE | SSL | ACTION |
| User | Vendor | 1/2 | Transaction occurs, such as agreeing on a deal |
| Vendor | User | 1/2 | Transmit transaction identification number (TID), authentication request (AR), and agreement or message (M) |
| | | | Current authentication data (B') and a hash of the message received by the User (h(M')) is is gathered from User |
| User | TE | 1/2 | Transmit TID, B', AR, and h(M') wrapped in the Public Key of the Authentication Engine (AE), as (PUB_AE(TID, B', h(M')) |
| TE | AE | Full | Forward transmission |
| | | | Gather enrollment authentication data |
| Vendor | Transaction Engine (TE) | Full | Transmits UID, TID, AR, and a hash of the message (h(M')). |
| TE | Mass Storage (MS) | Full | Create Record in database |
| TE | The Xth Depository (DX) | Full | UID, TID |
| DX | AE | Full | Transmit the TID and the portion of the authentication data stored at Enrollment (BX), as (PUB_AE(TID, BX)) |
| | | | The original vendor message is transmitted to the AE |
| TE | AE | Full | Transmit h(M) |
| | | | AE assembles B, compares to B' and compares h(M) to h(M') |
| AE | Cryptographic Engine (CE) | Full | Request for digital signature and a message to be signed, for example, the hashed message |
| AE | DX | Full | TID, signing UID |
| DX | CE | Full | Transmit the portion of the Cryptographic Key corresponding to the signing party |
| | | | CE assembles key and signs |
| CE | AE | Full | Transmit the digital signature (S) of signing party |
| AE | TE | Full | TID, the filled in AR, h(M), and S |
| TE | Vendor | Full | TID, a receipt=(TID, Yes/No, and S), and the digital signature of the trust engine, for example, a hash of the receipt encrypted with the trust engine's Private Key (Priv_TE(h(receipt))) |
| TE | User | 1/2 | TID, confirmation message |

FIG. 11

| Encryption/Decryption Data Flow ||||
|---|---|---|---|
| Send | Receive | SSL | Action |
| Decryption ||||
| | | | Perform Authentication Data Process 1000, include the Session Key (sync) in the AR, where the sync has been encrypted with the Public Key of the User as PUB_USER(SYNC) |
| | | | Authenticate the User |
| AE | CE | Full | Forward PUB_USER(SYNC) to CE |
| AE | DX | Full | UID, TID |
| DX | CE | Full | Transmit the TID and the portion of the Private Key as (PUB_AE(TID, KEY_USER)) |
| | | | CE assembles the Cryptographic Key and decrypts the sync |
| CE | AE | Full | TID, the filled in AR including decrypted sync |
| AE | TE | Full | Forward to TE |
| TE | Requesting APP/Vendor | 1/2 | TID, Yes/No, Sync |
| Encryption ||||
| Requesting APP/Vendor | TE | 1/2 | Request for Public Key of User |
| TE | MS | Full | Request Digital Certificate |
| MS | TE | Full | Transmit Digital Certificate |
| TE | Requesting APP/Vendor | 1/2 | Transmit Digital Certificate |

SECURE DATA PARSER METHOD AND SYSTEM

CROSS-REFERENCE TO RELATED APPLICATIONS

This is a continuation application of U.S. patent application Ser. No. 13/371,363, filed Feb. 10, 2012, which is a continuation of U.S. patent application Ser. No. 11/258,839, filed Oct. 25, 2005, now U.S. Pat. No. 8,266,438, which claims the benefit of U.S. provisional application No. 60/622,146, filed on Oct. 25, 2004, and U.S. provisional application No. 60/718,185, filed Sep. 16, 2005, all of which are hereby incorporated by reference herein in their entireties.

FIELD OF THE INVENTION

The present invention relates in general to a system for securing data from unauthorized access or use.

BACKGROUND OF THE INVENTION

In today's society, individuals and businesses conduct an ever-increasing amount of activities on and over computer systems. These computer systems, including proprietary and non-proprietary computer networks, are often storing, archiving, and transmitting all types of sensitive information. Thus, an ever-increasing need exists for ensuring data stored and transmitted over these systems cannot be read or otherwise compromised.

One common solution for securing computer systems is to provide login and password functionality. However, password management has proven to be quite costly with a large percentage of help desk calls relating to password issues. Moreover, passwords provide little security in that they are generally stored in a file susceptible to inappropriate access, through, for example, brute-force attacks.

Another solution for securing computer systems is to provide cryptographic infrastructures. Cryptography, in general, refers to protecting data by transforming, or encrypting, it into an unreadable format. Only those who possess the key(s) to the encryption can decrypt the data into a useable format. Cryptography is used to identify users, e.g., authentication, to allow access privileges, e.g., authorization, to create digital certificates and signatures, and the like. One popular cryptography system is a public key system that uses two keys, a public key known to everyone and a private key known only to the individual or business owner thereof. Generally, the data encrypted with one key is decrypted with the other and neither key is recreatable from the other.

Unfortunately, even the foregoing typical public-key cryptographic systems are still highly reliant on the user for security. For example, cryptographic systems issue the private key to the user, for example, through the user's browser. Unsophisticated users then generally store the private key on a hard drive accessible to others through an open computer system, such as, for example, the Internet. On the other hand, users may choose poor names for files containing their private key, such as, for example, "key." The result of the foregoing and other acts is to allow the key or keys to be susceptible to compromise.

In addition to the foregoing compromises, a user may save his or her private key on a computer system configured with an archiving or backup system, potentially resulting in copies of the private key traveling through multiple computer storage devices or other systems. This security breach is often referred to as "key migration." Similar to key migration, many applications provide access to a user's private key through, at most, simple login and password access. As mentioned in the foregoing, login and password access often does not provide adequate security.

One solution for increasing the security of the foregoing cryptographic systems is to include biometrics as part of the authentication or authorization. Biometrics generally include measurable physical characteristics, such as, for example, finger prints or speech that can be checked by an automated system, such as, for example, pattern matching or recognition of finger print patterns or speech patterns. In such systems, a user's biometric and/or keys may be stored on mobile computing devices, such as, for example, a smartcard, laptop, personal digital assistant, or mobile phone, thereby allowing the biometric or keys to be usable in a mobile environment.

The foregoing mobile biometric cryptographic system still suffers from a variety of drawbacks. For example, the mobile user may lose or break the smartcard or portable computing device, thereby having his or her access to potentially important data entirely cut-off. Alternatively, a malicious person may steal the mobile user's smartcard or portable computing device and use it to effectively steal the mobile user's digital credentials. On the other hand, the portable-computing device may be connected to an open system, such as the Internet, and, like passwords, the file where the biometric is stored may be susceptible to compromise through user inattentiveness to security or malicious intruders.

SUMMARY OF THE INVENTION

Based on the foregoing, a need exists to provide a cryptographic system whose security is user-independent while still supporting mobile users.

Accordingly, one aspect of the present invention is to provide a method for securing virtually any type of data from unauthorized access or use. The method comprises one or more steps of parsing, splitting and/or separating the data to be secured into two or more parts or portions. The method also comprises encrypting the data to be secured. Encryption of the data may be performed prior to or after the first parsing, splitting and/or separating of the data. In addition, the encrypting step may be repeated for one or more portions of the data. Similarly, the parsing, splitting and/or separating steps may be repeated for one or more portions of the data. The method also optionally comprises storing the parsed, split and/or separated data that has been encrypted in one location or in multiple locations. This method also optionally comprises reconstituting or re-assembling the secured data into its original form for authorized access or use. This method may be incorporated into the operations of any computer, server, engine or the like, that is capable of executing the desired steps of the method.

Another aspect of the present invention provides a system for securing virtually any type of data from unauthorized access or use. This system comprises a data splitting module, a cryptographic handling module, and, optionally, a data assembly module. The system may, in one embodiment, further comprise one or more data storage facilities where secure data may be stored.

Accordingly, one aspect of the invention is to provide a secure server, or trust engine, having server-centric keys, or in other words, storing cryptographic keys and user authentication data on a server. According to this embodiment, a user accesses the trust engine in order to perform authentication and cryptographic functions, such as, but not limited to, for example, authentication, authorization, digital signing and generation, storage, and retrieval of certificates, encryption, notary-like and power-of-attorney-like actions, and the like.

Another aspect of the invention is to provide a reliable, or trusted, authentication process. Moreover, subsequent to a trustworthy positive authentication, a wide number of differing actions may be taken, from providing cryptographic technology, to system or device authorization and access, to permitting use or control of one or a wide number of electronic devices.

Another aspect of the invention is to provide cryptographic keys and authentication data in an environment where they are not lost, stolen, or compromised, thereby advantageously avoiding a need to continually reissue and manage new keys and authentication data. According to another aspect of the invention, the trust engine allows a user to use one key pair for multiple activities, vendors, and/or authentication requests. According to yet another aspect of the invention, the trust engine performs at least one step of cryptographic processing, such as, but not limited to, encrypting, authenticating, or signing, on the server side, thereby allowing clients or users to possess only minimal computing resources.

According to yet another aspect of the invention, the trust engine includes one or multiple depositories for storing portions of each cryptographic key and authentication data. The portions are created through a data splitting process that prohibits reconstruction without a predetermined portion from more than one location in one depository or from multiple depositories. According to another embodiment, the multiple depositories may be geographically remote such that a rogue employee or otherwise compromised system at one depository will not provide access to a user's key or authentication data.

According to yet another embodiment, the authentication process advantageously allows the trust engine to process multiple authentication activities in parallel. According to yet another embodiment, the trust engine may advantageously track failed access attempts and thereby limit the number of times malicious intruders may attempt to subvert the system.

According to yet another embodiment, the trust engine may include multiple instantiations where each trust engine may predict and share processing loads with the others. According to yet another embodiment, the trust engine may include a redundancy module for polling a plurality of authentication results to ensure that more than one system authenticates the user.

Therefore, one aspect of the invention includes a secure cryptographic system, which may be remotely accessible, for storing data of any type, including, but not limited to, a plurality of private cryptographic keys to be associated with a plurality of users. The cryptographic system associates each of the plurality of users with one or more different keys from the plurality of private cryptographic keys and performs cryptographic functions for each user using the associated one or more different keys without releasing the plurality of private cryptographic keys to the users. The cryptographic system comprises a depository system having at least one server which stores the data to be secured, such as a plurality of private cryptographic keys and a plurality of enrollment authentication data. Each enrollment authentication data identifies one of multiple users and each of the multiple users is associated with one or more different keys from the plurality of private cryptographic keys. The cryptographic system also may comprise an authentication engine which compares authentication data received by one of the multiple users to enrollment authentication data corresponding to the one of multiple users and received from the depository system, thereby producing an authentication result. The cryptographic system also may comprise a cryptographic engine which, when the authentication result indicates proper identification of the one of the multiple users, performs cryptographic functions on behalf of the one of the multiple users using the associated one or more different keys received from the depository system. The cryptographic system also may comprise a transaction engine connected to route data from the multiple users to the depository server system, the authentication engine, and the cryptographic engine.

Another aspect of the invention includes a secure cryptographic system that is optionally remotely accessible. The cryptographic system comprises a depository system having at least one server which stores at least one private key and any other data, such as, but not limited to, a plurality of enrollment authentication data, wherein each enrollment authentication data identifies one of possibly multiple users. The cryptographic system may also optionally comprise an authentication engine which compares authentication data received by users to enrollment authentication data corresponding to the user and received from the depository system, thereby producing an authentication result. The cryptographic system also comprises a cryptographic engine which, when the authentication result indicates proper identification of the user, performs cryptographic functions on behalf of the user using at least said private key, which may be received from the depository system. The cryptographic system may also optionally comprise a transaction engine connected to route data from the users to other engines or systems such as, but not limited to, the depository server system, the authentication engine, and the cryptographic engine.

Another aspect of the invention includes a method of facilitating cryptographic functions. The method comprises associating a user from multiple users with one or more keys from a plurality of private cryptographic keys stored on a secure location, such as a secure server. The method also comprises receiving authentication data from the user, and comparing the authentication data to authentication data corresponding to the user, thereby verifying the identity of the user. The method also comprises utilizing the one or more keys to perform cryptographic functions without releasing the one or more keys to the user.

Another aspect of the invention includes an authentication system for uniquely identifying a user through secure storage of the user's enrollment authentication data. The authentication system comprises one or more data storage facilities, wherein each data storage facility includes a computer accessible storage medium which stores at least one of portions of enrollment authentication data. The authentication system also comprises an authentication engine which communicates with the data storage facility or facilities. The authentication engine comprises a data splitting module which operates on the enrollment authentication data to create portions, a data assembling module which processes the portions from at least one of the data storage facilities to assemble the enrollment authentication data, and a data comparator module which receives current authentication data from a user and compares the current authentication data with the assembled enrollment authentication data to determine whether the user has been uniquely identified.

Another aspect of the invention includes a cryptographic system. The cryptographic system comprises one or more data storage facilities, wherein each data storage facility includes a computer accessible storage medium which stores at least one portion of one ore more cryptographic keys. The cryptographic system also comprises a cryptographic engine which communicates with the data storage facilities. The cryptographic engine also comprises a data splitting module which operate on the cryptographic keys to create portions, a data assembling module which processes the portions from at least one of the data storage facilities to assemble the cryptographic keys, and a cryptographic handling module which receives the assembled cryptographic keys and performs cryptographic functions therewith.

Another aspect of the invention includes a method of storing any type of data, including, but not limited to, authentication data in geographically remote secure data storage facilities thereby protecting the data against composition of any individual data storage facility. The method comprises receiving data at a trust engine, combining at the trust engine the data with a first substantially random value to form a first combined value, and combining the data with a second substantially random value to form a second combined value. The method comprises creating a first pairing of the first substantially random value with the second combined value, creating a second pairing of the first substantially random value with the second substantially random value, and storing the first pairing in a first secure data storage facility. The method comprises storing the second pairing in a second secure data storage facility remote from the first secure data storage facility.

Another aspect of the invention includes a method of storing any type of data, including, but not limited to, authentication data comprising receiving data, combining the data with a first set of bits to form a second set of bits, and combining the data with a third set of bits to form a fourth set of bits. The method also comprises creating a first pairing of the first set of bits with the third set of bits. The method also comprises creating a second pairing of the first set of bits with the fourth set of bits, and storing one of the first and second pairings in a first computer accessible storage medium. The method also comprises storing the other of the first and second pairings in a second computer accessible storage medium.

Another aspect of the invention includes a method of storing cryptographic data in geographically remote secure data storage facilities thereby protecting the cryptographic data against comprise of any individual data storage facility. The method comprises receiving cryptographic data at a trust engine, combining at the trust engine the cryptographic data with a first substantially random value to form a first combined value, and combining the cryptographic data with a second substantially random value to form a second combined value. The method also comprises creating a first pairing of the first substantially random value with the second combined value, creating a second pairing of the first substantially random value with the second substantially random value, and storing the first pairing in a first secure data storage facility. The method also comprises storing the second pairing in a secure second data storage facility remote from the first secure data storage facility.

Another aspect of the invention includes a method of storing cryptographic data comprising receiving authentication data and combining the cryptographic data with a first set of bits to form a second set of bits. The method also comprises combining the cryptographic data with a third set of bits to form a fourth set of bits, creating a first pairing of the first set of bits with the third set of bits, and creating a second pairing of the first set of bits with the fourth set of bits. The method also comprises storing one of the first and second pairings in a first computer accessible storage medium, and storing the other of the first and second pairings in a second computer accessible storage medium.

Another aspect of the invention includes a method of handling sensitive data of any type or form in a cryptographic system, wherein the sensitive data exists in a useable form only during actions by authorized users, employing the sensitive data. The method also comprises receiving in a software module, substantially randomized or encrypted sensitive data from a first computer accessible storage medium, and receiving in the software module, substantially randomized or encrypted data which may or may not be sensitive data, from one or more other computer accessible storage medium. The method also comprises processing the substantially randomized pre-encrypted sensitive data and the substantially randomized or encrypted data which may or may not be sensitive data, in the software module to assemble the sensitive data and employing the sensitive data in a software engine to perform an action. The action includes, but is not limited to, one of authenticating a user and performing a cryptographic function.

Another aspect of the invention includes a secure authentication system. The secure authentication system comprises a plurality of authentication engines. Each authentication engine receives enrollment authentication data designed to uniquely identify a user to a degree of certainty. Each authentication engine receives current authentication data to compare to the enrollment authentication data, and each authentication engine determines an authentication result. The secure authentication system also comprises a redundancy system which receives the authentication result of at least two of the authentication engines and determines whether the user has been uniquely identified.

Another aspect of the invention includes a secure data in motion system whereby data may be transmitted in different portions that are secured in accordance with the present invention such that any one portion becoming compromised shall not provide sufficient data to restore the original data. This may be applied to any transmission of data, whether it be wired, wireless, or physical.

Another aspect of the invention includes integration of the secure data parser of the present invention into any suitable system where data is stored or communicated. For example, email system, RAID systems, video broadcasting systems, database systems, or any other suitable system may have the secure data parser integrated at any suitable level.

Another aspect of the invention includes using any suitable parsing and splitting algorithm to generate shares of data. Either random, pseudo-random, deterministic, or any combination thereof may be employed for parsing and splitting data.

BRIEF DESCRIPTION OF THE DRAWINGS

The present invention is described in more detail below in connection with the attached drawings, which are meant to illustrate and not to limit the invention, and in which:

FIG. 9, Panel A illustrates a data flow of an enrollment process according to aspects of an embodiment of the invention;

FIG. 9, Panel B illustrates a flow chart of an interoperability process according to aspects of an embodiment of the invention;

FIG. 10 illustrates a data flow of an authentication process according to aspects of an embodiment of the invention;

FIG. 11 illustrates a data flow of a signing process according to aspects of an embodiment of the invention;

FIG. 12 illustrates a data flow and an encryption/decryption process according to aspects and yet another embodiment of the invention;

DETAILED DESCRIPTION OF THE INVENTION

One aspect of the present invention is to provide a cryptographic system where one or more secure servers, or a trust engine, stores cryptographic keys and user authentication data. Users access the functionality of conventional cryptographic systems through network access to the trust engine, however, the trust engine does not release actual keys and other authentication data and therefore, the keys and data remain secure. This server-centric storage of keys and authentication data provides for user-independent security, portability, availability, and straightforwardness.

Because users can be confident in, or trust, the cryptographic system to perform user and document authentication and other cryptographic functions, a wide variety of functionality may be incorporated into the system. For example, the trust engine provider can ensure against agreement repudiation by, for example, authenticating the agreement participants, digitally signing the agreement on behalf of or for the participants, and storing a record of the agreement digitally signed by each participant. In addition, the cryptographic system may monitor agreements and determine to apply varying degrees of authentication, based on, for example, price, user, vendor, geographic location, place of use, or the like.

To facilitate a complete understanding of the invention, the remainder of the detailed description describes the invention with reference to the figures, wherein like elements are referenced with like numerals throughout.

Figure 1:
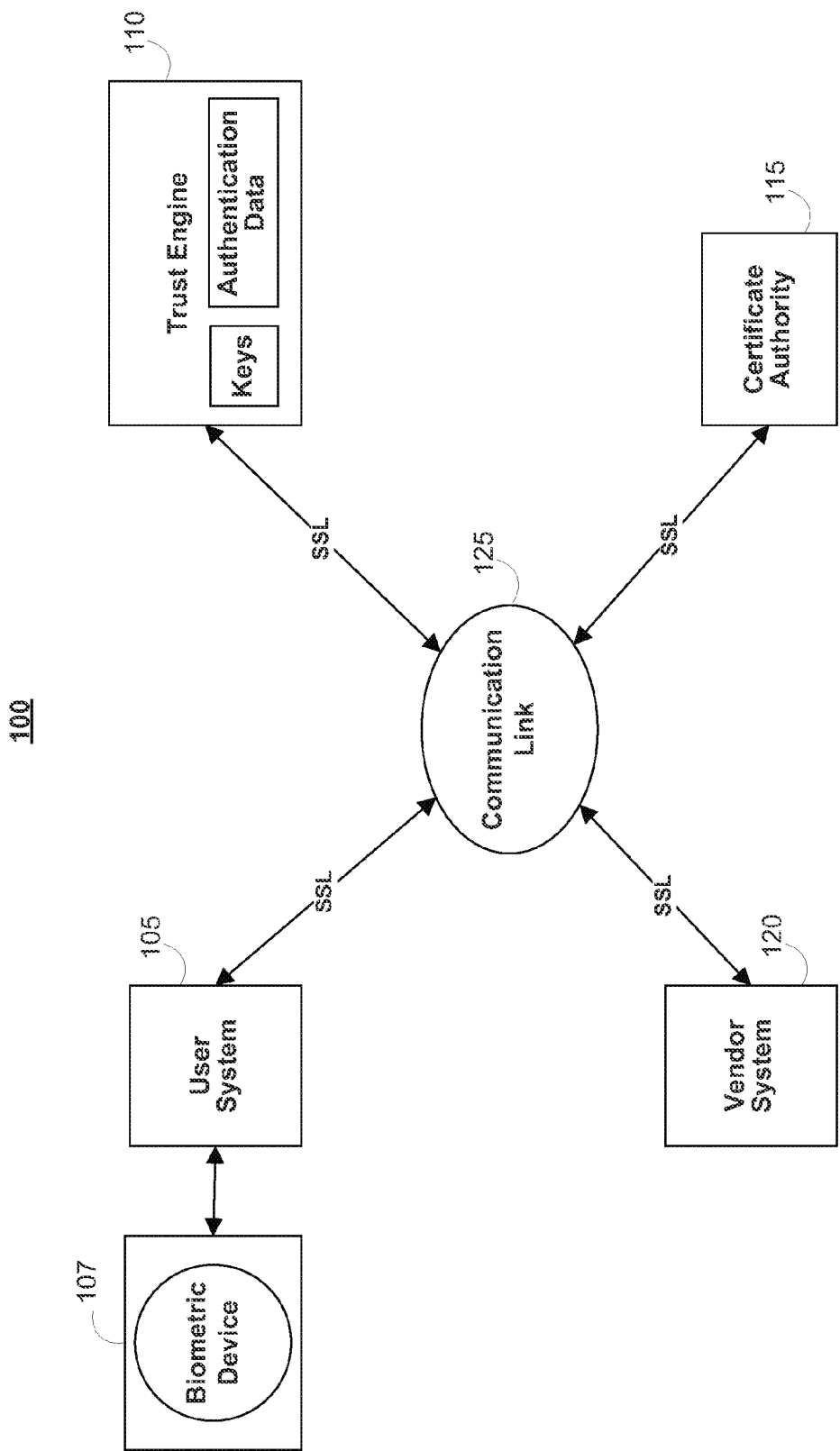
FIG. 1 illustrates a block diagram of a cryptographic system, according to aspects of an embodiment of the invention.

FIG. 1 illustrates a block diagram of a cryptographic system 100, according to aspects of an embodiment of the invention. As shown in FIG. 1, the cryptographic system 100 includes a user system 105, a trust engine 110, a certificate authority 115, and a vendor system 120, communicating through a communication link 125.

According to one embodiment of the invention, the user system 105 comprises a conventional general-purpose computer having one or more microprocessors, such as, for example, an Intel-based processor. Moreover, the user system 105 includes an appropriate operating system, such as, for example, an operating system capable of including graphics or windows, such as Windows, Unix, Linux, or the like. As shown in FIG. 1, the user system 105 may include a biometric device 107. The biometric device 107 may advantageously capture a user's biometric and transfer the captured biometric to the trust engine 110. According to one embodiment of the invention, the biometric device may advantageously comprise a device having attributes and features similar to those disclosed in U.S. patent application Ser. No. 08/926,277, filed on Sep. 5, 1997, entitled "RELIEF OBJECT IMAGE GENERATOR," U.S. patent application Ser. No. 09/558,634, filed on Apr. 26, 2000, entitled "IMAGING DEVICE FOR A RELIEF OBJECT AND SYSTEM AND METHOD OF USING THE IMAGE DEVICE," U.S. patent application Ser. No. 09/435,011, filed on Nov. 5, 1999, entitled "RELIEF OBJECT SENSOR ADAPTOR," and U.S. patent application Ser. No. 09/477,943, filed on Jan. 5, 2000, entitled "PLANAR OPTICAL IMAGE SENSOR AND SYSTEM FOR GENERATING AN ELECTRONIC IMAGE OF A RELIEF OBJECT FOR FINGERPRINT READING," all of which are owned by the instant assignee, and all of which are hereby incorporated by reference herein.

In addition, the user system 105 may connect to the communication link 125 through a conventional service provider, such as, for example, a dial up, digital subscriber line (DSL), cable modem, fiber connection, or the like. According to another embodiment, the user system 105 connects the communication link 125 through network connectivity such as, for example, a local or wide area network. According to one embodiment, the operating system includes a TCP/IP stack that handles all incoming and outgoing message traffic passed over the communication link 125.

Although the user system 105 is disclosed with reference to the foregoing embodiments, the invention is not intended to be limited thereby. Rather, a skilled artisan will recognize from the disclosure herein, a wide number of alternatives embodiments of the user system 105, including almost any computing device capable of sending or receiving information from another computer system. For example, the user system 105 may include, but is not limited to, a computer workstation, an interactive television, an interactive kiosk, a personal mobile computing device, such as a digital assistant, mobile phone, laptop, or the like, a wireless communications device, a smartcard, an embedded computing device, or the like, which can interact with the communication link 125. In such alternative systems, the operating systems will likely differ and be adapted for the particular device. However, according to one embodiment, the operating systems advantageously continue to provide the appropriate communications protocols needed to establish communication with the communication link 125.

FIG. 1 illustrates the trust engine 110. According to one embodiment, the trust engine 110 comprises one or more secure servers for accessing and storing sensitive information, which may be any type or form of data, such as, but not limited to text, audio, video, user authentication data and public and private cryptographic keys. According to one embodiment, the authentication data includes data designed to uniquely identify a user of the cryptographic system 100. For example, the authentication data may include a user identification number, one or more biometrics, and a series of questions and answers generated by the trust engine 110 or the user, but answered initially by the user at enrollment. The foregoing questions may include demographic data, such as place of birth, address, anniversary, or the like, personal data, such as mother's maiden name, favorite ice cream, or the like, or other data designed to uniquely identify the user. The trust engine 110 compares a user's authentication data associated with a current transaction, to the authentication data provided at an earlier time, such as, for example, during enrollment. The trust engine 110 may advantageously require the user to produce the authentication data at the time of each transaction, or, the trust engine 110 may advantageously allow the user to periodically produce authentication data, such as at the beginning of a string of transactions or the logging onto a particular vendor website.

According to the embodiment where the user produces biometric data, the user provides a physical characteristic, such as, but not limited to, facial scan, hand scan, ear scan, iris scan, retinal scan, vascular pattern, DNA, a fingerprint, writing or speech, to the biometric device 107. The biometric device advantageously produces an electronic pattern, or biometric, of the physical characteristic. The electronic pattern is transferred through the user system 105 to the trust engine 110 for either enrollment or authentication purposes.

Once the user produces the appropriate authentication data and the trust engine 110 determines a positive match between that authentication data (current authentication data) and the authentication data provided at the time of enrollment (enrollment authentication data), the trust engine 110 provides the user with complete cryptographic functionality. For example, the properly authenticated user may advantageously employ the trust engine 110 to perform hashing, digitally signing, encrypting and decrypting (often together referred to only as encrypting), creating or distributing digital certificates, and the like. However, the private cryptographic keys used in the cryptographic functions will not be available outside the trust engine 110, thereby ensuring the integrity of the cryptographic keys.

According to one embodiment, the trust engine 110 generates and stores cryptographic keys. According to another embodiment, at least one cryptographic key is associated with each user. Moreover, when the cryptographic keys include public-key technology, each private key associated with a user is generated within, and not released from, the trust engine 110. Thus, so long as the user has access to the trust engine 110, the user may perform cryptographic functions using his or her private or public key. Such remote access advantageously allows users to remain completely mobile and access cryptographic functionality through practically any Internet connection, such as cellular and satellite phones, kiosks, laptops, hotel rooms and the like.

According to another embodiment, the trust engine 110 performs the cryptographic functionality using a key pair generated for the trust engine 110. According to this embodiment, the trust engine 110 first authenticates the user, and after the user has properly produced authentication data matching the enrollment authentication data, the trust engine 110 uses its own cryptographic key pair to perform cryptographic functions on behalf of the authenticated user.

A skilled artisan will recognize from the disclosure herein that the cryptographic keys may advantageously include some or all of symmetric keys, public keys, and private keys. In addition, a skilled artisan will recognize from the disclosure herein that the foregoing keys may be implemented with a wide number of algorithms available from commercial technologies, such as, for example, RSA, ELGAMAL, or the like.

FIG. 1 also illustrates the certificate authority 115. According to one embodiment, the certificate authority 115 may advantageously comprise a trusted third-party organization or company that issues digital certificates, such as, for example, VeriSign, Baltimore, Entrust, or the like. The trust engine 110 may advantageously transmit requests for digital certificates, through one or more conventional digital certificate protocols, such as, for example, PKCS10, to the certificate authority 115. In response, the certificate authority 115 will issue a digital certificate in one or more of a number of differing protocols, such as, for example, PKCS7. According to one embodiment of the invention, the trust engine 110 requests digital certificates from several or all of the prominent certificate authorities 115 such that the trust engine 110 has access to a digital certificate corresponding to the certificate standard of any requesting party.

According to another embodiment, the trust engine 110 internally performs certificate issuances. In this embodiment, the trust engine 110 may access a certificate system for generating certificates and/or may internally generate certificates when they are requested, such as, for example, at the time of key generation or in the certificate standard requested at the time of the request. The trust engine 110 will be disclosed in greater detail below.

FIG. 1 also illustrates the vendor system 120. According to one embodiment, the vendor system 120 advantageously comprises a Web server. Typical Web servers generally serve content over the Internet using one of several internet markup languages or document format standards, such as the Hyper-Text Markup Language (HTML) or the Extensible Markup Language (XML). The Web server accepts requests from browsers like Netscape and Internet Explorer and then returns the appropriate electronic documents. A number of server or client-side technologies can be used to increase the power of the Web server beyond its ability to deliver standard electronic documents. For example, these technologies include Common Gateway Interface (CGI) scripts, Secure Sockets Layer (SSL) security, and Active Server Pages (ASPs). The vendor system 120 may advantageously provide electronic content relating to commercial, personal, educational, or other transactions.

Although the vendor system 120 is disclosed with reference to the foregoing embodiments, the invention is not intended to be limited thereby. Rather, a skilled artisan will recognize from the disclosure herein that the vendor system 120 may advantageously comprise any of the devices described with reference to the user system 105 or combination thereof.

FIG. 1 also illustrates the communication link 125 connecting the user system 105, the trust engine 110, the certificate authority 115, and the vendor system 120. According to one embodiment, the communication link 125 preferably comprises the Internet. The Internet, as used throughout this disclosure is a global network of computers. The structure of the Internet, which is well known to those of ordinary skill in the art, includes a network backbone with networks branching from the backbone. These branches, in turn, have networks branching from them, and so on. Routers move information packets between network levels, and then from network to network, until the packet reaches the neighborhood of its destination. From the destination, the destination network's host directs the information packet to the appropriate terminal, or node. In one advantageous embodiment, the Internet routing hubs comprise domain name system (DNS) servers using Transmission Control Protocol/Internet Protocol (TCP/IP) as is well known in the art. The routing hubs connect to one or more other routing hubs via high-speed communication links.

One popular part of the Internet is the World Wide Web. The World Wide Web contains different computers, which store documents capable of displaying graphical and textual information. The computers that provide information on the World Wide Web are typically called "websites." A website is defined by an Internet address that has an associated electronic page. The electronic page can be identified by a Uniform Resource Locator (URL). Generally, an electronic page is a document that organizes the presentation of text, graphical images, audio, video, and so forth.

Although the communication link 125 is disclosed in terms of its preferred embodiment, one of ordinary skill in the art will recognize from the disclosure herein that the communication link 125 may include a wide range of interactive communications links. For example, the communication link 125 may include interactive television networks, telephone networks, wireless data transmission systems, two-way cable systems, customized private or public computer networks, interactive kiosk networks, automatic teller machine networks, direct links, satellite or cellular networks, and the like.

Figure 2:
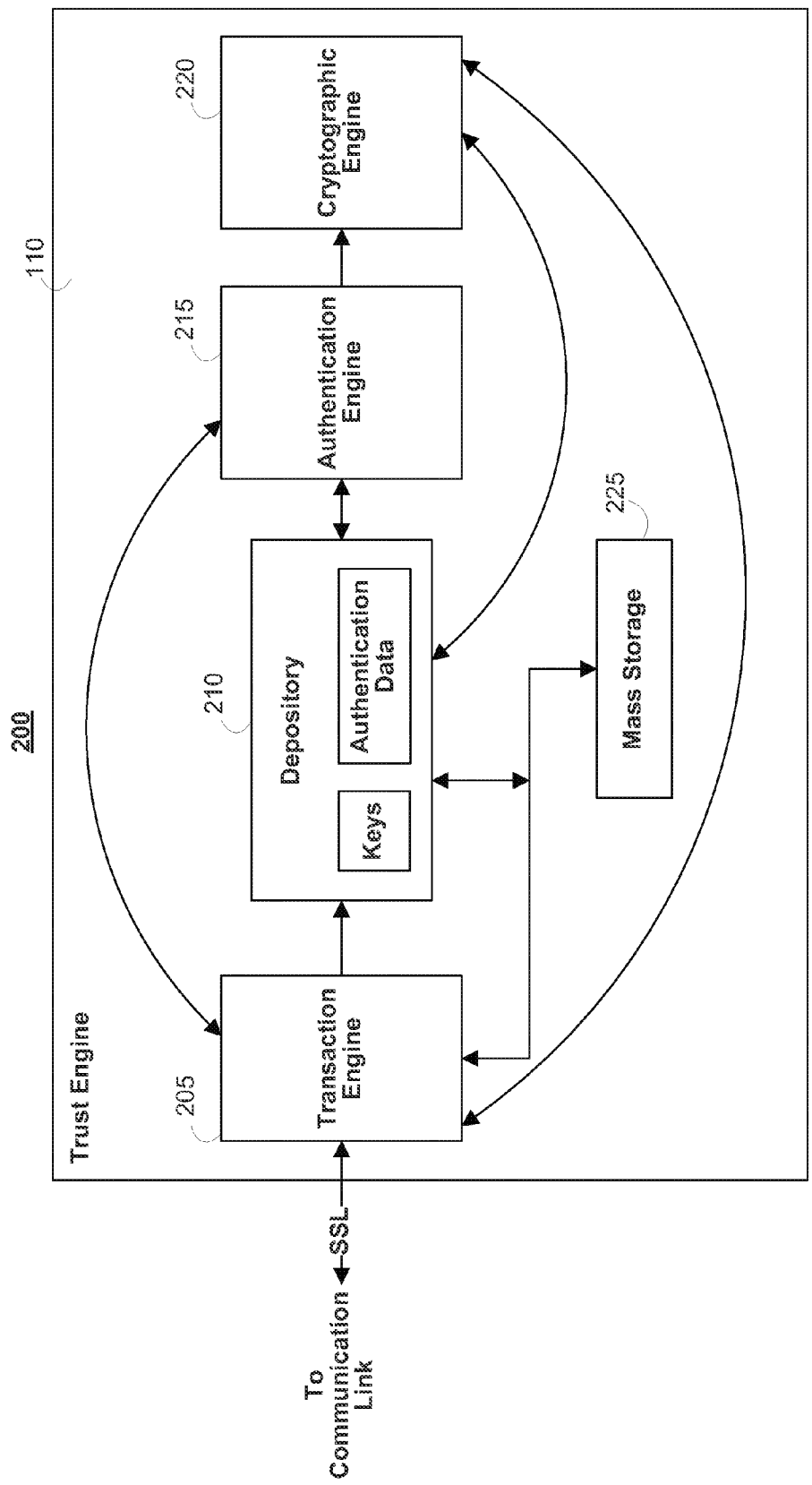
FIG. 2 illustrates a block diagram of the trust engine of FIG. 1, according to aspects of an embodiment of the invention.

FIG. 2 illustrates a block diagram of the trust engine 110 of FIG. 1 according to aspects of an embodiment of the invention. As shown in FIG. 2, the trust engine 110 includes a transaction engine 205, a depository 210, an authentication engine 215, and a cryptographic engine 220. According to one embodiment of the invention, the trust engine 110 also includes mass storage 225. As further shown in FIG. 2, the transaction engine 205 communicates with the depository 210, the authentication engine 215, and the cryptographic engine 220, along with the mass storage 225. In addition, the depository 210 communicates with the authentication engine 215, the cryptographic engine 220, and the mass storage 225. Moreover, the authentication engine 215 communicates with the cryptographic engine 220. According to one embodiment of the invention, some or all of the foregoing communications may advantageously comprise the transmission of XML documents to IP addresses that correspond to the receiving device. As mentioned in the foregoing, XML documents advantageously allow designers to create their own customized document tags, enabling the definition, transmission, validation, and interpretation of data between applications and between organizations. Moreover, some or all of the foregoing communications may include conventional SSL technologies.

According to one embodiment, the transaction engine 205 comprises a data routing device, such as a conventional Web server available from Netscape, Microsoft, Apache, or the like. For example, the Web server may advantageously receive incoming data from the communication link 125. According to one embodiment of the invention, the incoming data is addressed to a front-end security system for the trust engine 110. For example, the front-end security system may advantageously include a firewall, an intrusion detection system searching for known attack profiles, and/or a virus scanner. After clearing the front-end security system, the data is received by the transaction engine 205 and routed to one of the depository 210, the authentication engine 215, the cryptographic engine 220, and the mass storage 225. In addition, the transaction engine 205 monitors incoming data from the authentication engine 215 and cryptographic engine 220, and routes the data to particular systems through the communication link 125. For example, the transaction engine 205 may advantageously route data to the user system 105, the certificate authority 115, or the vendor system 120.

According to one embodiment, the data is routed using conventional HTTP routing techniques, such as, for example, employing URLs or Uniform Resource Indicators (URIs). URIs are similar to URLs, however, URIs typically indicate the source of files or actions, such as, for example, executables, scripts, and the like. Therefore, according to the one embodiment, the user system 105, the certificate authority 115, the vendor system 120, and the components of the trust engine 210, advantageously include sufficient data within communication URLs or URIs for the transaction engine 205 to properly route data throughout the cryptographic system.

Although the data routing is disclosed with reference to its preferred embodiment, a skilled artisan will recognize a wide number of possible data routing solutions or strategies. For example, XML or other data packets may advantageously be unpacked and recognized by their format, content, or the like, such that the transaction engine 205 may properly route data throughout the trust engine 110. Moreover, a skilled artisan will recognize that the data routing may advantageously be adapted to the data transfer protocols conforming to particular network systems, such as, for example, when the communication link 125 comprises a local network.

According to yet another embodiment of the invention, the transaction engine 205 includes conventional SSL encryption technologies, such that the foregoing systems may authenticate themselves, and vise-versa, with transaction engine 205, during particular communications. As will be used throughout this disclosure, the term "SSL" refers to communications where a server but not necessarily the client, is SSL authenticated, and the term "FULL SSL" refers to communications where the client and the server are SSL authenticated. When the instant disclosure uses the term "SSL", the communication may comprise ½ or FULL SSL.

As the transaction engine 205 routes data to the various components of the cryptographic system 100, the transaction engine 205 may advantageously create an audit trail. According to one embodiment, the audit trail includes a record of at least the type and format of data routed by the transaction engine 205 throughout the cryptographic system 100. Such audit data may advantageously be stored in the mass storage 225.

FIG. 2 also illustrates the depository 210. According to one embodiment, the depository 210 comprises one or more data storage facilities, such as, for example, a directory server, a database server, or the like. As shown in FIG. 2, the depository 210 stores cryptographic keys and enrollment authentication data. The cryptographic keys may advantageously correspond to the trust engine 110 or to users of the cryptographic system 100, such as the user or vendor. The enrollment authentication data may advantageously include data designed to uniquely identify a user, such as, user ID, passwords, answers to questions, biometric data, or the like. This enrollment authentication data may advantageously be acquired at enrollment of a user or another alternative later time. For example, the trust engine 110 may include periodic or other renewal or reissue of enrollment authentication data.

According to one embodiment, the communication from the transaction engine 205 to and from the authentication engine 215 and the cryptographic engine 220 comprises secure communication, such as, for example conventional SSL technology. In addition, as mentioned in the foregoing, the data of the communications to and from the depository 210 may be transferred using URLs, URIs, HTTP or XML documents, with any of the foregoing advantageously having data requests and formats embedded therein.

As mentioned above, the depository 210 may advantageously comprises a plurality of secure data storage facilities. In such an embodiment, the secure data storage facilities may be configured such that a compromise of the security in one individual data storage facility will not compromise the cryptographic keys or the authentication data stored therein. For example, according to this embodiment, the cryptographic keys and the authentication data are mathematically operated on so as to statistically and substantially randomize the data stored in each data storage facility. According to one embodiment, the randomization of the data of an individual data storage facility renders that data undecipherable. Thus, compromise of an individual data storage facility produces only a randomized undecipherable number and does not compromise the security of any cryptographic keys or the authentication data as a whole.

FIG. 2 also illustrates the trust engine 110 including the authentication engine 215. According to one embodiment, the authentication engine 215 comprises a data comparator configured to compare data from the transaction engine 205 with data from the depository 210. For example, during authentication, a user supplies current authentication data to the trust engine 110 such that the transaction engine 205 receives the current authentication data. As mentioned in the foregoing, the transaction engine 205 recognizes the data requests, preferably in the URL or URI, and routes the authentication data to the authentication engine 215. Moreover, upon request, the depository 210 forwards enrollment authentication data corresponding to the user to the authentication engine 215. Thus, the authentication engine 215 has both the current authentication data and the enrollment authentication data for comparison.

According to one embodiment, the communications to the authentication engine comprise secure communications, such as, for example, SSL technology. Additionally, security can be provided within the trust engine 110 components, such as, for example, super-encryption using public key technologies. For example, according to one embodiment, the user encrypts the current authentication data with the public key of the authentication engine 215. In addition, the depository 210 also encrypts the enrollment authentication data with the public key of the authentication engine 215. In this way, only the authentication engine's private key can be used to decrypt the transmissions.

As shown in FIG. 2, the trust engine 110 also includes the cryptographic engine 220. According to one embodiment, the cryptographic engine comprises a cryptographic handling module, configured to advantageously provide conventional cryptographic functions, such as, for example, public-key infrastructure (PKI) functionality. For example, the cryptographic engine 220 may advantageously issue public and private keys for users of the cryptographic system 100. In this manner, the cryptographic keys are generated at the cryptographic engine 220 and forwarded to the depository 210 such that at least the private cryptographic keys are not available outside of the trust engine 110. According to another embodiment, the cryptographic engine 220 randomizes and splits at least the private cryptographic key data, thereby storing only the randomized split data. Similar to the splitting of the enrollment authentication data, the splitting process ensures the stored keys are not available outside the cryptographic engine 220. According to another embodiment, the functions of the cryptographic engine can be combined with and performed by the authentication engine 215.

According to one embodiment, communications to and from the cryptographic engine include secure communications, such as SSL technology. In addition, XML documents may advantageously be employed to transfer data and/or make cryptographic function requests.

FIG. 2 also illustrates the trust engine 110 having the mass storage 225. As mentioned in the foregoing, the transaction engine 205 keeps data corresponding to an audit trail and stores such data in the mass storage 225. Similarly, according to one embodiment of the invention, the depository 210 keeps data corresponding to an audit trail and stores such data in the mass storage device 225. The depository audit trail data is similar to that of the transaction engine 205 in that the audit trail data comprises a record of the requests received by the depository 210 and the response thereof. In addition, the mass storage 225 may be used to store digital certificates having the public key of a user contained therein.

Although the trust engine 110 is disclosed with reference to its preferred and alternative embodiments, the invention is not intended to be limited thereby. Rather, a skilled artisan will recognize in the disclosure herein, a wide number of alternatives for the trust engine 110. For example, the trust engine 110, may advantageously perform only authentication, or alternatively, only some or all of the cryptographic functions, such as data encryption and decryption. According to such embodiments, one of the authentication engine 215 and the cryptographic engine 220 may advantageously be removed, thereby creating a more straightforward design for the trust engine 110. In addition, the cryptographic engine 220 may also communicate with a certificate authority such that the certificate authority is embodied within the trust engine 110. According to yet another embodiment, the trust engine 110 may advantageously perform authentication and one or more cryptographic functions, such as, for example, digital signing.

Figure 3:
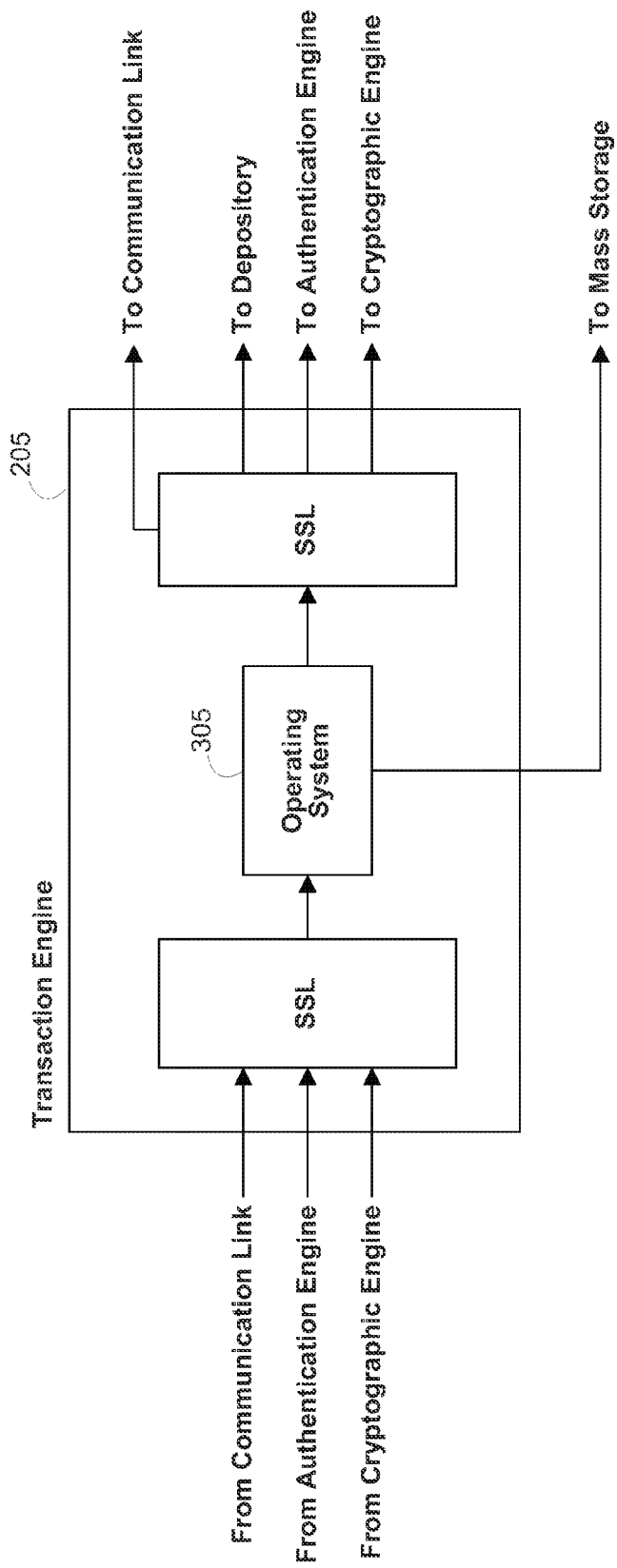
FIG. 3 illustrates a block diagram of the transaction engine of FIG. 2, according to aspects of an embodiment of the invention.

FIG. 3 illustrates a block diagram of the transaction engine 205 of FIG. 2, according to aspects of an embodiment of the invention. According to this embodiment, the transaction engine 205 comprises an operating system 305 having a handling thread and a listening thread. The operating system 305 may advantageously be similar to those found in conventional high volume servers, such as, for example, Web servers available from Apache. The listening thread monitors the incoming communication from one of the communication link 125, the authentication engine 215, and the cryptographic engine 220 for incoming data flow. The handling thread recognizes particular data structures of the incoming data flow, such as, for example, the foregoing data structures, thereby routing the incoming data to one of the communication link 125, the depository 210, the authentication engine 215, the cryptographic engine 220, or the mass storage 225. As shown in FIG. 3, the incoming and outgoing data may advantageously be secured through, for example, SSL technology.

Figure 4:
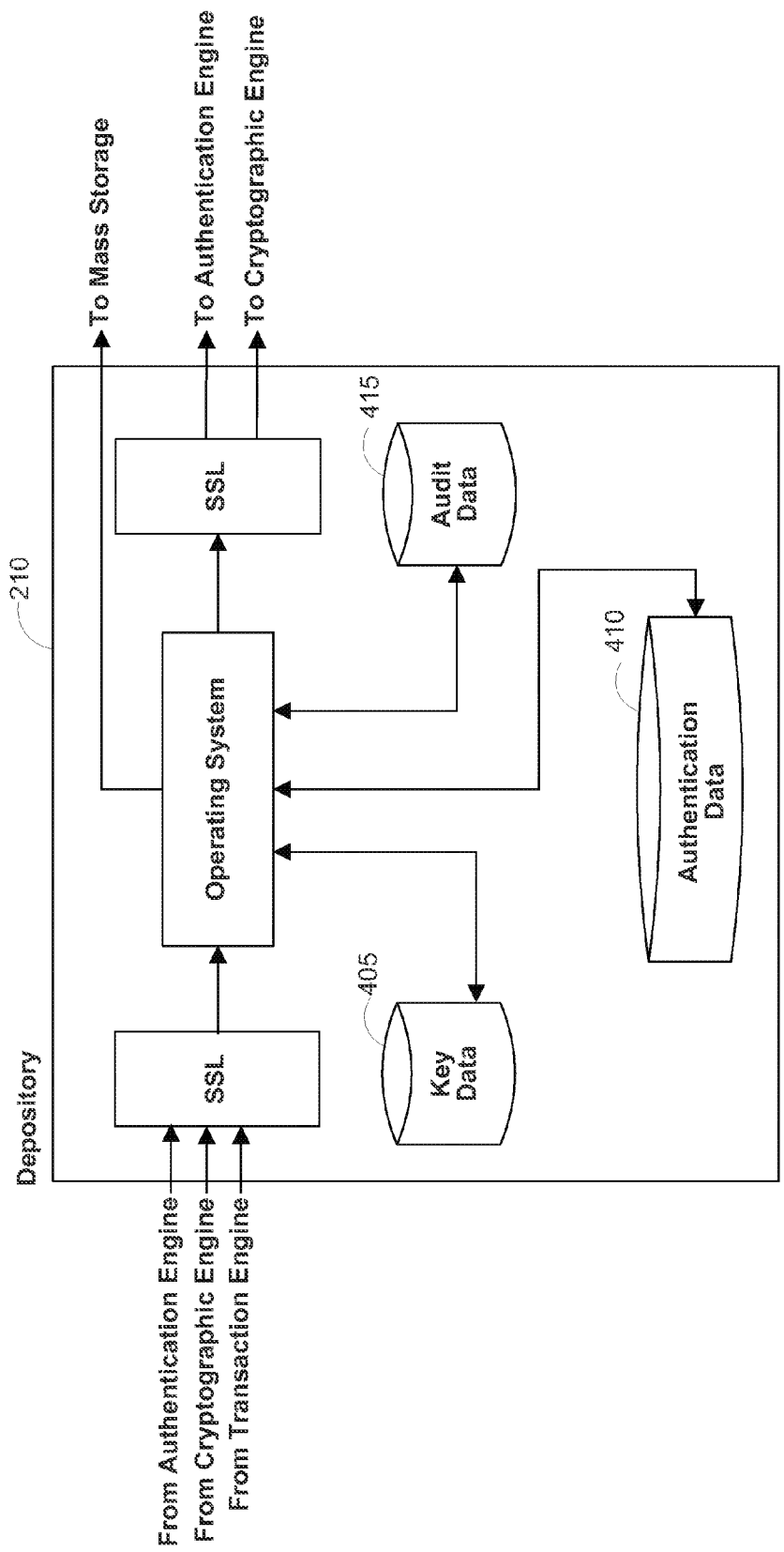
FIG. 4 illustrates a block diagram of the depository of FIG. 2, according to aspects of an embodiment of the invention.

FIG. 4 illustrates a block diagram of the depository 210 of FIG. 2 according to aspects of an embodiment of the invention. According to this embodiment, the depository 210 comprises one or more lightweight directory access protocol (LDAP) servers. LDAP directory servers are available from a wide variety of manufacturers such as Netscape, ISO, and others. FIG. 4 also shows that the directory server preferably stores data 405 corresponding to the cryptographic keys and data 410 corresponding to the enrollment authentication data. According to one embodiment, the depository 210 comprises a single logical memory structure indexing authentication data and cryptographic key data to a unique user ID. The single logical memory structure preferably includes mechanisms to ensure a high degree of trust, or security, in the data stored therein. For example, the physical location of the depository 210 may advantageously include a wide number of conventional security measures, such as limited employee access, modern surveillance systems, and the like. In addition to, or in lieu of, the physical securities, the computer system or server may advantageously include software solutions to protect the stored data. For example, the depository 210 may advantageously create and store data 415 corresponding to an audit trail of actions taken. In addition, the incoming and outgoing communications may advantageously be encrypted with public key encryption coupled with conventional SSL technologies.

Figure 7:
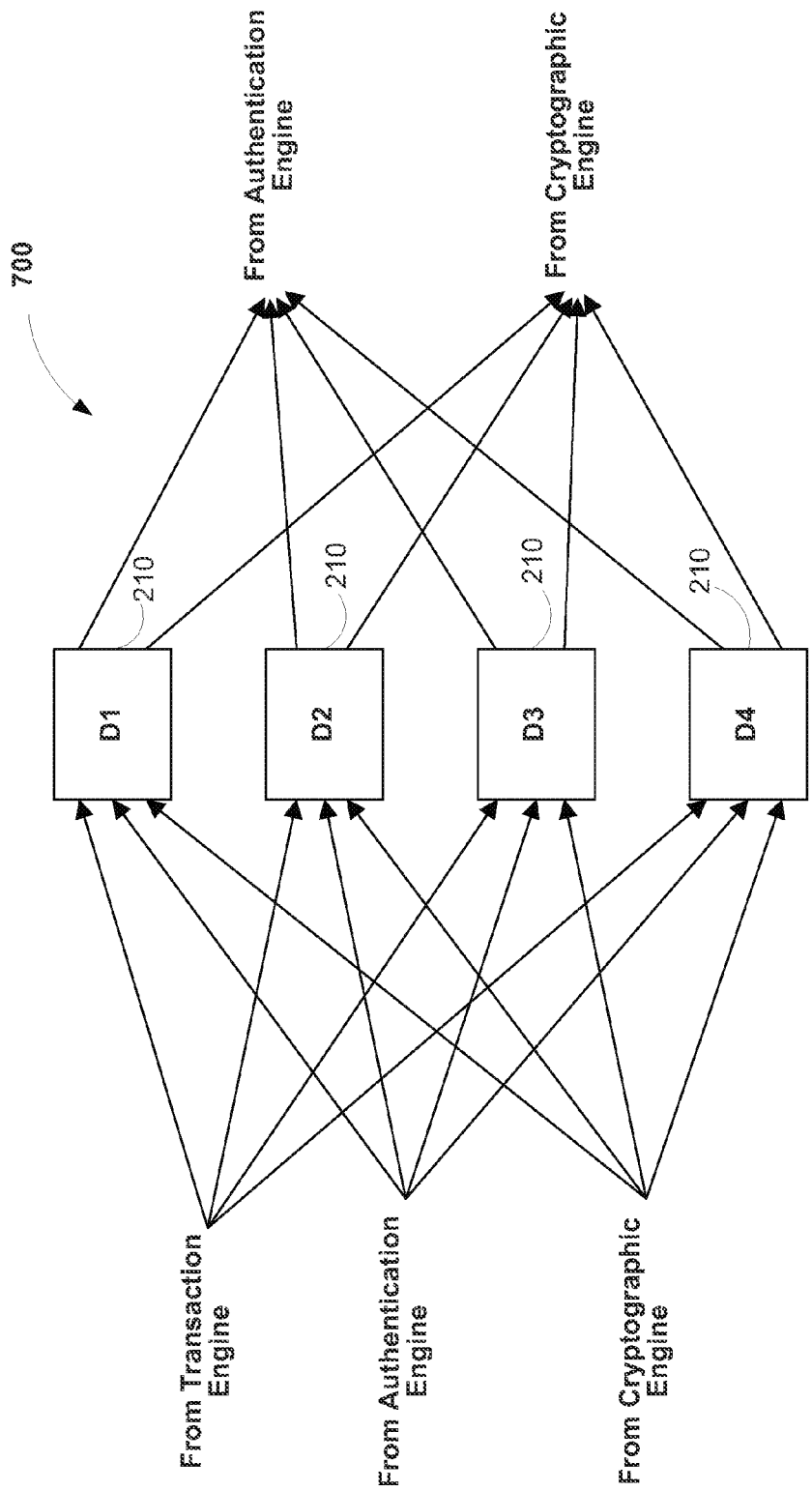
FIG. 7 illustrates a block diagram of a depository system, according to aspects of another embodiment of the invention.

According to another embodiment, the depository 210 may comprise distinct and physically separated data storage facilities, as disclosed further with reference to FIG. 7.

Figure 5:
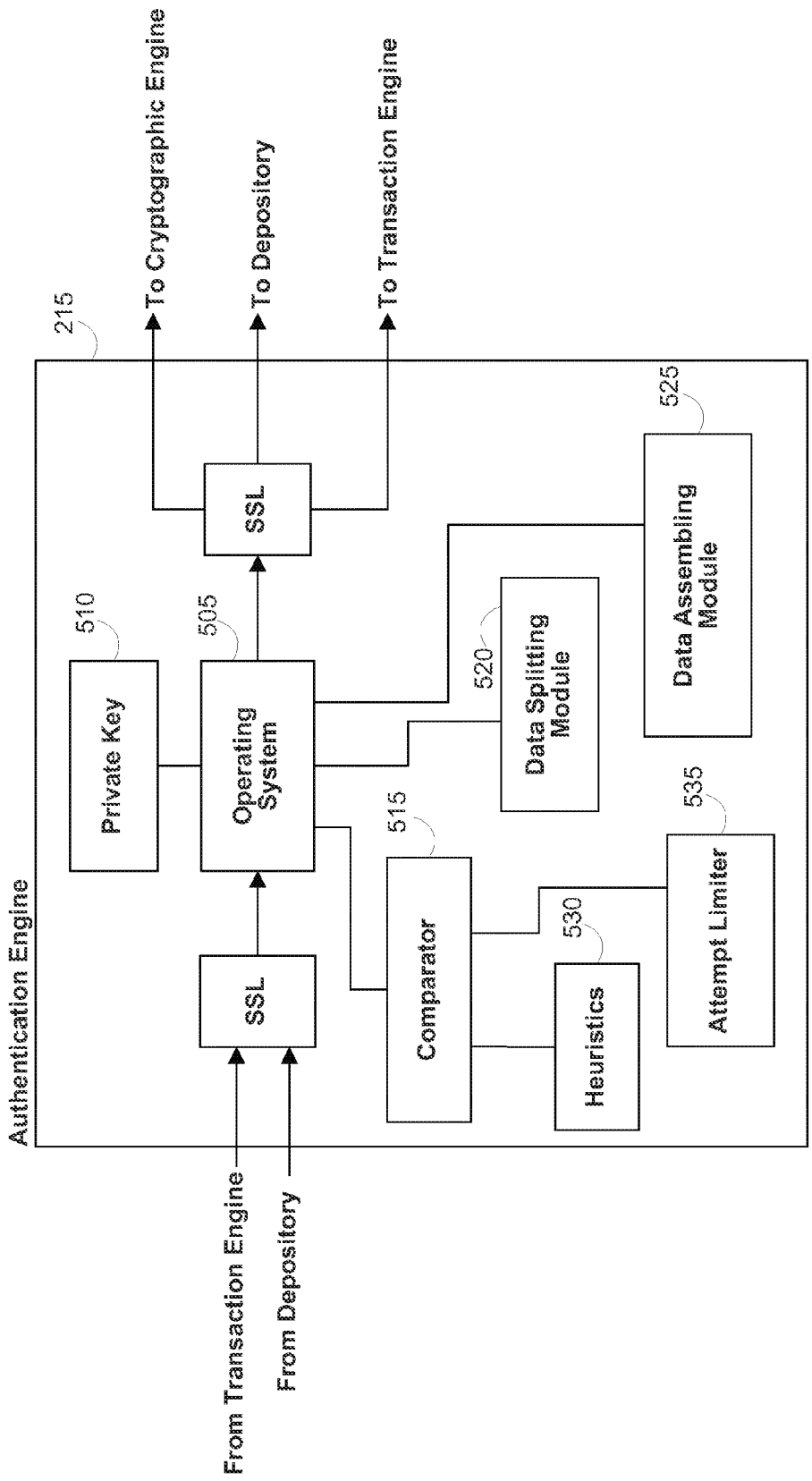
FIG. 5 illustrates a block diagram of the authentication engine of FIG. 2, according to aspects of an embodiment of the invention.

FIG. 5 illustrates a block diagram of the authentication engine 215 of FIG. 2 according to aspects of an embodiment of the invention. Similar to the transaction engine 205 of FIG. 3, the authentication engine 215 comprises an operating system 505 having at least a listening and a handling thread of a modified version of a conventional Web server, such as, for example, Web servers available from Apache. As shown in FIG. 5, the authentication engine 215 includes access to at least one private key 510. The private key 510 may advantageously be used for example, to decrypt data from the transaction engine 205 or the depository 210, which was encrypted with a corresponding public key of the authentication engine 215.

FIG. 5 also illustrates the authentication engine 215 comprising a comparator 515, a data splitting module 520, and a data assembling module 525. According to the preferred embodiment of the invention, the comparator 515 includes technology capable of comparing potentially complex patterns related to the foregoing biometric authentication data. The technology may include hardware, software, or combined solutions for pattern comparisons, such as, for example, those representing finger print patterns or voice patterns. In addition, according to one embodiment, the comparator 515 of the authentication engine 215 may advantageously compare conventional hashes of documents in order to render a comparison result. According to one embodiment of the invention, the comparator 515 includes the application of heuristics 530 to the comparison. The heuristics 530 may advantageously address circumstances surrounding an authentication attempt, such as, for example, the time of day, IP address or subnet mask, purchasing profile, email address, processor serial number or ID, or the like.

Moreover, the nature of biometric data comparisons may result in varying degrees of confidence being produced from the matching of current biometric authentication data to enrollment data. For example, unlike a traditional password which may only return a positive or negative match, a fingerprint may be determined to be a partial match, e.g. a 90% match, a 75% match, or a 10% match, rather than simply being correct or incorrect. Other biometric identifiers such as voice print analysis or face recognition may share this property of probabilistic authentication, rather than absolute authentication.

When working with such probabilistic authentication or in other cases where an authentication is considered less than absolutely reliable, it is desirable to apply the heuristics 530 to determine whether the level of confidence in the authentication provided is sufficiently high to authenticate the transaction which is being made.

It will sometimes be the case that the transaction at issue is a relatively low value transaction where it is acceptable to be authenticated to a lower level of confidence. This could include a transaction which has a low dollar value associated with it (e.g., a $10 purchase) or a transaction with low risk (e.g., admission to a members-only web site).

Conversely, for authenticating other transactions, it may be desirable to require a high degree of confidence in the authentication before allowing the transaction to proceed. Such transactions may include transactions of large dollar value (e.g., signing a multi-million dollar supply contract) or transaction with a high risk if an improper authentication occurs (e.g., remotely logging onto a government computer).

The use of the heuristics 530 in combination with confidence levels and transactions values may be used as will be described below to allow the comparator to provide a dynamic context-sensitive authentication system.

According to another embodiment of the invention, the comparator 515 may advantageously track authentication attempts for a particular transaction. For example, when a transaction fails, the trust engine 110 may request the user to re-enter his or her current authentication data. The comparator 515 of the authentication engine 215 may advantageously employ an attempt limiter 535 to limit the number of authentication attempts, thereby prohibiting brute-force attempts to impersonate a user's authentication data. According to one embodiment, the attempt limiter 535 comprises a software module monitoring transactions for repeating authentication attempts and, for example, limiting the authentication attempts for a given transaction to three. Thus, the attempt limiter 535 will limit an automated attempt to impersonate an individual's authentication data to, for example, simply three "guesses." Upon three failures, the attempt limiter 535 may advantageously deny additional authentication attempts. Such denial may advantageously be implemented through, for example, the comparator 515 returning a negative result regardless of the current authentication data being transmitted. On the other hand, the transaction engine 205 may advantageously block any additional authentication attempts pertaining to a transaction in which three attempts have previously failed.

The authentication engine 215 also includes the data splitting module 520 and the data assembling module 525. The data splitting module 520 advantageously comprises a software, hardware, or combination module having the ability to mathematically operate on various data so as to substantially randomize and split the data into portions. According to one embodiment, original data is not recreatable from an individual portion. The data assembling module 525 advantageously comprises a software, hardware, or combination module configured to mathematically operate on the foregoing substantially randomized portions, such that the combination thereof provides the original deciphered data. According to one embodiment, the authentication engine 215 employs the data splitting module 520 to randomize and split enrollment authentication data into portions, and employs the data assembling module 525 to reassemble the portions into usable enrollment authentication data.

Figure 6:
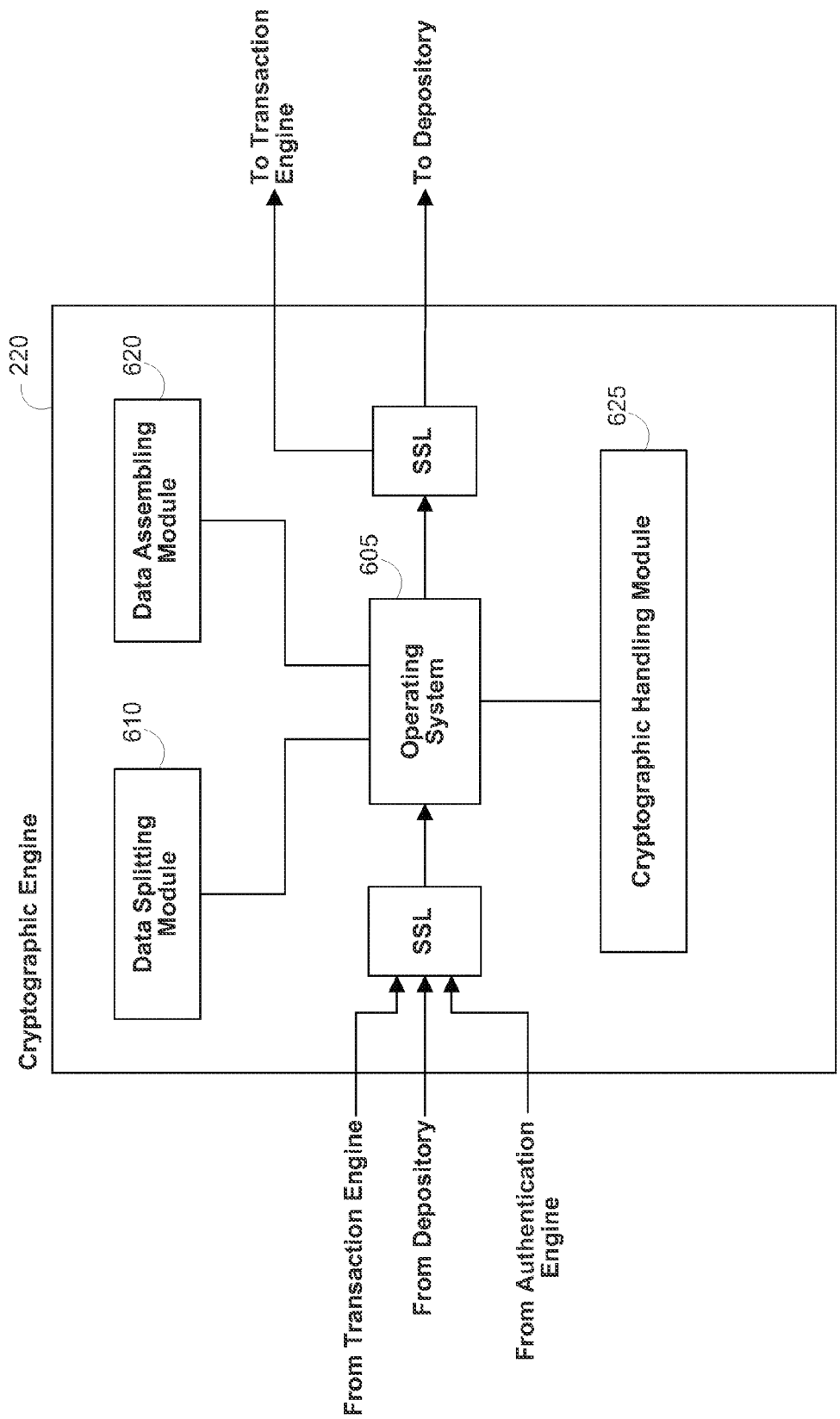
FIG. 6 illustrates a block diagram of the cryptographic engine of FIG. 2, according to aspects of an embodiment of the invention.

FIG. 6 illustrates a block diagram of the cryptographic engine 220 of the trust engine 200 of FIG. 2 according to aspects of one embodiment of the invention. Similar to the transaction engine 205 of FIG. 3, the cryptographic engine 220 comprises an operating system 605 having at least a listening and a handling thread of a modified version of a conventional Web server, such as, for example, Web servers available from Apache. As shown in FIG. 6, the cryptographic engine 220 comprises a data splitting module 610 and a data assembling module 620 that function similar to those of FIG. 5. However, according to one embodiment, the data splitting module 610 and the data assembling module 620 process cryptographic key data, as opposed to the foregoing enrollment authentication data. Although, a skilled artisan will recognize from the disclosure herein that the data splitting module 910 and the data splitting module 620 may be combined with those of the authentication engine 215.

The cryptographic engine 220 also comprises a cryptographic handling module 625 configured to perform one, some or all of a wide number of cryptographic functions. According to one embodiment, the cryptographic handling module 625 may comprise software modules or programs, hardware, or both. According to another embodiment, the cryptographic handling module 625 may perform data comparisons, data parsing, data splitting, data separating, data hashing, data encryption or decryption, digital signature verification or creation, digital certificate generation, storage, or requests, cryptographic key generation, or the like. Moreover, a skilled artisan will recognize from the disclosure herein that the cryptographic handling module 825 may advantageously comprises a public-key infrastructure, such as Pretty Good Privacy (PGP), an RSA-based public-key system, or a wide number of alternative key management systems. In addition, the cryptographic handling module 625 may perform public-key encryption, symmetric-key encryption, or both. In addition to the foregoing, the cryptographic handling module 625 may include one or more computer programs or modules, hardware, or both, for implementing seamless, transparent, interoperability functions.

A skilled artisan will also recognize from the disclosure herein that the cryptographic functionality may include a wide number or variety of functions generally relating to cryptographic key management systems.

FIG. 7 illustrates a simplified block diagram of a depository system 700 according to aspects of an embodiment of the invention. As shown in FIG. 7, the depository system 700 advantageously comprises multiple data storage facilities, for example, data storage facilities D1, D2, D3, and D4. However, it is readily understood by those of ordinary skill in the art that the depository system may have only one data storage facility. According to one embodiment of the invention, each of the data storage facilities D1 through D4 may advantageously comprise some or all of the elements disclosed with reference to the depository 210 of FIG. 4. Similar to the depository 210, the data storage facilities D1 through D4 communicate with the transaction engine 205, the authentication engine 215, and the cryptographic engine 220, preferably through conventional SSL. Communication links transferring, for example, XML documents. Communications from the transaction engine 205 may advantageously include requests for data, wherein the request is advantageously broadcast to the IP address of each data storage facility D1 through D4. On the other hand, the transaction engine 205 may broadcast requests to particular data storage facilities based on a wide number of criteria, such as, for example, response time, server loads, maintenance schedules, or the like.

In response to requests for data from the transaction engine 205, the depository system 700 advantageously forwards stored data to the authentication engine 215 and the cryptographic engine 220. The respective data assembling modules receive the forwarded data and assemble the data into useable formats. On the other hand, communications from the authentication engine 215 and the cryptographic engine 220 to the data storage facilities D1 through D4 may include the transmission of sensitive data to be stored. For example, according to one embodiment, the authentication engine 215 and the cryptographic engine 220 may advantageously employ their respective data splitting modules to divide sensitive data into undecipherable portions, and then transmit one or more undecipherable portions of the sensitive data to a particular data storage facility.

According to one embodiment, each data storage facility, D1 through D4, comprises a separate and independent storage system, such as, for example, a directory server. According to another embodiment of the invention, the depository system 700 comprises multiple geographically separated independent data storage systems. By distributing the sensitive data into distinct and independent storage facilities D1 through D4, some or all of which may be advantageously geographically separated, the depository system 700 provides redundancy along with additional security measures. For example, according to one embodiment, only data from two of the multiple data storage facilities, D1 through D4, are needed to decipher and reassemble the sensitive data. Thus, as many as two of the four data storage facilities D1 through D4 may be inoperative due to maintenance, system failure, power failure, or the like, without affecting the functionality of the trust engine 110. In addition, because, according to one embodiment, the data stored in each data storage facility is randomized and undecipherable, compromise of any individual data storage facility does not necessarily compromise the sensitive data. Moreover, in the embodiment having geographical separation of the data storage facilities, a compromise of multiple geographically remote facilities becomes increasingly difficult. In fact, even a rogue employee will be greatly challenged to subvert the needed multiple independent geographically remote data storage facilities.

Although the depository system 700 is disclosed with reference to its preferred and alternative embodiments, the invention is not intended to be limited thereby. Rather, a skilled artisan will recognize from the disclosure herein, a wide number of alternatives for the depository system 700. For example, the depository system 700 may comprise one, two or more data storage facilities. In addition, sensitive data may be mathematically operated such that portions from two or more data storage facilities are needed to reassemble and decipher the sensitive data.

Figure 8:
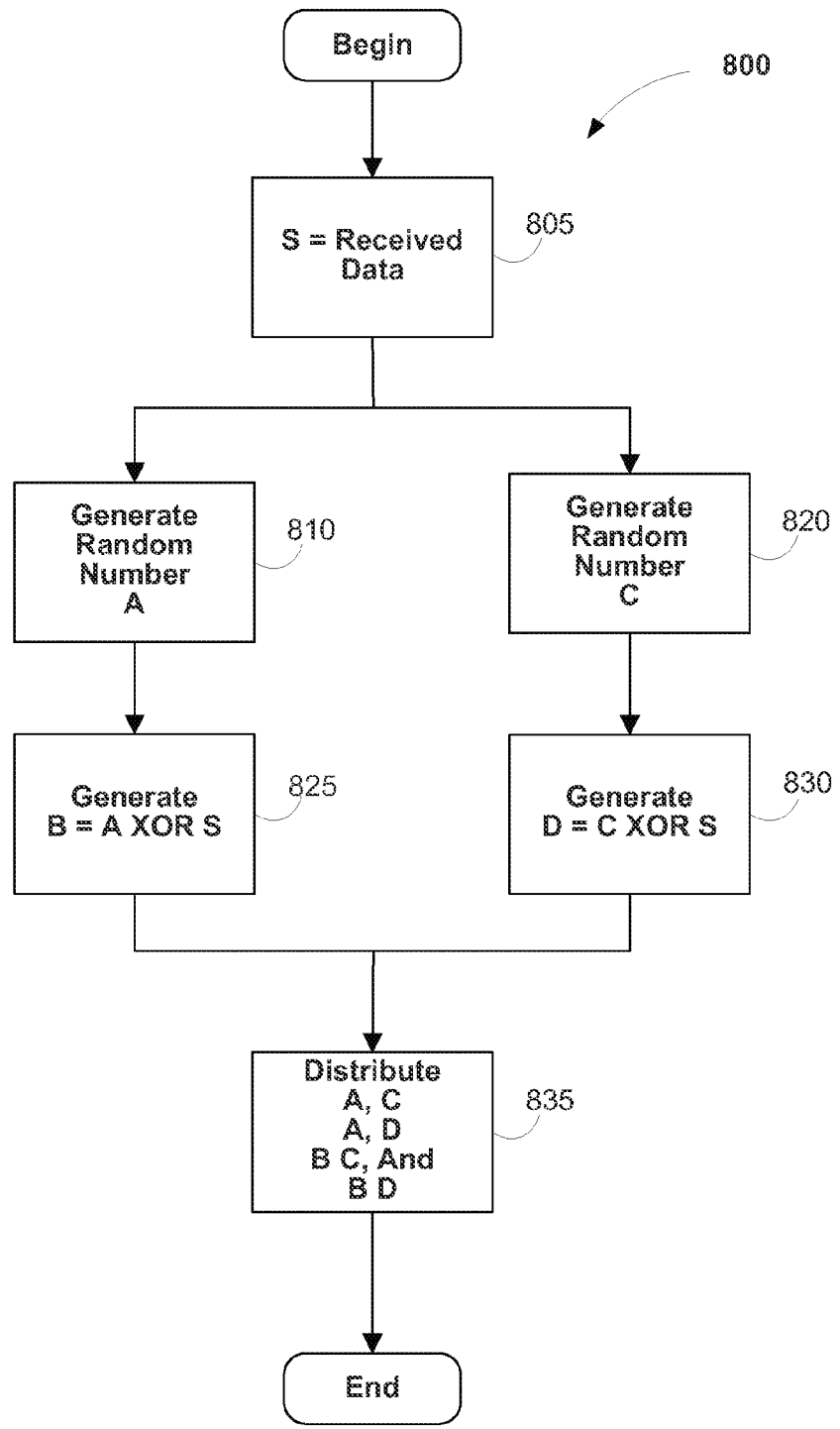
FIG. 8 illustrates a flow chart of a data splitting process according to aspects of an embodiment of the invention.

As mentioned in the foregoing, the authentication engine 215 and the cryptographic engine 220 each include a data splitting module 520 and 610, respectively, for splitting any type or form of sensitive data, such as, for example, text, audio, video, the authentication data and the cryptographic key data. FIG. 8 illustrates a flowchart of a data splitting process 800 performed by the data splitting module according to aspects of an embodiment of the invention. As shown in FIG. 8, the data splitting process 800 begins at step 805 when sensitive data "S" is received by the data splitting module of the authentication engine 215 or the cryptographic engine 220. Preferably, in step 810, the data splitting module then generates a substantially random number, value, or string or set of bits, "A." For example, the random number A may be generated in a wide number of varying conventional techniques available to one of ordinary skill in the art, for producing high quality random numbers suitable for use in cryptographic applications. In addition, according to one embodiment, the random number A comprises a bit length which may be any suitable length, such as shorter, longer or equal to the bit length of the sensitive data, S.

In addition, in step 820 the data splitting process 800 generates another statistically random number "C." According to the preferred embodiment, the generation of the statistically random numbers A and C may advantageously be done in parallel. The data splitting module then combines the numbers A and C with the sensitive data S such that new numbers "B" and "D" are generated. For example, number B may comprise the binary combination of A XOR S and number D may comprise the binary combination of C XOR S. The XOR function, or the "exclusive-or" function, is well known to those of ordinary skill in the art. The foregoing combinations preferably occur in steps 825 and 830, respectively, and, according to one embodiment, the foregoing combinations also occur in parallel. The data splitting process 800 then proceeds to step 835 where the random numbers A and C and the numbers B and D are paired such that none of the pairings contain sufficient data, by themselves, to reorganize and decipher the original sensitive data S. For example, the numbers may be paired as follows: AC, AD, BC, and BD. According to one embodiment, each of the foregoing pairings is distributed to one of the depositories D1 through D4 of FIG. 7. According to another embodiment, each of the foregoing pairings is randomly distributed to one of the depositories D1 through D4. For example, during a first data splitting process 800, the pairing AC may be sent to depository D2, through, for example, a random selection of D2's IP address. Then, during a second data splitting process 800, the pairing AC may be sent to depository D4, through, for example, a random selection of D4's IP address. In addition, the pairings may all be stored on one depository, and may be stored in separate locations on said depository.

Based on the foregoing, the data splitting process 800 advantageously places portions of the sensitive data in each of the four data storage facilities D1 through D4, such that no single data storage facility D1 through D4 includes sufficient encrypted data to recreate the original sensitive data S. As mentioned in the foregoing, such randomization of the data into individually unusable encrypted portions increases security and provides for maintained trust in the data even if one of the data storage facilities, D1 through D4, is compromised.

Although the data splitting process 800 is disclosed with reference to its preferred embodiment, the invention is not intended to be limited thereby. Rather a skilled artisan will recognize from the disclosure herein, a wide number of alternatives for the data splitting process 800. For example, the data splitting process may advantageously split the data into two numbers, for example, random number A and number B and, randomly distribute A and B through two data storage facilities. Moreover, the data splitting process 800 may advantageously split the data among a wide number of data storage facilities through generation of additional random numbers. The data may be split into any desired, selected, predetermined, or randomly assigned size unit, including but not limited to, a bit, bits, bytes, kilobytes, megabytes or larger, or any combination or sequence of sizes. In addition, varying the sizes of the data units resulting from the splitting process may render the data more difficult to restore to a useable form, thereby increasing security of sensitive data. It is readily apparent to those of ordinary skill in the art that the split data unit sizes may be a wide variety of data unit sizes or patterns of sizes or combinations of sizes. For example, the data unit sizes may be selected or predetermined to be all of the same size, a fixed set of different sizes, a combination of sizes, or randomly generates sizes. Similarly, the data units may be distributed into one or more shares according to a fixed or predetermined data unit size, a pattern or combination of data unit sizes, or a randomly generated data unit size or sizes per share.

As mentioned in the foregoing, in order to recreate the sensitive data S, the data portions need to be derandomized and reorganized. This process may advantageously occur in the data assembling modules, 525 and 620, of the authentication engine 215 and the cryptographic engine 220, respectively. The data assembling module, for example, data assembly module 525, receives data portions from the data storage facilities D1 through D4, and reassembles the data into useable form. For example, according to one embodiment where the data splitting module 520 employed the data splitting process 800 of FIG. 8, the data assembling module 525 uses data portions from at least two of the data storage facilities D1 through D4 to recreate the sensitive data S. For example, the pairings of AC, AD, BC, and BD, were distributed such that any two provide one of A and B, or, C and D. Noting that S=A XOR B or S=C XOR D indicates that when the data assembling module receives one of A and B, or, C and D, the data assembling module 525 can advantageously reassemble the sensitive data S. Thus, the data assembling module 525 may assemble the sensitive data S, when, for example, it receives data portions from at least the first two of the data storage facilities D1 through D4 to respond to an assemble request by the trust engine 110.

Based on the above data splitting and assembling processes, the sensitive data S exists in usable format only in a limited area of the trust engine 110. For example, when the sensitive data S includes enrollment authentication data, usable, nonrandomized enrollment authentication data is available only in the authentication engine 215. Likewise, when the sensitive data S includes private cryptographic key data, usable, nonrandomized private cryptographic key data is available only in the cryptographic engine 220.

Although the data splitting and assembling processes are disclosed with reference to their preferred embodiments, the invention is not intended to be limited thereby. Rather, a skilled artisan will recognize from the disclosure herein, a wide number of alternatives for splitting and reassembling the sensitive data S. For example, public-key encryption may be used to further secure the data at the data storage facilities D1 through D4. In addition, it is readily apparent to those of ordinary skill in the art that the data splitting module described herein is also a separate and distinct embodiment of the present invention that may be incorporated into, combined with or otherwise made part of any pre-existing computer systems, software suites, database, or combinations thereof, or other embodiments of the present invention, such as the trust engine, authentication engine, and transaction engine disclosed and described herein.

FIG. 9A illustrates a data flow of an enrollment process 900 according to aspects of an embodiment of the invention. As shown in FIG. 9A, the enrollment process 900 begins at step 905 when a user desires to enroll with the trust engine 110 of the cryptographic system 100. According to this embodiment, the user system 105 advantageously includes a client-side applet, such as a Java-based, that queries the user to enter enrollment data, such as demographic data and enrollment authentication data. According to one embodiment, the enrollment authentication data includes user ID, password(s), biometric(s), or the like. According to one embodiment, during the querying process, the client-side applet preferably communicates with the trust engine 110 to ensure that a chosen user ID is unique. When the user ID is nonunique, the trust engine 110 may advantageously suggest a unique user ID. The client-side applet gathers the enrollment data and transmits the enrollment data, for example, through and XML document, to the trust engine 110, and in particular, to the transaction engine 205. According to one embodiment, the transmission is encoded with the public key of the authentication engine 215.

According to one embodiment, the user performs a single enrollment during step 905 of the enrollment process 900. For example, the user enrolls himself or herself as a particular person, such as Joe User. When Joe User desires to enroll as Joe User, CEO of Mega Corp., then according to this embodiment, Joe User enrolls a second time, receives a second unique user ID and the trust engine 110 does not associate the two identities. According to another embodiment of the invention, the enrollment process 900 provides for multiple user identities for a single user ID. Thus, in the above example, the trust engine 110 will advantageously associate the two identities of Joe User. As will be understood by a skilled artisan from the disclosure herein, a user may have many identities, for example, Joe User the head of household, Joe User the member of the Charitable Foundations, and the like. Even though the user may have multiple identities, according to this embodiment, the trust engine 110 preferably stores only one set of enrollment data. Moreover, users may advantageously add, edit/update, or delete identities as they are needed.

Although the enrollment process 900 is disclosed with reference to its preferred embodiment, the invention is not intended to be limited thereby. Rather, a skilled artisan will recognize from the disclosure herein, a wide number of alternatives for gathering of enrollment data, and in particular, enrollment authentication data. For example, the applet may be common object model (COM) based applet or the like.

On the other hand, the enrollment process may include graded enrollment. For example, at a lowest level of enrollment, the user may enroll over the communication link 125 without producing documentation as to his or her identity. According to an increased level of enrollment, the user enrolls using a trusted third party, such as a digital notary. For example, and the user may appear in person to the trusted third party, produce credentials such as a birth certificate, driver's license, military ID, or the like, and the trusted third party may advantageously include, for example, their digital signature in enrollment submission. The trusted third party may include an actual notary, a government agency, such as the Post Office or Department of Motor Vehicles, a human resources person in a large company enrolling an employee, or the like. A skilled artisan will understand from the disclosure herein that a wide number of varying levels of enrollment may occur during the enrollment process 900.

After receiving the enrollment authentication data, at step 915, the transaction engine 205, using conventional FULL SSL technology forwards the enrollment authentication data to the authentication engine 215. In step 920, the authentication engine 215 decrypts the enrollment authentication data using the private key of the authentication engine 215. In addition, the authentication engine 215 employs the data splitting module to mathematically operate on the enrollment authentication data so as to split the data into at least two independently undecipherable, randomized, numbers. As mentioned in the foregoing, at least two numbers may comprise a statistically random number and a binary XORed number. In step 925, the authentication engine 215 forwards each portion of the randomized numbers to one of the data storage facilities D1 through D4. As mentioned in the foregoing, the authentication engine 215 may also advantageously randomize which portions are transferred to which depositories.

Often during the enrollment process 900, the user will also desire to have a digital certificate issued such that he or she may receive encrypted documents from others outside the cryptographic system 100. As mentioned in the foregoing, the certificate authority 115 generally issues digital certificates according to one or more of several conventional standards. Generally, the digital certificate includes a public key of the user or system, which is known to everyone.

Whether the user requests a digital certificate at enrollment, or at another time, the request is transferred through the trust engine 110 to the authentication engine 215. According to one embodiment, the request includes an XML document having, for example, the proper name of the user. According to step 935, the authentication engine 215 transfers the request to the cryptographic engine 220 instructing the cryptographic engine 220 to generate a cryptographic key or key pair.

Upon request, at step 935, the cryptographic engine 220 generates at least one cryptographic key. According to one embodiment, the cryptographic handling module 625 generates a key pair, where one key is used as a private key, and one is used as a public key. The cryptographic engine 220 stores the private key and, according to one embodiment, a copy of the public key. In step 945, the cryptographic engine 220 transmits a request for a digital certificate to the transaction engine 205. According to one embodiment, the request advantageously includes a standardized request, such as PKCS10, embedded in, for example, an XML document. The request for a digital certificate may advantageously correspond to one or more certificate authorities and the one or more standard formats the certificate authorities require.

In step 950 the transaction engine 205 forwards this request to the certificate authority 115, who, in step 955, returns a digital certificate. The return digital certificate may advantageously be in a standardized format, such as PKCS7, or in a proprietary format of one or more of the certificate authorities 115. In step 960, the digital certificate is received by the transaction engine 205, and a copy is forwarded to the user and a copy is stored with the trust engine 110. The trust engine 110 stores a copy of the certificate such that the trust engine 110 will not need to rely on the availability of the certificate authority 115. For example, when the user desires to send a digital certificate, or a third party requests the user's digital certificate, the request for the digital certificate is typically sent to the certificate authority 115. However, if the certificate authority 115 is conducting maintenance or has been victim of a failure or security compromise, the digital certificate may not be available.

At any time after issuing the cryptographic keys, the cryptographic engine 220 may advantageously employ the data splitting process 800 described above such that the cryptographic keys are split into independently undecipherable randomized numbers. Similar to the authentication data, at step 965 the cryptographic engine 220 transfers the randomized numbers to the data storage facilities D1 through D4.

A skilled artisan will recognize from the disclosure herein that the user may request a digital certificate anytime after enrollment. Moreover, the communications between systems may advantageously include FULL SSL or public-key encryption technologies. Moreover, the enrollment process may issue multiple digital certificates from multiple certificate authorities, including one or more proprietary certificate authorities internal or external to the trust engine 110.

As disclosed in steps 935 through 960, one embodiment of the invention includes the request for a certificate that is eventually stored on the trust engine 110. Because, according to one embodiment, the cryptographic handling module 625 issues the keys used by the trust engine 110, each certificate corresponds to a private key. Therefore, the trust engine 110 may advantageously provide for interoperability through monitoring the certificates owned by, or associated with, a user. For example, when the cryptographic engine 220 receives a request for a cryptographic function, the cryptographic handling module 625 may investigate the certificates owned by the requesting user to determine whether the user owns a private key matching the attributes of the request. When such a certificate exists, the cryptographic handling module 625 may use the certificate or the public or private keys associated therewith, to perform the requested function. When such a certificate does not exist, the cryptographic handling module 625 may advantageously and transparently perform a number of actions to attempt to remedy the lack of an appropriate key. For example, FIG. 9B illustrates a flowchart of an interoperability process 970, which according to aspects of an embodiment of the invention, discloses the foregoing steps to ensure the cryptographic handling module 625 performs cryptographic functions using appropriate keys.

As shown in FIG. 9B, the interoperability process 970 begins with step 972 where the cryptographic handling module 925 determines the type of certificate desired. According to one embodiment of the invention, the type of certificate may advantageously be specified in the request for cryptographic functions, or other data provided by the requestor. According to another embodiment, the certificate type may be ascertained by the data format of the request. For example, the cryptographic handling module 925 may advantageously recognize the request corresponds to a particular type.

According to one embodiment, the certificate type may include one or more algorithm standards, for example, RSA, ELGAMAL, or the like. In addition, the certificate type may include one or more key types, such as symmetric keys, public keys, strong encryption keys such as 256 bit keys, less secure keys, or the like. Moreover, the certificate type may include upgrades or replacements of one or more of the foregoing algorithm standards or keys, one or more message or data formats, one or more data encapsulation or encoding schemes, such as Base 32 or Base 64. The certificate type may also include compatibility with one or more third-party cryptographic applications or interfaces, one or more communication protocols, or one or more certificate standards or protocols. A skilled artisan will recognize from the disclosure herein that other differences may exist in certificate types, and translations to and from those differences may be implemented as disclosed herein.

Once the cryptographic handling module 625 determines the certificate type, the interoperability process 970 proceeds to step 974, and determines whether the user owns a certificate matching the type determined in step 974. When the user owns a matching certificate, for example, the trust engine 110 has access to the matching certificate through, for example, prior storage thereof, the cryptographic handling module 825 knows that a matching private key is also stored within the trust engine 110. For example, the matching private key may be stored within the depository 210 or depository system 700. The cryptographic handling module 625 may advantageously request the matching private key be assembled from, for example, the depository 210, and then in step 976, use the matching private key to perform cryptographic actions or functions. For example, as mentioned in the foregoing, the cryptographic handling module 625 may advantageously perform hashing, hash comparisons, data encryption or decryption, digital signature verification or creation, or the like.

When the user does not own a matching certificate, the interoperability process 970 proceeds to step 978 where the cryptographic handling module 625 determines whether the users owns a cross-certified certificate. According to one embodiment, cross-certification between certificate authorities occurs when a first certificate authority determines to trust certificates from a second certificate authority. In other words, the first certificate authority determines that certificates from the second certificate authority meets certain quality standards, and therefore, may be "certified" as equivalent to the first certificate authority's own certificates. Cross-certification becomes more complex when the certificate authorities issue, for example, certificates having levels of trust. For example, the first certificate authority may provide three levels of trust for a particular certificate, usually based on the degree of reliability in the enrollment process, while the second certificate authority may provide seven levels of trust. Cross-certification may advantageously track which levels and which certificates from the second certificate authority may be substituted for which levels and which certificates from the first. When the foregoing cross-certification is done officially and publicly between two certification authorities, the mapping of certificates and levels to one another is often called "chaining."

According to another embodiment of the invention, the cryptographic handling module 625 may advantageously develop cross-certifications outside those agreed upon by the certificate authorities. For example, the cryptographic handling module 625 may access a first certificate authority's certificate practice statement (CPS), or other published policy statement, and using, for example, the authentication tokens required by particular trust levels, match the first certificate authority's certificates to those of another certificate authority.

When, in step 978, the cryptographic handling module 625 determines that the users owns a cross-certified certificate, the interoperability process 970 proceeds to step 976, and performs the cryptographic action or function using the cross-certified public key, private key, or both. Alternatively, when the cryptographic handling module 625 determines that the users does not own a cross-certified certificate, the interoperability process 970 proceeds to step 980, where the cryptographic handling module 625 selects a certificate authority that issues the requested certificate type, or a certificate cross-certified thereto. In step 982, the cryptographic handling module 625 determines whether the user enrollment authentication data, discussed in the foregoing, meets the authentication requirements of the chosen certificate authority. For example, if the user enrolled over a network by, for example, answering demographic and other questions, the authentication data provided may establish a lower level of trust than a user providing biometric data and appearing before a third-party, such as, for example, a notary. According to one embodiment, the foregoing authentication requirements may advantageously be provided in the chosen authentication authority's CPS.

When the user has provided the trust engine 110 with enrollment authentication data meeting the requirements of chosen certificate authority, the interoperability process 970 proceeds to step 984, where the cryptographic handling module 825 acquires the certificate from the chosen certificate authority. According to one embodiment, the cryptographic handling module 625 acquires the certificate by following steps 945 through 960 of the enrollment process 900. For example, the cryptographic handling module 625 may advantageously employ one or more public keys from one or more of the key pairs already available to the cryptographic engine 220, to request the certificate from the certificate authority. According to another embodiment, the cryptographic handling module 625 may advantageously generate one or more new key pairs, and use the public keys corresponding thereto, to request the certificate from the certificate authority.

According to another embodiment, the trust engine 110 may advantageously include one or more certificate issuing modules capable of issuing one or more certificate types. According to this embodiment, the certificate issuing module may provide the foregoing certificate. When the cryptographic handling module 625 acquires the certificate, the interoperability process 970 proceeds to step 976, and performs the cryptographic action or function using the public key, private key, or both corresponding to the acquired certificate.

When the user, in step 982, has not provided the trust engine 110 with enrollment authentication data meeting the requirements of chosen certificate authority, the cryptographic handling module 625 determines, in step 986 whether there are other certificate authorities that have different authentication requirements. For example, the cryptographic handling module 625 may look for certificate authorities having lower authentication requirements, but still issue the chosen certificates, or cross-certifications thereof.

When the foregoing certificate authority having lower requirements exists, the interoperability process 970 proceeds to step 980 and chooses that certificate authority. Alternatively, when no such certificate authority exists, in step 988, the trust engine 110 may request additional authentication tokens from the user. For example, the trust engine 110 may request new enrollment authentication data comprising, for example, biometric data. Also, the trust engine 110 may request the user appear before a trusted third party and provide appropriate authenticating credentials, such as, for example, appearing before a notary with a drivers license, social security card, bank card, birth certificate, military ID, or the like. When the trust engine 110 receives updated authentication data, the interoperability process 970 proceeds to step 984 and acquires the foregoing chosen certificate.

Through the foregoing interoperability process 970, the cryptographic handling module 625 advantageously provides seamless, transparent, translations and conversions between differing cryptographic systems. A skilled artisan will recognize from the disclosure herein, a wide number of advantages and implementations of the foregoing interoperable system. For example, the foregoing step 986 of the interoperability process 970 may advantageously include aspects of trust arbitrage, discussed in further detail below, where the certificate authority may under special circumstances accept lower levels of cross-certification. In addition, the interoperability process 970 may include ensuring interoperability between and employment of standard certificate revocations, such as employing certificate revocation lists (CRL), online certificate status protocols (OCSP), or the like.

FIG. 10 illustrates a data flow of an authentication process 1000 according to aspects of an embodiment of the invention. According to one embodiment, the authentication process 1000 includes gathering current authentication data from a user and comparing that to the enrollment authentication data of the user. For example, the authentication process 1000 begins at step 1005 where a user desires to perform a transaction with, for example, a vendor. Such transactions may include, for example, selecting a purchase option, requesting access to a restricted area or device of the vendor system 120, or the like. At step 1010, a vendor provides the user with a transaction ID and an authentication request. The transaction ID may advantageously include a 192 bit quantity having a 32 bit timestamp concatenated with a 128 bit random quantity, or a "nonce," concatenated with a 32 bit vendor specific constant. Such a transaction ID uniquely identifies the transaction such that copycat transactions can be refused by the trust engine 110.

The authentication request may advantageously include what level of authentication is needed for a particular transaction. For example, the vendor may specify a particular level of confidence that is required for the transaction at issue. If authentication cannot be made to this level of confidence, as will be discussed below, the transaction will not occur without either further authentication by the user to raise the level of confidence, or a change in the terms of the authentication between the vendor and the server. These issues are discussed more completely below.

According to one embodiment, the transaction ID and the authentication request may be advantageously generated by a vendor-side applet or other software program. In addition, the transmission of the transaction ID and authentication data may include one or more XML documents encrypted using conventional SSL technology, such as, for example, ½ SSL, or, in other words vendor-side authenticated SSL.

After the user system 105 receives the transaction ID and authentication request, the user system 105 gathers the current authentication data, potentially including current biometric information, from the user. The user system 105, at step 1015, encrypts at least the current authentication data "B" and the transaction ID, with the public key of the authentication engine 215, and transfers that data to the trust engine 110. The transmission preferably comprises XML documents encrypted with at least conventional SSL technology. In step 1020, the transaction engine 205 receives the transmission, preferably recognizes the data format or request in the URL or URI, and forwards the transmission to the authentication engine 215.

During steps 1015 and 1020, the vendor system 120, at step 1025, forwards the transaction ID and the authentication request to the trust engine 110, using the preferred FULL SSL technology. This communication may also include a vendor ID, although vendor identification may also be communicated through a non-random portion of the transaction ID. At steps 1030 and 1035, the transaction engine 205 receives the communication, creates a record in the audit trail, and generates a request for the user's enrollment authentication data to be assembled from the data storage facilities D1 through D4. At step 1040, the depository system 700 transfers the portions of the enrollment authentication data corresponding to the user to the authentication engine 215. At step 1045, the authentication engine 215 decrypts the transmission using its private key and compares the enrollment authentication data to the current authentication data provided by the user.

The comparison of step 1045 may advantageously apply heuristical context sensitive authentication, as referred to in the forgoing, and discussed in further detail below. For example, if the biometric information received does not match perfectly, a lower confidence match results. In particular embodiments, the level of confidence of the authentication is balanced against the nature of the transaction and the desires of both the user and the vendor. Again, this is discussed in greater detail below.

At step 1050, the authentication engine 215 fills in the authentication request with the result of the comparison of step 1045. According to one embodiment of the invention, the authentication request is filled with a YES/NO or TRUE/FALSE result of the authentication process 1000. In step 1055 the filled-in authentication request is returned to the vendor for the vendor to act upon, for example, allowing the user to complete the transaction that initiated the authentication request. According to one embodiment, a confirmation message is passed to the user.

Based on the foregoing, the authentication process 1000 advantageously keeps sensitive data secure and produces results configured to maintain the integrity of the sensitive data. For example, the sensitive data is assembled only inside the authentication engine 215. For example, the enrollment authentication data is undecipherable until it is assembled in the authentication engine 215 by the data assembling module, and the current authentication data is undecipherable until it is unwrapped by the conventional SSL technology and the private key of the authentication engine 215. Moreover, the authentication result transmitted to the vendor does not include the sensitive data, and the user may not even know whether he or she produced valid authentication data.

Although the authentication process 1000 is disclosed with reference to its preferred and alternative embodiments, the invention is not intended to be limited thereby. Rather, a skilled artisan will recognize from the disclosure herein, a wide number of alternatives for the authentication process 1000. For example, the vendor may advantageously be replaced by almost any requesting application, even those residing with the user system 105. For example, a client application, such as Microsoft Word, may use an application program interface (API) or a cryptographic API (CAPI) to request authentication before unlocking a document. Alternatively, a mail server, a network, a cellular phone, a personal or mobile computing device, a workstation, or the like, may all make authentication requests that can be filled by the authentication process 1000. In fact, after providing the foregoing trusted authentication process 1000, the requesting application or device may provide access to or use of a wide number of electronic or computer devices or systems.

Moreover, the authentication process 1000 may employ a wide number of alternative procedures in the event of authentication failure. For example, authentication failure may maintain the same transaction ID and request that the user reenter his or her current authentication data. As mentioned in the foregoing, use of the same transaction ID allows the comparator of the authentication engine 215 to monitor and limit the number of authentication attempts for a particular transaction, thereby creating a more secure cryptographic system 100.

In addition, the authentication process 1000 may be advantageously be employed to develop elegant single sign-on solutions, such as, unlocking a sensitive data vault. For example, successful or positive authentication may provide the authenticated user the ability to automatically access any number of passwords for an almost limitless number of systems and applications. For example, authentication of a user may provide the user access to password, login, financial credentials, or the like, associated with multiple online vendors, a local area network, various personal computing devices, Internet service providers, auction providers, investment brokerages, or the like. By employing a sensitive data vault, users may choose truly large and random passwords because they no longer need to remember them through association. Rather, the authentication process 1000 provides access thereto. For example, a user may choose a random alphanumeric string that is twenty plus digits in length rather than something associated with a memorable data, name, etc.

According to one embodiment, a sensitive data vault associated with a given user may advantageously be stored in the data storage facilities of the depository 210, or split and stored in the depository system 700. According to this embodiment, after positive user authentication, the trust engine 110 serves the requested sensitive data, such as, for example, to the appropriate password to the requesting application. According to another embodiment, the trust engine 110 may include a separate system for storing the sensitive data vault. For example, the trust engine 110 may include a stand-alone software engine implementing the data vault functionality and figuratively residing "behind" the foregoing front-end security system of the trust engine 110. According to this embodiment, the software engine serves the requested sensitive data after the software engine receives a signal indicating positive user authentication from the trust engine 110.

In yet another embodiment, the data vault may be implemented by a third-party system. Similar to the software engine embodiment, the third-party system may advantageously serve the requested sensitive data after the third-party system receives a signal indicating positive user authentication from the trust engine 110. According to yet another embodiment, the data vault may be implemented on the user system 105. A user-side software engine may advantageously serve the foregoing data after receiving a signal indicating positive user authentication from the trust engine 110.

Although the foregoing data vaults are disclosed with reference to alternative embodiments, a skilled artisan will recognize from the disclosure herein, a wide number of additional implementations thereof. For example, a particular data vault may include aspects from some or all of the foregoing embodiments. In addition, any of the foregoing data vaults may employ one or more authentication requests at varying times. For example, any of the data vaults may require authentication every one or more transactions, periodically, every one or more sessions, every access to one or more Webpages or Websites, at one or more other specified intervals, or the like.

FIG. 11 illustrates a data flow of a signing process 1100 according to aspects of an embodiment of the invention. As shown in FIG. 11, the signing process 1100 includes steps similar to those of the authentication process 1000 described in the foregoing with reference to FIG. 10. According to one embodiment of the invention, the signing process 1100 first authenticates the user and then performs one or more of several digital signing functions as will be discussed in further detail below. According to another embodiment, the signing process 1100 may advantageously store data related thereto, such as hashes of messages or documents, or the like. This data may advantageously be used in an audit or any other event, such as for example, when a participating party attempts to repudiate a transaction.

As shown in FIG. 11, during the authentication steps, the user and vendor may advantageously agree on a message, such as, for example, a contract. During signing, the signing process 1100 advantageously ensures that the contract signed by the user is identical to the contract supplied by the vendor. Therefore, according to one embodiment, during authentication, the vendor and the user include a hash of their respective copies of the message or contract, in the data transmitted to the authentication engine 215. By employing only a hash of a message or contract, the trust engine 110 may advantageously store a significantly reduced amount of data, providing for a more efficient and cost effective cryptographic system. In addition, the stored hash may be advantageously compared to a hash of a document in question to determine whether the document in question matches one signed by any of the parties. The ability to determine whether the document is identical to one relating to a transaction provides for additional evidence that can be used against a claim for repudiation by a party to a transaction.

In step 1103, the authentication engine 215 assembles the enrollment authentication data and compares it to the current authentication data provided by the user. When the comparator of the authentication engine 215 indicates that the enrollment authentication data matches the current authentication data, the comparator of the authentication engine 215 also compares the hash of the message supplied by the vendor to the hash of the message supplied by the user. Thus, the authentication engine 215 advantageously ensures that the message agreed to by the user is identical to that agreed to by the vendor.

In step 1105, the authentication engine 215 transmits a digital signature request to the cryptographic engine 220. According to one embodiment of the invention, the request includes a hash of the message or contract. However, a skilled artisan will recognize from the disclosure herein that the cryptographic engine 220 may encrypt virtually any type of data, including, but not limited to, video, audio, biometrics, images or text to form the desired digital signature. Returning to step 1105, the digital signature request preferably comprises an XML document communicated through conventional SSL technologies.

In step 1110, the authentication engine 215 transmits a request to each of the data storage facilities D1 through D4, such that each of the data storage facilities D1 through D4 transmit their respective portion of the cryptographic key or keys corresponding to a signing party. According to another embodiment, the cryptographic engine 220 employs some or all of the steps of the interoperability process 970 discussed in the foregoing, such that the cryptographic engine 220 first determines the appropriate key or keys to request from the depository 210 or the depository system 700 for the signing party, and takes actions to provide appropriate matching keys. According to still another embodiment, the authentication engine 215 or the cryptographic engine 220 may advantageously request one or more of the keys associated with the signing party and stored in the depository 210 or depository system 700.

According to one embodiment, the signing party includes one or both the user and the vendor. In such case, the authentication engine 215 advantageously requests the cryptographic keys corresponding to the user and/or the vendor. According to another embodiment, the signing party includes the trust engine 110. In this embodiment, the trust engine 110 is certifying that the authentication process 1000 properly authenticated the user, vendor, or both. Therefore, the authentication engine 215 requests the cryptographic key of the trust engine 110, such as, for example, the key belonging to the cryptographic engine 220, to perform the digital signature. According to another embodiment, the trust engine 110 performs a digital notary-like function. In this embodiment, the signing party includes the user, vendor, or both, along with the trust engine 110. Thus, the trust engine 110 provides the digital signature of the user and/or vendor, and then indicates with its own digital signature that the user and/or vendor were properly authenticated. In this embodiment, the authentication engine 215 may advantageously request assembly of the cryptographic keys corresponding to the user, the vendor, or both. According to another embodiment, the authentication engine 215 may advantageously request assembly of the cryptographic keys corresponding to the trust engine 110.

According to another embodiment, the trust engine 110 performs power of attorney-like functions. For example, the trust engine 110 may digitally sign the message on behalf of a third party. In such case, the authentication engine 215 requests the cryptographic keys associated with the third party. According to this embodiment, the signing process 1100 may advantageously include authentication of the third party, before allowing power of attorney-like functions. In addition, the authentication process 1000 may include a check for third party constraints, such as, for example, business logic or the like dictating when and in what circumstances a particular third-party's signature may be used.

Based on the foregoing, in step 1110, the authentication engine requested the cryptographic keys from the data storage facilities D1 through D4 corresponding to the signing party. In step 1115, the data storage facilities D1 through D4 transmit their respective portions of the cryptographic key corresponding to the signing party to the cryptographic engine 220. According to one embodiment, the foregoing transmissions include SSL technologies. According to another embodiment, the foregoing transmissions may advantageously be super-encrypted with the public key of the cryptographic engine 220.

In step 1120, the cryptographic engine 220 assembles the foregoing cryptographic keys of the signing party and encrypts the message therewith, thereby forming the digital signature(s). In step 1125 of the signing process 1100, the cryptographic engine 220 transmits the digital signature(s) to the authentication engine 215. In step 1130, the authentication engine 215 transmits the filled-in authentication request along with a copy of the hashed message and the digital signature(s) to the transaction engine 205. In step 1135, the transaction engine 205 transmits a receipt comprising the transaction ID, an indication of whether the authentication was successful, and the digital signature(s), to the vendor. According to one embodiment, the foregoing transmission may advantageously include the digital signature of the trust engine 110. For example, the trust engine 110 may encrypt the hash of the receipt with its private key, thereby forming a digital signature to be attached to the transmission to the vendor.

According to one embodiment, the transaction engine 205 also transmits a confirmation message to the user. Although the signing process 1100 is disclosed with reference to its preferred and alternative embodiments, the invention is not intended to be limited thereby. Rather, a skilled artisan will recognize from the disclosure herein, a wide number of alternatives for the signing process 1100. For example, the vendor may be replaced with a user application, such as an email application. For example, the user may wish to digitally sign a particular email with his or her digital signature. In such an embodiment, the transmission throughout the signing process 1100 may advantageously include only one copy of a hash of the message. Moreover, a skilled artisan will recognize from the disclosure herein that a wide number of client applications may request digital signatures. For example, the client applications may comprise word processors, spreadsheets, emails, voicemail, access to restricted system areas, or the like.

In addition, a skilled artisan will recognize from the disclosure herein that steps 1105 through 1120 of the signing process 1100 may advantageously employ some or all of the steps of the interoperability process 970 of FIG. 9B, thereby providing interoperability between differing cryptographic systems that may, for example, need to process the digital signature under differing signature types.

FIG. 12 illustrates a data flow of an encryption/decryption process 1200 according to aspects of an embodiment of the invention. As shown in FIG. 12, the decryption process 1200 begins by authenticating the user using the authentication process 1000. According to one embodiment, the authentication process 1000 includes in the authentication request, a synchronous session key. For example, in conventional PKI technologies, it is understood by skilled artisans that encrypting or decrypting data using public and private keys is mathematically intensive and may require significant system resources. However, in symmetric key cryptographic systems, or systems where the sender and receiver of a message share a single common key that is used to encrypt and decrypt a message, the mathematical operations are significantly simpler and faster. Thus, in the conventional PKI technologies, the sender of a message will generate synchronous session key, and encrypt the message using the simpler, faster symmetric key system. Then, the sender will encrypt the session key with the public key of the receiver. The encrypted session key will be attached to the synchronously encrypted message and both data are sent to the receiver. The receiver uses his or her private key to decrypt the session key, and then uses the session key to decrypt the message. Based on the foregoing, the simpler and faster symmetric key system is used for the majority of the encryption/decryption processing. Thus, in the decryption process 1200, the decryption advantageously assumes that a synchronous key has been encrypted with the public key of the user. Thus, as mentioned in the foregoing, the encrypted session key is included in the authentication request.

Returning to the decryption process 1200, after the user has been authenticated in step 1205, the authentication engine 215 forwards the encrypted session key to the cryptographic engine 220. In step 1210, the authentication engine 215 forwards a request to each of the data storage facilities, D1 through D4, requesting the cryptographic key data of the user. In step 1215, each data storage facility, D1 through D4, transmits their respective portion of the cryptographic key to the cryptographic engine 220. According to one embodiment, the foregoing transmission is encrypted with the public key of the cryptographic engine 220.

In step 1220 of the decryption process 1200, the cryptographic engine 220 assembles the cryptographic key and decrypts the session key therewith. In step 1225, the cryptographic engine forwards the session key to the authentication engine 215. In step 1227, the authentication engine 215 fills in the authentication request including the decrypted session key, and transmits the filled-in authentication request to the transaction engine 205. In step 1230, the transaction engine 205 forwards the authentication request along with the session key to the requesting application or vendor. Then, according to one embodiment, the requesting application or vendor uses the session key to decrypt the encrypted message.

Although the decryption process 1200 is disclosed with reference to its preferred and alternative embodiments, a skilled artisan will recognize from the disclosure herein, a wide number of alternatives for the decryption process 1200. For example, the decryption process 1200 may forego synchronous key encryption and rely on full public-key technology. In such an embodiment, the requesting application may transmit the entire message to the cryptographic engine 220, or, may employ some type of compression or reversible hash in order to transmit the message to the cryptographic engine 220. A skilled artisan will also recognize from the disclosure herein that the foregoing communications may advantageously include XML documents wrapped in SSL technology.

The encryption/decryption process 1200 also provides for encryption of documents or other data. Thus, in step 1235, a requesting application or vendor may advantageously transmit to the transaction engine 205 of the trust engine 110, a request for the public key of the user. The requesting application or vendor makes this request because the requesting application or vendor uses the public key of the user, for example, to encrypt the session key that will be used to encrypt the document or message. As mentioned in the enrollment process 900, the transaction engine 205 stores a copy of the digital certificate of the user, for example, in the mass storage 225. Thus, in step 1240 of the encryption process 1200, the transaction engine 205 requests the digital certificate of the user from the mass storage 225. In step 1245, the mass storage 225 transmits the digital certificate corresponding to the user, to the transaction engine 205. In step 1250, the transaction engine 205 transmits the digital certificate to the requesting application or vendor. According to one embodiment, the encryption portion of the encryption process 1200 does not include the authentication of a user. This is because the requesting vendor needs only the public key of the user, and is not requesting any sensitive data.

A skilled artisan will recognize from the disclosure herein that if a particular user does not have a digital certificate, the trust engine 110 may employ some or all of the enrollment process 900 in order to generate a digital certificate for that particular user. Then, the trust engine 110 may initiate the encryption/decryption process 1200 and thereby provide the appropriate digital certificate. In addition, a skilled artisan will recognize from the disclosure herein that steps 1220 and 1235 through 1250 of the encryption/decryption process 1200 may advantageously employ some or all of the steps of the interoperability process of FIG. 9B, thereby providing interoperability between differing cryptographic systems that may, for example, need to process the encryption.

Figure 13:
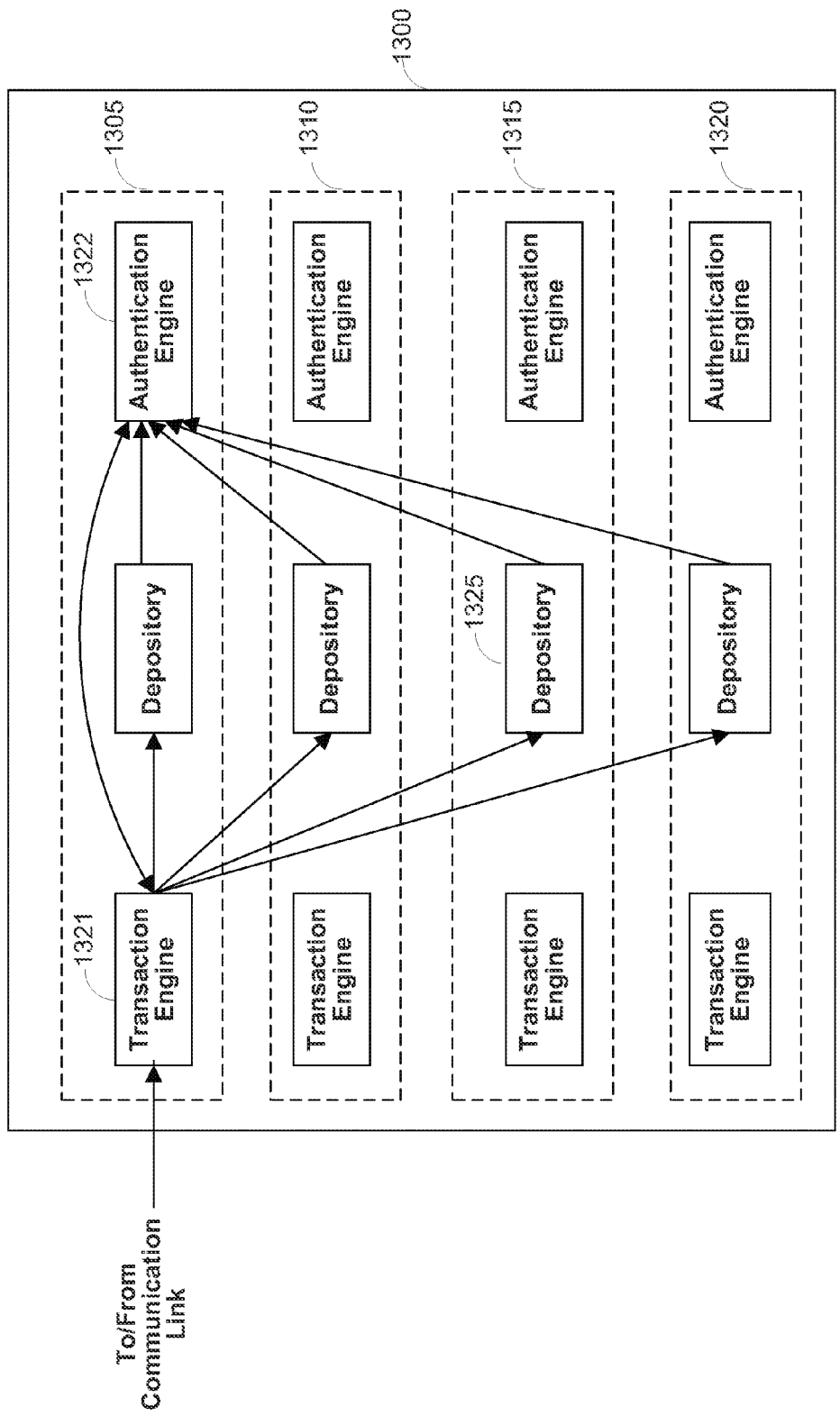
FIG. 13 illustrates a simplified block diagram of a trust engine system according to aspects of another embodiment of the invention.

FIG. 13 illustrates a simplified block diagram of a trust engine system 1300 according to aspects of yet another embodiment of the invention. As shown in FIG. 13, the trust engine system 1300 comprises a plurality of distinct trust engines 1305, 1310, 1315, and 1320, respectively. To facilitate a more complete understanding of the invention, FIG. 13 illustrates each trust engine, 1305, 1310, 1315, and 1320 as having a transaction engine, a depository, and an authentication engine. However, a skilled artisan will recognize that each transaction engine may advantageously comprise some, a combination, or all of the elements and communication channels disclosed with reference to FIGS. 1-8. For example, one embodiment may advantageously include trust engines having one or more transaction engines, depositories, and cryptographic servers or any combinations thereof.

According to one embodiment of the invention, each of the trust engines 1305, 1310, 1315 and 1320 are geographically separated, such that, for example, the trust engine 1305 may reside in a first location, the trust engine 1310 may reside in a second location, the trust engine 1315 may reside in a third location, and the trust engine 1320 may reside in a fourth location. The foregoing geographic separation advantageously decreases system response time while increasing the security of the overall trust engine system 1300.

For example, when a user logs onto the cryptographic system 100, the user may be nearest the first location and may desire to be authenticated. As described with reference to FIG. 10, to be authenticated, the user provides current authentication data, such as a biometric or the like, and the current authentication data is compared to that user's enrollment authentication data. Therefore, according to one example, the user advantageously provides current authentication data to the geographically nearest trust engine 1305. The transaction engine 1321 of the trust engine 1305 then forwards the current authentication data to the authentication engine 1322 also residing at the first location. According to another embodiment, the transaction engine 1321 forwards the current authentication data to one or more of the authentication engines of the trust engines 1310, 1315, or 1320.

The transaction engine 1321 also requests the assembly of the enrollment authentication data from the depositories of, for example, each of the trust engines, 1305 through 1320. According to this embodiment, each depository provides its portion of the enrollment authentication data to the authentication engine 1322 of the trust engine 1305. The authentication engine 1322 then employs the encrypted data portions from, for example, the first two depositories to respond, and assembles the enrollment authentication data into deciphered form. The authentication engine 1322 compares the enrollment authentication data with the current authentication data and returns an authentication result to the transaction engine 1321 of the trust engine 1305.

Based on the above, the trust engine system 1300 employs the nearest one of a plurality of geographically separated trust engines, 1305 through 1320, to perform the authentication process. According to one embodiment of the invention, the routing of information to the nearest transaction engine may advantageously be performed at client-side applets executing on one or more of the user system 105, vendor system 120, or certificate authority 115. According to an alternative embodiment, a more sophisticated decision process may be employed to select from the trust engines 1305 through 1320. For example, the decision may be based on the availability, operability, speed of connections, load, performance, geographic proximity, or a combination thereof, of a given trust engine.

In this way, the trust engine system 1300 lowers its response time while maintaining the security advantages associated with geographically remote data storage facilities, such as those discussed with reference to FIG. 7 where each data storage facility stores randomized portions of sensitive data. For example, a security compromise at, for example, the depository 1325 of the trust engine 1315 does not necessarily compromise the sensitive data of the trust engine system 1300. This is because the depository 1325 contains only non-decipherable randomized data that, without more, is entirely useless.

According to another embodiment, the trust engine system 1300 may advantageously include multiple cryptographic engines arranged similar to the authentication engines. The cryptographic engines may advantageously perform cryptographic functions such as those disclosed with reference to FIGS. 1-8.

According to yet another embodiment, the trust engine system 1300 may advantageously replace the multiple authentication engines with multiple cryptographic engines, thereby performing cryptographic functions such as those disclosed with reference to FIGS. 1-8. According to yet another embodiment of the invention, the trust engine system 1300 may replace each multiple authentication engine with an engine having some or all of the functionality of the authentication engines, cryptographic engines, or both, as disclosed in the foregoing, Although the trust engine system 1300 is disclosed with reference to its preferred and alternative embodiments, a skilled artisan will recognize that the trust engine system 1300 may comprise portions of trust engines 1305 through 1320. For example, the trust engine system 1300 may include one or more transaction engines, one or more depositories, one or more authentication engines, or one or more cryptographic engines or combinations thereof.

Figure 14:
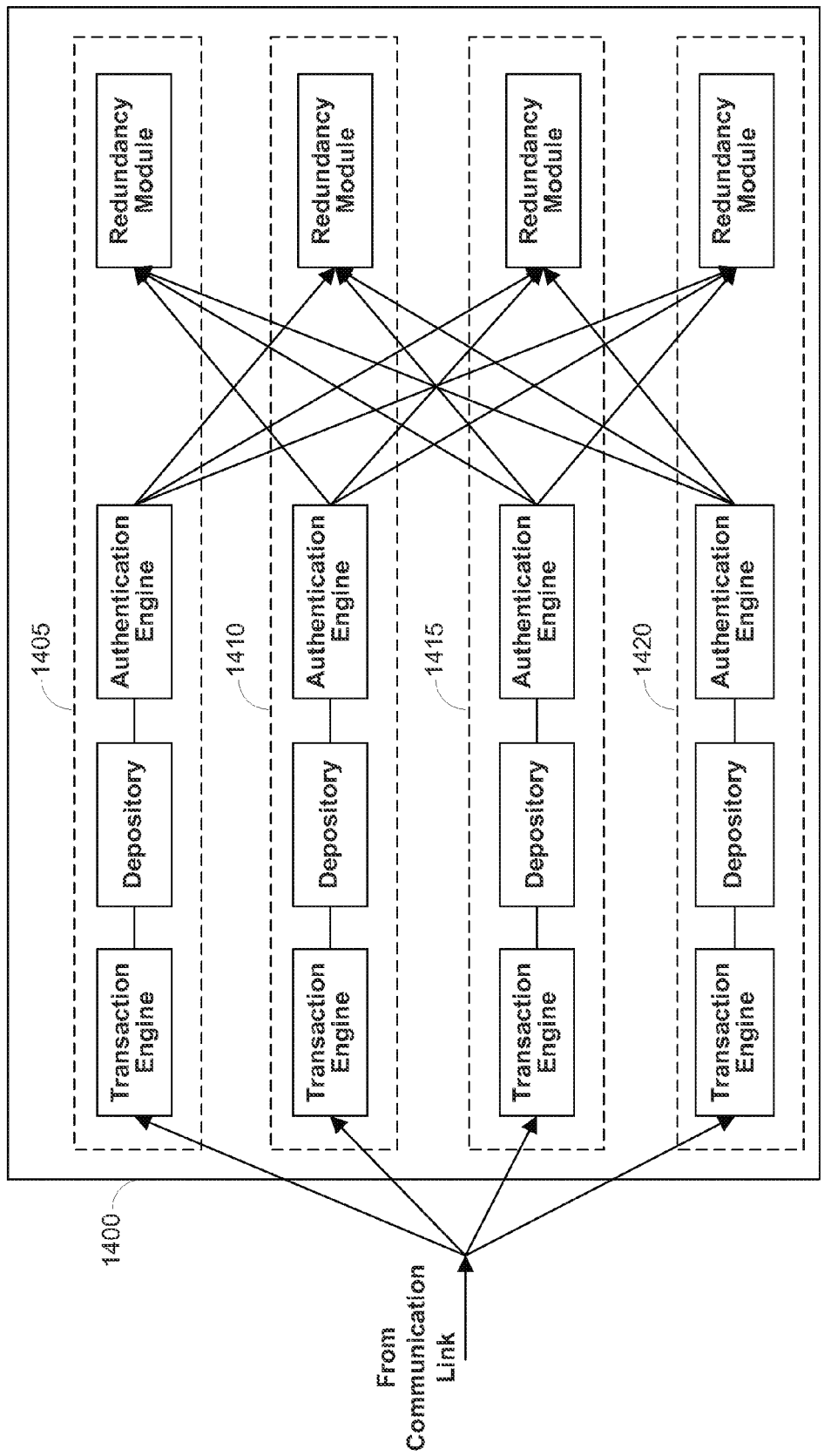
FIG. 14 illustrates a simplified block diagram of a trust engine system according to aspects of another embodiment of the invention.

FIG. 14 illustrates a simplified block diagram of a trust engine System 1400 according to aspects of yet another embodiment of the invention. As shown in FIG. 14, the trust engine system 1400 includes multiple trust engines 1405, 1410, 1415 and 1420. According to one embodiment, each of the trust engines 1405, 1410, 1415 and 1420, comprise some or all of the elements of trust engine 110 disclosed with reference to FIGS. 1-8. According to this embodiment, when the client side applets of the user system 105, the vendor system 120, or the certificate authority 115, communicate with the trust engine system 1400, those communications are sent to the IP address of each of the trust engines 1405 through 1420. Further, each transaction engine of each of the trust engines, 1405, 1410, 1415, and 1420, behaves similar to the transaction engine 1321 of the trust engine 1305 disclosed with reference to FIG. 13. For example, during an authentication process, each transaction engine of each of the trust engines 1405, 1410, 1415, and 1420 transmits the current authentication data to their respective authentication engines and transmits a request to assemble the randomized data stored in each of the depositories of each of the trust engines 1405 through 1420. FIG. 14 does not illustrate all of these communications; as such illustration would become overly complex. Continuing with the authentication process, each of the depositories then communicates its portion of the randomized data to each of the authentication engines of the each of the trust engines 1405 through 1420. Each of the authentication engines of the each of the trust engines employs its comparator to determine whether the current authentication data matches the enrollment authentication data provided by the depositories of each of the trust engines 1405 through 1420. According to this embodiment, the result of the comparison by each of the authentication engines is then transmitted to a redundancy module of the other three trust engines. For example, the result of the authentication engine from the trust engine 1405 is transmitted to the redundancy modules of the trust engines 1410, 1415, and 1420. Thus, the redundancy module of the trust engine 1405 likewise receives the result of the authentication engines from the trust engines 1410, 1415, and 1420.

Figure 15:
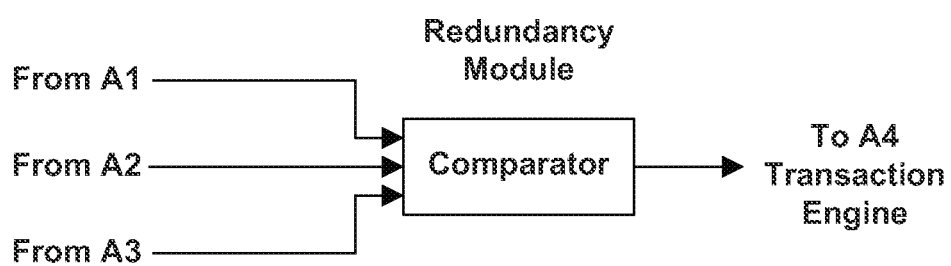
FIG. 15 illustrates a block diagram of the redundancy module of FIG. 14, according to aspects of an embodiment of the invention.

FIG. 15 illustrates a block diagram of the redundancy module of FIG. 14. The redundancy module comprises a comparator configured to receive the authentication result from three authentication engines and transmit that result to the transaction engine of the fourth trust engine. The comparator compares the authentication result form the three authentication engines, and if two of the results agree, the comparator concludes that the authentication result should match that of the two agreeing authentication engines. This result is then transmitted back to the transaction engine corresponding to the trust engine not associated with the three authentication engines.

Based on the foregoing, the redundancy module determines an authentication result from data received from authentication engines that are preferably geographically remote from the trust engine of that the redundancy module. By providing such redundancy functionality, the trust engine system 1400 ensures that a compromise of the authentication engine of one of the trust engines 1405 through 1420, is insufficient to compromise the authentication result of the redundancy module of that particular trust engine. A skilled artisan will recognize that redundancy module functionality of the trust engine system 1400 may also be applied to the cryptographic engine of each of the trust engines 1405 through 1420. However, such cryptographic engine communication was not shown in FIG. 14 to avoid complexity. Moreover, a skilled artisan will recognize a wide number of alternative authentication result conflict resolution algorithms for the comparator of FIG. 15 are suitable for use in the present invention.

According to yet another embodiment of the invention, the trust engine system 1400 may advantageously employ the redundancy module during cryptographic comparison steps. For example, some or all of the foregoing redundancy module disclosure with reference to FIGS. 14 and 15 may advantageously be implemented during a hash comparison of documents provided by one or more parties during a particular transaction.

Although the foregoing invention has been described in terms of certain preferred and alternative embodiments, other embodiments will be apparent to those of ordinary skill in the art from the disclosure herein. For example, the trust engine 110 may issue short-term certificates, where the private cryptographic key is released to the user for a predetermined period of time. For example, current certificate standards include a validity field that can be set to expire after a predetermined amount of time. Thus, the trust engine 110 may release a private key to a user where the private key would be valid for, for example, 24 hours. According to such an embodiment, the trust engine 110 may advantageously issue a new cryptographic key pair to be associated with a particular user and then release the private key of the new cryptographic key pair. Then, once the private cryptographic key is released, the trust engine 110 immediately expires any internal valid use of such private key, as it is no longer securable by the trust engine 110.

In addition, a skilled artisan will recognize that the cryptographic system 100 or the trust engine 110 may include the ability to recognize any type of devices, such as, but not limited to, a laptop, a cell phone, a network, a biometric device or the like.

According to one embodiment, such recognition may come from data supplied in the request for a particular service, such as, a request for authentication leading to access or use, a request for cryptographic functionality, or the like. According to one embodiment, the foregoing request may include a unique device identifier, such as, for example, a processor ID. Alternatively, the request may include data in a particular recognizable data format. For example, mobile and satellite phones often do not include the processing power for full X509.v3 heavy encryption certificates, and therefore do not request them. According to this embodiment, the trust engine 110 may recognize the type of data format presented, and respond only in kind.

Figure 16:
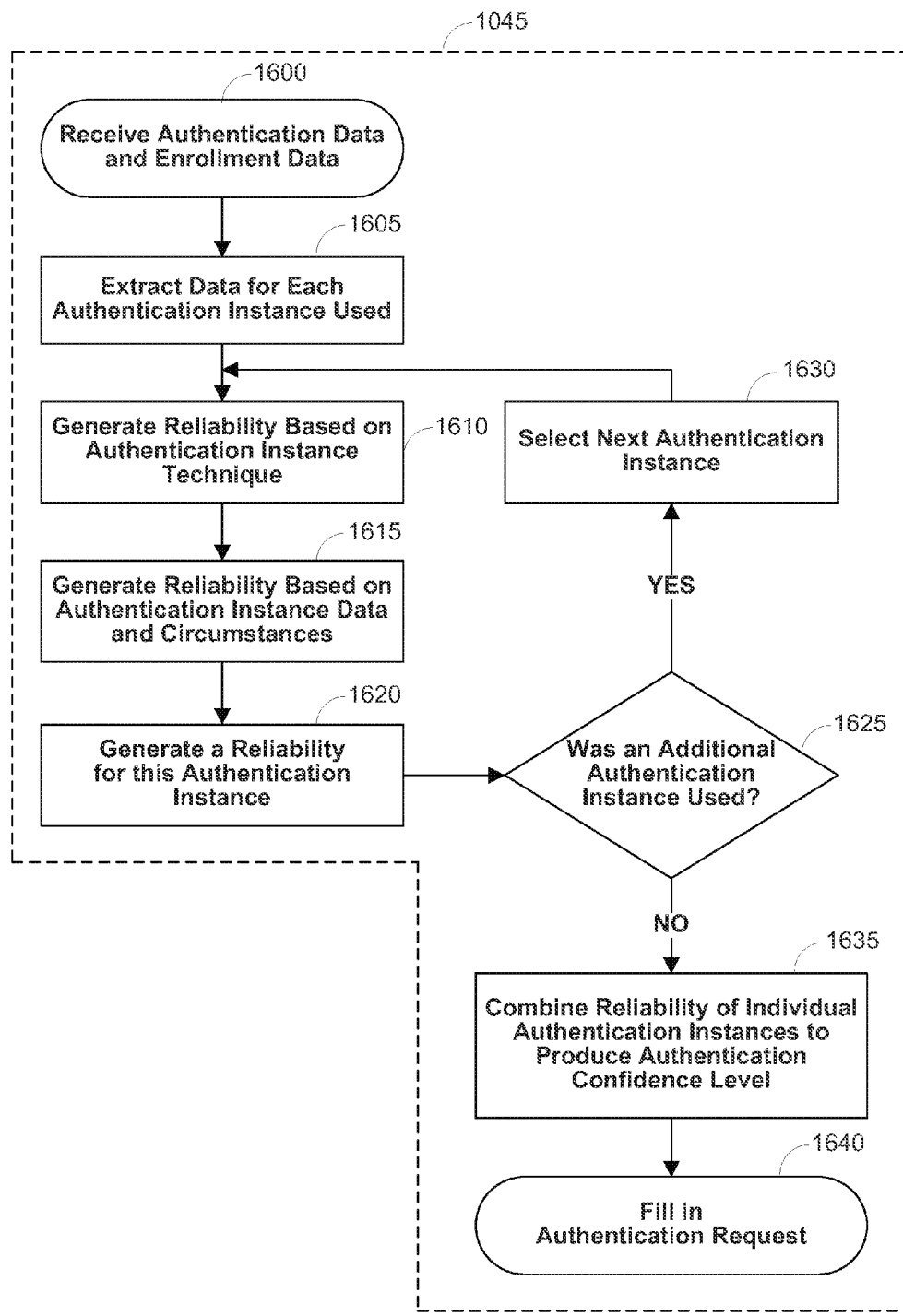
FIG. 16 illustrates a process for evaluating authentications according to one aspect of the invention.

In an additional aspect of the system described above, context sensitive authentication can be provided using various techniques as will be described below. Context sensitive authentication, for example as shown in FIG. 16, provides the possibility of evaluating not only the actual data which is sent by the user when attempting to authenticate himself, but also the circumstances surrounding the generation and delivery of that data. Such techniques may also support transaction specific trust arbitrage between the user and trust engine 110 or between the vendor and trust engine 110, as will be described below.

As discussed above, authentication is the process of proving that a user is who he says he is. Generally, authentication requires demonstrating some fact to an authentication authority. The trust engine 110 of the present invention represents the authority to which a user must authenticate himself. The user must demonstrate to the trust engine 110 that he is who he says he is by either: knowing something that only the user should know (knowledge-based authentication), having something that only the user should have (token-based authentication), or by being something that only the user should be (biometric-based authentication).

Examples of knowledge-based authentication include without limitation a password, PIN number, or lock combination. Examples of token-based authentication include without limitation a house key, a physical credit card, a driver's license, or a particular phone number. Examples of biometric-based authentication include without limitation a fingerprint, handwriting analysis, facial scan, hand scan, ear scan, iris scan, vascular pattern, DNA, a voice analysis, or a retinal scan.

Each type of authentication has particular advantages and disadvantages, and each provides a different level of security. For example, it is generally harder to create a false fingerprint that matches someone else's than it is to overhear someone's password and repeat it. Each type of authentication also requires a different type of data to be known to the authenticating authority in order to verify someone using that form of authentication.

As used herein, "authentication" will refer broadly to the overall process of verifying someone's identity to be who he says he is. An "authentication technique" will refer to a particular type of authentication based upon a particular piece of knowledge, physical token, or biometric reading. "Authentication data" refers to information which is sent to or otherwise demonstrated to an authentication authority in order to establish identity. "Enrollment data" will refer to the data which is initially submitted to an authentication authority in order to establish a baseline for comparison with authentication data. An "authentication instance" will refer to the data associated with an attempt to authenticate by an authentication technique.

The internal protocols and communications involved in the process of authenticating a user is described with reference to FIG. 10 above. The part of this process within which the context sensitive authentication takes place occurs within the comparison step shown as step 1045 of FIG. 10. This step takes place within the authentication engine 215 and involves assembling the enrollment data 410 retrieved from the depository 210 and comparing the authentication data provided by the user to it. One particular embodiment of this process is shown in FIG. 16 and described below.

The current authentication data provided by the user and the enrollment data retrieved from the depository 210 are received by the authentication engine 215 in step 1600 of FIG. 16. Both of these sets of data may contain data which is related to separate techniques of authentication. The authentication engine 215 separates the authentication data associated with each individual authentication instance in step 1605. This is necessary so that the authentication data is compared with the appropriate subset of the enrollment data for the user (e.g. fingerprint authentication data should be compared with fingerprint enrollment data, rather than password enrollment data).

Generally, authenticating a user involves one or more individual authentication instances, depending on which authentication techniques are available to the user. These methods are limited by the enrollment data which were provided by the user during his enrollment process (if the user did not provide a retinal scan when enrolling, he will not be able to authenticate himself using a retinal scan), as well as the means which may be currently available to the user (e.g. if the user does not have a fingerprint reader at his current location, fingerprint authentication will not be practical). In some cases, a single authentication instance may be sufficient to authenticate a user; however, in certain circumstances a combination of multiple authentication instances may be used in order to more confidently authenticate a user for a particular transaction.

Each authentication instance consists of data related to a particular authentication technique (e.g. fingerprint, password, smart card, etc.) and the circumstances which surround the capture and delivery of the data for that particular technique. For example, a particular instance of attempting to authenticate via password will generate not only the data related to the password itself, but also circumstantial data, known as "metadata", related to that password attempt. This circumstantial data includes information such as: the time at which the particular authentication instance took place, the network address from which the authentication information was delivered, as well as any other information as is known to those of skill in the art which may be determined about the origin of the authentication data (the type of connection, the processor serial number, etc.).

In many cases, only a small amount of circumstantial metadata will be available. For example, if the user is located on a network which uses proxies or network address translation or another technique which masks the address of the originating computer, only the address of the proxy or router may be determined. Similarly, in many cases information such as the processor serial number will not be available because of either limitations of the hardware or operating system being used, disabling of such features by the operator of the system, or other limitations of the connection between the user's system and the trust engine 110.

As shown in FIG. 16, once the individual authentication instances represented within the authentication data are extracted and separated in step 1605, the authentication engine 215 evaluates each instance for its reliability in indicating that the user is who he claims to be. The reliability for a single authentication instance will generally be determined based on several factors. These may be grouped as factors relating to the reliability associated with the authentication technique, which are evaluated in step 1610, and factors relating to the reliability of the particular authentication data provided, which are evaluated in step 1815. The first group includes without limitation the inherent reliability of the authentication technique being used, and the reliability of the enrollment data being used with that method. The second group includes without limitation the degree of match between the enrollment data and the data provided with the authentication instance, and the metadata associated with that authentication instance. Each of these factors may vary independently of the others.

The inherent reliability of an authentication technique is based on how hard it is for an imposter to provide someone else's correct data, as well as the overall error rates for the authentication technique. For passwords and knowledge based authentication methods, this reliability is often fairly low because there is nothing that prevents someone from revealing their password to another person and for that second person to use that password. Even a more complex knowledge based system may have only moderate reliability since knowledge may be transferred from person to person fairly easily. Token based authentication, such as having a proper smart card or using a particular terminal to perform the authentication, is similarly of low reliability used by itself, since there is no guarantee that the right person is in possession of the proper token.

However, biometric techniques are more inherently reliable because it is generally difficult to provide someone else with the ability to use your fingerprints in a convenient manner, even intentionally. Because subverting biometric authentication techniques is more difficult, the inherent reliability of biometric methods is generally higher than that of purely knowledge or token based authentication techniques. However, even biometric techniques may have some occasions in which a false acceptance or false rejection is generated. These occurrences may be reflected by differing reliabilities for different implementations of the same biometric technique. For example, a fingerprint matching system provided by one company may provide a higher reliability than one provided by a different company because one uses higher quality optics or a better scanning resolution or some other improvement which reduces the occurrence of false acceptances or false rejections.

Note that this reliability may be expressed in different manners. The reliability is desirably expressed in some metric which can be used by the heuristics 530 and algorithms of the authentication engine 215 to calculate the confidence level of each authentication. One preferred mode of expressing these reliabilities is as a percentage or fraction. For instance, fingerprints might be assigned an inherent reliability of 97%, while passwords might only be assigned an inherent reliability of 50%. Those of skill in the art will recognize that these particular values are merely exemplary and may vary between specific implementations.

The second factor for which reliability must be assessed is the reliability of the enrollment. This is part of the "graded enrollment" process referred to above. This reliability factor reflects the reliability of the identification provided during the initial enrollment process. For instance, if the individual initially enrolls in a manner where they physically produce evidence of their identity to a notary or other public official, and enrollment data is recorded at that time and notarized, the data will be more reliable than data which is provided over a network during enrollment and only vouched for by a digital signature or other information which is not truly tied to the individual.

Other enrollment techniques with varying levels of reliability include without limitation: enrollment at a physical office of the trust engine 110 operator; enrollment at a user's place of employment; enrollment at a post office or passport office; enrollment through an affiliated or trusted party to the trust engine 110 operator; anonymous or pseudonymous enrollment in which the enrolled identity is not yet identified with a particular real individual, as well as such other means as are known in the art.

These factors reflect the trust between the trust engine 110 and the source of identification provided during the enrollment process. For instance, if enrollment is performed in association with an employer during the initial process of providing evidence of identity, this information may be considered extremely reliable for purposes within the company, but may be trusted to a lesser degree by a government agency, or by a competitor. Therefore, trust engines operated by each of these other organizations may assign different levels of reliability to this enrollment.

Similarly, additional data which is submitted across a network, but which is authenticated by other trusted data provided during a previous enrollment with the same trust engine 110 may be considered as reliable as the original enrollment data was, even though the latter data were submitted across an open network. In such circumstances, a subsequent notarization will effectively increase the level of reliability associated with the original enrollment data. In this way for example, an anonymous or pseudonymous enrollment may then be raised to a full enrollment by demonstrating to some enrollment official the identity of the individual matching the enrolled data.

The reliability factors discussed above are generally values which may be determined in advance of any particular authentication instance. This is because they are based upon the enrollment and the technique, rather than the actual authentication. In one embodiment, the step of generating reliability based upon these factors involves looking up previously determined values for this particular authentication technique and the enrollment data of the user. In a further aspect of an advantageous embodiment of the present invention, such reliabilities may be included with the enrollment data itself. In this way, these factors are automatically delivered to the authentication engine 215 along with the enrollment data sent from the depository 210.

While these factors may generally be determined in advance of any individual authentication instance, they still have an effect on each authentication instance which uses that particular technique of authentication for that user. Furthermore, although the values may change over time (e.g. if the user re-enrolls in a more reliable fashion), they are not dependent on the authentication data itself. By contrast, the reliability factors associated with a single specific instance's data may vary on each occasion. These factors, as discussed below, must be evaluated for each new authentication in order to generate reliability scores in step 1815.

The reliability of the authentication data reflects the match between the data provided by the user in a particular authentication instance and the data provided during the authentication enrollment. This is the fundamental question of whether the authentication data matches the enrollment data for the individual the user is claiming to be. Normally, when the data do not match, the user is considered to not be successfully authenticated, and the authentication fails. The manner in which this is evaluated may change depending on the authentication technique used. The comparison of such data is performed by the comparator 515 function of the authentication engine 215 as shown in FIG. 5.

For instance, matches of passwords are generally evaluated in a binary fashion. In other words, a password is either a perfect match, or a failed match. It is usually not desirable to accept as even a partial match a password which is close to the correct password if it is not exactly correct. Therefore, when evaluating a password authentication, the reliability of the authentication returned by the comparator 515 is typically either 100% (correct) or 0% (wrong), with no possibility of intermediate values.

Similar rules to those for passwords are generally applied to token based authentication methods, such as smart cards. This is because having a smart card which has a similar identifier or which is similar to the correct one, is still just as wrong as having any other incorrect token. Therefore tokens tend also to be binary authenticators: a user either has the right token, or he doesn't.

However, certain types of authentication data, such as questionnaires and biometrics, are generally not binary authenticators. For example, a fingerprint may match a reference fingerprint to varying degrees. To some extent, this may be due to variations in the quality of the data captured either during the initial enrollment or in subsequent authentications. (A fingerprint may be smudged or a person may have a still healing scar or burn on a particular finger.) In other instances the data may match less than perfectly because the information itself is somewhat variable and based upon pattern matching. (A voice analysis may seem close but not quite right because of background noise, or the acoustics of the environment in which the voice is recorded, or because the person has a cold.) Finally, in situations where large amounts of data are being compared, it may simply be the case that much of the data matches well, but some doesn't. (A ten-question questionnaire may have resulted in eight correct answers to personal questions, but two incorrect answers.) For any of these reasons, the match between the enrollment data and the data for a particular authentication instance may be desirably assigned a partial match value by the comparator 515. In this way, the fingerprint might be said to be a 85% match, the voice print a 65% match, and the questionnaire an 80% match, for example.

This measure (degree of match) produced by the comparator 515 is the factor representing the basic issue of whether an authentication is correct or not. However, as discussed above, this is only one of the factors which may be used in determining the reliability of a given authentication instance. Note also that even though a match to some partial degree may be determined, that ultimately, it may be desirable to provide a binary result based upon a partial match. In an alternate mode of operation, it is also possible to treat partial matches as binary, i.e. either perfect (100%) or failed (0%) matches, based upon whether or not the degree of match passes a particular threshold level of match. Such a process may be used to provide a simple pass/fail level of matching for systems which would otherwise produce partial matches.

Another factor to be considered in evaluating the reliability of a given authentication instance concerns the circumstances under which the authentication data for this particular instance are provided. As discussed above, the circumstances refer to the metadata associated with a particular authentication instance. This may include without limitation such information as: the network address of the authenticator, to the extent that it can be determined; the time of the authentication; the mode of transmission of the authentication data (phone line, cellular, network, etc.); and the serial number of the system of the authenticator.

These factors can be used to produce a profile of the type of authentication that is normally requested by the user. Then, this information can be used to assess reliability in at least two manners. One manner is to consider whether the user is requesting authentication in a manner which is consistent with the normal profile of authentication by this user. If the user normally makes authentication requests from one network address during business days (when she is at work) and from a different network address during evenings or weekends (when she is at home), an authentication which occurs from the home address during the business day is less reliable because it is outside the normal authentication profile. Similarly, if the user normally authenticates using a fingerprint biometric and in the evenings, an authentication which originates during the day using only a password is less reliable.

An additional way in which the circumstantial metadata can be used to evaluate the reliability of an instance of authentication is to determine how much corroboration the circumstance provides that the authenticator is the individual he claims to be. For instance, if the authentication comes from a system with a serial number known to be associated with the user, this is a good circumstantial indicator that the user is who they claim to be. Conversely, if the authentication is coming from a network address which is known to be in Los Angeles when the user is known to reside in London, this is an indication that this authentication is less reliable based on its circumstances.

It is also possible that a cookie or other electronic data may be placed upon the system being used by a user when they interact with a vendor system or with the trust engine 110. This data is written to the storage of the system of the user and may contain an identification which may be read by a Web browser or other software on the user system. If this data is allowed to reside on the user system between sessions (a "persistent cookie"), it may be sent with the authentication data as further evidence of the past use of this system during authentication of a particular user. In effect, the metadata of a given instance, particularly a persistent cookie, may form a sort of token based authenticator itself.

Once the appropriate reliability factors based on the technique and data of the authentication instance are generated as described above in steps 1610 and 1615 respectively, they are used to produce an overall reliability for the authentication instance provided in step 1620. One means of doing this is simply to express each reliability as a percentage and then to multiply them together.

For example, suppose the authentication data is being sent in from a network address known to be the user's home computer completely in accordance with the user's past authentication profile (100%), and the technique being used is fingerprint identification (97%), and the initial finger print data was roistered through the user's employer with the trust engine 110 (90%), and the match between the authentication data and the original fingerprint template in the enrollment data is very good (99%). The overall reliability of this authentication instance could then be calculated as the product of these reliabilities: 100%*97%*90%*99%–86.4% reliability.

This calculated reliability represents the reliability of one single instance of authentication. The overall reliability of a single authentication instance may also be calculated using techniques which treat the different reliability factors differently, for example by using formulas where different weights are assigned to each reliability factor. Furthermore, those of skill in the art will recognize that the actual values used may represent values other than percentages and may use non-arithmetic systems. One embodiment may include a module used by an authentication requestor to set the weights for each factor and the algorithms used in establishing the overall reliability of the authentication instance.

The authentication engine 215 may use the above techniques and variations thereof to determine the reliability of a single authentication instance, indicated as step 1620. However, it may be useful in many authentication situations for multiple authentication instances to be provided at the same time. For example, while attempting to authenticate himself using the system of the present invention, a user may provide a user identification, fingerprint authentication data, a smart card, and a password. In such a case, three independent authentication instances are being provided to the trust engine 110 for evaluation. Proceeding to step 1625, if the authentication engine 215 determines that the data provided by the user includes more than one authentication instance, then each instance in turn will be selected as shown in step 1630 and evaluated as described above in steps 1610, 1615 and 1620.

Note that many of the reliability factors discussed may vary from one of these instances to another. For instance, the inherent reliability of these techniques is likely to be different, as well as the degree of match provided between the authentication data and the enrollment data. Furthermore, the user may have provided enrollment data at different times and under different circumstances for each of these techniques, providing different enrollment reliabilities for each of these instances as well. Finally, even though the circumstances under which the data for each of these instances is being submitted is the same, the use of such techniques may each fit the profile of the user differently, and so may be assigned different circumstantial reliabilities. (For example, the user may normally use their password and fingerprint, but not their smart card.)

As a result, the final reliability for each of these authentication instances may be different from One another. However, by using multiple instances together, the overall confidence level for the authentication will tend to increase.

Once the authentication engine has performed steps 1610 through 1620 for all of the authentication instances provided in the authentication data, the reliability of each instance is used in step 1635 to evaluate the overall authentication confidence level. This process of combining the individual authentication instance reliabilities into the authentication confidence level may be modeled by various methods relating the individual reliabilities produced, and may also address the particular interaction between some of these authentication techniques. (For example, multiple knowledge-based systems such as passwords may produce less confidence than a single password and even a fairly weak biometric, such as a basic voice analysis.)

One means in which the authentication engine 215 may combine the reliabilities of multiple concurrent authentication instances to generate a final confidence level is to multiply the unreliability of each instance to arrive at a total unreliability. The unreliability is generally the complementary percentage of the reliability. For example, a technique which is 84% reliable is 16% unreliable. The three authentication instances described above (fingerprint, smart card, password) which produce reliabilities of 86%, 75%, and 72% would have corresponding unreliabilities of (100–86) %, (100–75) % and (100–72) %, or 14%, 25%, and 28%, respectively. By multiplying these unreliabilities, we get a cumulative unreliability of 14%*25%*28%–0.98% unreliability, which corresponds to a reliability of 99.02%.

In an additional mode of operation, additional factors and heuristics 530 may be applied within the authentication engine 215 to account for the interdependence of various authentication techniques. For example, if someone has unauthorized access to a particular home computer, they probably have access to the phone line at that address as well. Therefore, authenticating based on an originating phone number as well as upon the serial number of the authenticating system does not add much to the overall confidence in the authentication. However, knowledge based authentication is largely independent of token based authentication (i.e. if someone steals your cellular phone or keys, they are no more likely to know your PIN or password than if they hadn't).

Furthermore, different vendors or other authentication requestors may wish to weigh different aspects of the authentication differently. This may include the use of separate weighing factors or algorithms used in calculating the reliability of individual instances as well as the use of different means to evaluate authentication events with multiple instances.

For instance, vendors for certain types of transactions, for instance corporate email systems, may desire to authenticate primarily based upon heuristics and other circumstantial data by default. Therefore, they may apply high weights to factors related to the metadata and other profile related information associated with the circumstances surrounding authentication events. This arrangement could be used to ease the burden on users during normal operating hours, by not requiring more from the user than that he be logged on to the correct machine during business hours. However, another vendor may weigh authentications coming from a particular technique most heavily, for instance fingerprint matching, because of a policy decision that such a technique is most suited to authentication for the particular vendor's purposes.

Such varying weights may be defined by the authentication requestor in generating the authentication request and sent to the trust engine 110 with the authentication request in one mode of operation. Such options could also be set as preferences during an initial enrollment process for the authentication requestor and stored within the authentication engine in another mode of operation.

Once the authentication engine 215 produces an authentication confidence level for the authentication data provided, this confidence level is used to complete the authentication request in step 1640, and this information is forwarded from the authentication engine 215 to the transaction engine 205 for inclusion in a message to the authentication requestor.

The process described above is merely exemplary, and those of skill in the art will recognize that the steps need not be performed in the order shown or that only certain of the steps are desired to be performed, or that a variety of combinations of steps may be desired. Furthermore, certain steps, such as the evaluation of the reliability of each authentication instance provided, may be carried out in parallel with one another if circumstances permit.

In a further aspect of this invention, a method is provided to accommodate conditions when the authentication confidence level produced by the process described above fails to meet the required trust level of the vendor or other party requiring the authentication. In circumstances such as these where a gap exists between the level of confidence provided and the level of trust desired, the operator of the trust engine 110 is in a position to provide opportunities for one or both parties to provide alternate data or requirements in order to close this trust gap. This process will be referred to as "trust arbitrage" herein.

Trust arbitrage may take place within a framework of cryptographic authentication as described above with reference to FIGS. 10 and 11. As shown therein, a vendor or other party will request authentication of a particular user in association with a particular transaction. In one circumstance, the vendor simply requests an authentication, either positive or negative, and after receiving appropriate data from the user, the trust engine 110 will provide such a binary authentication. In circumstances such as these, the degree of confidence required in order to secure a positive authentication is determined based upon preferences set within the trust engine 110.

However, it is also possible that the vendor may request a particular level of trust in order to complete a particular transaction. This required level may be included with the authentication request (e.g. authenticate this user to 98% confidence) or may be determined by the trust engine 110 based on other factors associated with the transaction (i.e. authenticate this user as appropriate for this transaction). One such factor might be the economic value of the transaction. For transactions which have greater economic value, a higher degree of trust may be required. Similarly, for transactions with high degrees of risk a high degree of trust may be required. Conversely, for transactions which are either of low risk or of low value, lower trust levels may be required by the vendor or other authentication requestor.

Figure 17:
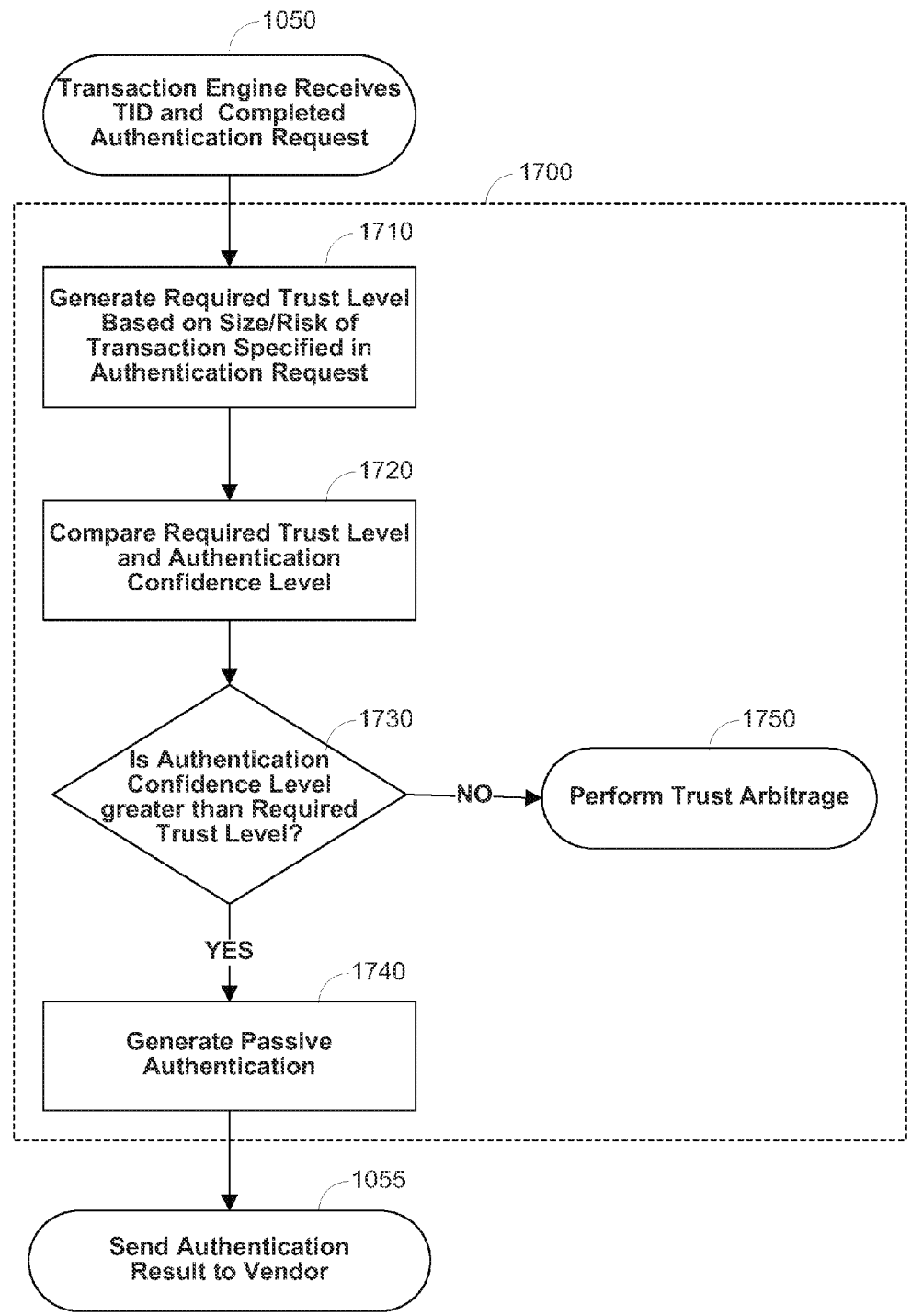
FIG. 17 illustrates a process for assigning a value to an authentication according to one aspect as shown in FIG. 16 of the invention.

The process of trust arbitrage occurs between the steps of the trust engine 110 receiving the authentication data in step 1050 of FIG. 10 and the return of an authentication result to the vendor in step 1055 of FIG. 10. Between these steps, the process which leads to the evaluation of trust levels and the potential trust arbitrage occurs as shown in FIG. 17. In circumstances where simple binary authentication is performed, the process shown in FIG. 17 reduces to having the transaction engine 205 directly compare the authentication data provided with the enrollment data for the identified user as discussed above with reference to FIG. 10, flagging any difference as a negative authentication.

As shown in FIG. 17, the first step after receiving the data in step 1050 is for the transaction engine 205 to determine the trust level which is required for a positive authentication for this particular transaction in step 1710. This step may be performed by one of several different methods. The required trust level may be specified to the trust engine 110 by the authentication requestor at the time when the authentication request is made. The authentication requestor may also set a preference in advance which is stored within the depository 210 or other storage which is accessible by the transaction engine 205. This preference may then be read and used each time an authentication request is made by this authentication requestor. The preference may also be associated with a particular user as a security measure such that a particular level of trust is always required in order to authenticate that user, the user preference being stored in the depository 210 or other storage media accessible by the transaction engine 205. The required level may also be derived by the transaction engine 205 or authentication engine 215 based upon information provided in the authentication request, such as the value and risk level of the transaction to be authenticated.

In one mode of operation, a policy management module or other software which is used when generating the authentication request is used to specify the required degree of trust for the authentication of the transaction. This may be used to provide a series of rules to follow when assigning the required level of trust based upon the policies which are specified within the policy management module. One advantageous mode of operation is for such a module to be incorporated with the web server of a vendor in order to appropriately determine required level of trust for transactions initiated with the vendor's web server. In this way, transaction requests from users may be assigned a required trust level in accordance with the policies of the vendor and such information may be forwarded to the trust engine 110 along with the authentication request.

This required trust level correlates with the degree of certainty that the vendor wants to have that the individual authenticating is in fact who he identifies himself as. For example, if the transaction is one where the vendor wants a fair degree of certainty because goods are changing hands, the vendor may require a trust level of 85%. For situation where the vendor is merely authenticating the user to allow him to view members only content or exercise privileges on a chat room, the downside risk may be small enough that the vendor requires only a 60% trust level. However, to enter into a production contract with a value of tens of thousands of dollars, the vendor may require a trust level of 99% or more.

This required trust level represents a metric to which the user must authenticate himself in order to complete the transaction. If the required trust level is 85% for example, the user must provide authentication to the trust engine 110 sufficient for the trust engine 110 to say with 85% confidence that the user is who they say they are. It is the balance between this required trust level and the authentication confidence level which produces either a positive authentication (to the satisfaction of the vendor) or a possibility of trust arbitrage.

As shown in FIG. 17, after the transaction engine 205 receives the required trust level, it compares in step 1720 the required trust level to the authentication confidence level which the authentication engine 215 calculated for the current authentication (as discussed with reference to FIG. 16). If the authentication confidence level is higher than the required trust level for the transaction in step 1730, then the process moves to step 1740 where a positive authentication for this transaction is produced by the transaction engine 205. A message to this effect will then be inserted into the authentication results and returned to the vendor by the transaction engine 205 as shown in step 1055 (see FIG. 10).

Figure 18:
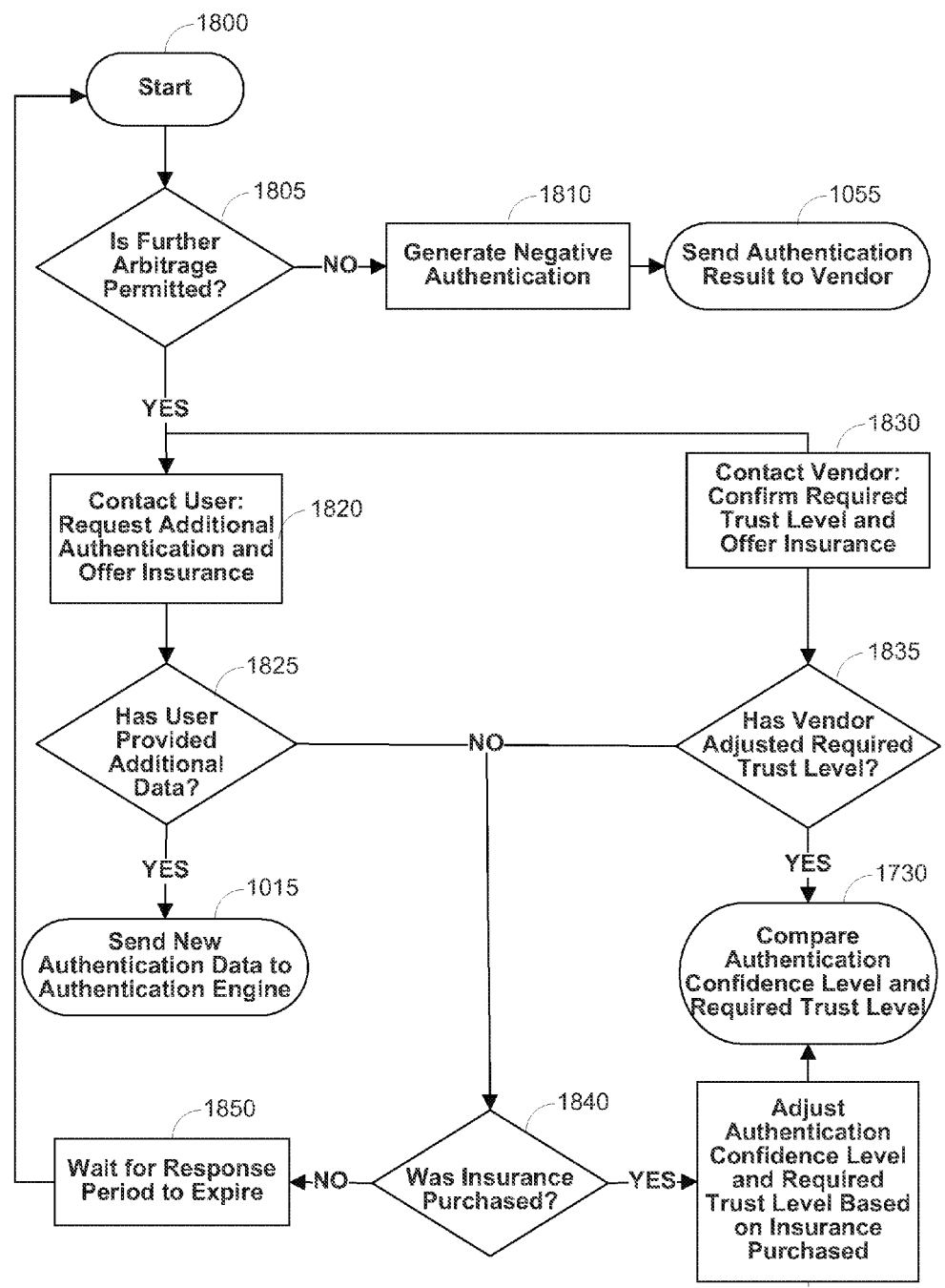
FIG. 18 illustrates a process for performing trust arbitrage in an aspect of the invention as shown in FIG. 17.

However, if the authentication confidence level does not fulfill the required trust level in step 1730, then a confidence gap exists for the current authentication, and trust arbitrage is conducted in step 1750. Trust arbitrage is described more completely with reference to FIG. 18 below. This process as described below takes place within the transaction engine 205 of the trust engine 110. Because no authentication or other cryptographic operations are needed to execute trust arbitrage (other than those required for the SSL communication between the transaction engine 205 and other components), the process may be performed outside the authentication engine 215. However, as will be discussed below, any reevaluation of authentication data or other cryptographic or authentication events will require the transaction engine 205 to resubmit the appropriate data to the authentication engine 215. Those of skill in the art will recognize that the trust arbitrage process could alternately be structured to take place partially or entirely within the authentication engine 215 itself.

As mentioned above, trust arbitrage is a process where the trust engine 110 mediates a negotiation between the vendor and user in an attempt to secure a positive authentication where appropriate. As shown in step 1805, the transaction engine 205 first determines whether or not the current situation is appropriate for trust arbitrage. This may be determined based upon the circumstances of the authentication, e.g. whether this authentication has already been through multiple cycles of arbitrage, as well as upon the preferences of either the vendor or user, as will be discussed further below.

In such circumstances where arbitrage is not possible, the process proceeds to step 1810 where the transaction engine 205 generates a negative authentication and then inserts it into the authentication results which are sent to the vendor in step 1055 (see FIG. 10). One limit which may be advantageously used to prevent authentications from pending indefinitely is to set a time-out period from the initial authentication request. In this way, any transaction which is not positively authenticated within the time limit is denied further arbitrage and negatively authenticated. Those of skill in the art will recognize that such a time limit may vary depending upon the circumstances of the transaction and the desires of the user and vendor. Limitations may also be placed upon the number of attempts that may be made at providing a successful authentication. Such limitations may be handled by an attempt limiter 535 as shown in FIG. 5.

If arbitrage is not prohibited in step 1805, the transaction engine 205 will then engage in negotiation with one or both of the transacting parties. The transaction engine 205 may send a message to the user requesting some form of additional authentication in order to boost the authentication confidence level produced as shown in step 1820. In the simplest form, this may simply indicates that authentication was insufficient. A request to produce one or more additional authentication instances to improve the overall confidence level of the authentication may also be sent.

If the user provides some additional authentication instances in step 1825, then the transaction engine 205 adds these authentication instances to the authentication data for the transaction and forwards it to the authentication engine 215 as shown in step 1015 (see FIG. 10), and the authentication is reevaluated based upon both the pre-existing authentication instances for this transaction and the newly provided authentication instances.

An additional type of authentication may be a request from the trust engine 110 to make some form of person-to-person contact between the trust engine 110 operator (or a trusted associate) and the user, for example, by phone call. This phone call or other non-computer authentication can be used to provide personal contact with the individual and also to conduct some form of questionnaire based authentication. This also may give the opportunity to verify an originating telephone number and potentially a voice analysis of the user when he calls in. Even if no additional authentication data can be provided, the additional context associated with the user's phone number may improve the reliability of the authentication context. Any revised data or circumstances based upon this phone call are fed into the trust engine 110 for use in consideration of the authentication request.

Additionally, in step 1820 the trust engine 110 may provide an opportunity for the user to purchase insurance, effectively buying a more confident authentication. The operator of the trust engine 110 may, at times, only want to make such an option available if the confidence level of the authentication is above a certain threshold to begin with. In effect, this user side insurance is a way for the trust engine 110 to vouch for the user when the authentication meets the normal required trust level of the trust engine 110 for authentication, but does not meet the required trust level of the vendor for this transaction. In this way, the user may still successfully authenticate to a very high level as may be required by the vendor, even though he only has authentication instances which produce confidence sufficient for the trust engine 110.

This function of the trust engine 110 allows the trust engine 110 to vouch for someone who is authenticated to the satisfaction of the trust engine 110, but not of the vendor. This is analogous to the function performed by a notary in adding his signature to a document in order to indicate to someone reading the document at a later time that the person whose signature appears on the document is in fact the person who signed it. The signature of the notary testifies to the act of signing by the user. In the same way, the trust engine is providing an indication that the person transacting is who they say they are.

However, because the trust engine 110 is artificially boosting the level of confidence provided by the user, there is a greater risk to the trust engine 110 operator, since the user is not actually meeting the required trust level of the vendor. The cost of the insurance is designed to offset the risk of a false positive authentication to the trust engine 110 (who may be effectively notarizing the authentications of the user). The user pays the trust engine 110 operator to take the risk of authenticating to a higher level of confidence than has actually been provided.

Because such an insurance system allows someone to effectively buy a higher confidence rating from the trust engine 110, both vendors and users may wish to prevent the use of user side insurance in certain transactions. Vendors may wish to limit positive authentications to circumstances where they know that actual authentication data supports the degree of confidence which they require and so may indicate to the trust engine 110 that user side insurance is not to be allowed. Similarly, to protect his online identity, a user may wish to prevent the use of user side insurance on his account, or may wish to limit its use to situations where the authentication confidence level without the insurance is higher than a certain limit. This may be used as a security measure to prevent someone from overhearing a password or stealing a smart card and using them to falsely authenticate to a low level of confidence, and then purchasing insurance to produce a very high level of (false) confidence. These factors may be evaluated in determining whether user side insurance is allowed.

If user purchases insurance in step 1840, then the authentication confidence level is adjusted based upon the insurance purchased in step 1845, and the authentication confidence level and required trust level are again compared in step 1730 (see FIG. 17). The process continues from there, and may lead to either a positive authentication in step 1740 (see FIG. 17), or back into the trust arbitrage process in step 1750 for either further arbitrage (if allowed) or a negative authentication in step 1810 if further arbitrage is prohibited.

In addition to sending a message to the user in step 1820, the transaction engine 205 may also send a message to the vendor in step 1830 which indicates that a pending authentication is currently below the required trust level. The message may also offer various options on how to proceed to the vendor. One of these Options is to simply inform the vendor of what the current authentication confidence level is and ask if the vendor wishes to maintain their current unfulfilled required trust level. This may be beneficial because in some cases, the vendor may have independent means for authenticating the transaction or may have been using a default set of requirements which generally result in a higher required level being initially specified than is actually needed for the particular transaction at hand.

For instance, it may be standard practice that all incoming purchase order transactions with the vendor are expected to meet a 98% trust level. However, if an order was recently discussed by phone between the vendor and a long-standing customer, and immediately thereafter the transaction is authenticated, but only to a 93% confidence level, the vendor may wish to simply lower the acceptance threshold for this transaction, because the phone call effectively provides additional authentication to the vendor. In certain circumstances, the vendor may be willing to lower their required trust level, but not all the way to the level of the current authentication confidence. For instance, the vendor in the above example might consider that the phone call prior to the order might merit a 4% reduction in the degree of trust needed; however, this is still greater than the 93% confidence produced by the user.

If the vendor does adjust their required trust level in step 1835, then the authentication confidence level produced by the authentication and the required trust level are compared in step 1730 (see FIG. 17). If the confidence level now exceeds the required trust level, a positive authentication may be generated in the transaction engine 205 in step 1740 (see FIG. 17). If not, further arbitrage may be attempted as discussed above if it is permitted.

In addition to requesting an adjustment to the required trust level, the transaction engine 205 may also offer vendor side insurance to the vendor requesting the authentication. This insurance serves a similar purpose to that described above for the user side insurance. Here, however, rather than the cost corresponding to the risk being taken by the trust engine 110 in authenticating above the actual authentication confidence level produced, the cost of the insurance corresponds to the risk being taken by the vendor in accepting a lower trust level in the authentication.

Instead of just lowering their actual required trust level, the vendor has the option of purchasing insurance to protect itself from the additional risk associated with a lower level of trust in the authentication of the user. As described above, it may be advantageous for the vendor to only consider purchasing such insurance to cover the trust gap in conditions where the existing authentication is already above a certain threshold.

The availability of such vendor side insurance allows the vendor the option to either: lower his trust requirement directly at no additional cost to himself, bearing the risk of a false authentication himself (based on the lower trust level required); or, buying insurance for the trust gap between the authentication confidence level and his requirement, with the trust engine 110 operator bearing the risk of the lower confidence level which has been provided. By purchasing the insurance, the vendor effectively keeps his high trust level requirement; because the risk of a false authentication is shifted to the trust engine 110 operator.

If the vendor purchases insurance in step 1840, the authentication confidence level and required trust levels are compared in step 1730 (see FIG. 17), and the process continues as described above.

Note that it is also possible that both the user and the vendor respond to messages from the trust engine 110. Those of skill in the art will recognize that there are multiple ways in which such situations can be handled. One advantageous mode of handling the possibility of multiple responses is simply to treat the responses in a first-come, first-served manner. For example, if the vendor responds with a lowered required trust level and immediately thereafter the user also purchases insurance to raise his authentication level, the authentication is first reevaluated based upon the lowered trust requirement from the vendor. If the authentication is now positive, the user's insurance purchase is ignored. In another advantageous mode of operation, the user might only be charged for the level of insurance required to meet the new, lowered trust requirement of the vendor (if a trust gap remained even with the lowered vendor trust requirement).

If no response from either party is received during the trust arbitrage process at step 1850 within the time limit set for the authentication, the arbitrage is reevaluated in step 1805. This effectively begins the arbitrage process again. If the time limit was final or other circumstances prevent further arbitrage in step 1805, a negative authentication is generated by the transaction engine 205 in step 1810 and returned to the vendor in step 1055 (see FIG. 10). If not, new messages may be sent to the user and vendor, and the process may be repeated as desired.

Note that for certain types of transactions, for instance, digitally signing documents which are not part of a transaction, there may not necessarily be a vendor or other third party; therefore the transaction is primarily between the user and the trust engine 110. In circumstances such as these, the trust engine 110 will have its own required trust level which must be satisfied in order to generate a positive authentication. However, in such circumstances, it will often not be desirable for the trust engine 110 to offer insurance to the user in order for him to raise the confidence of his own signature.

The process described above and shown in FIGS. 16-18 may be carried out using various communications modes as described above with reference to the trust engine 110. For instance, the messages may be web-based and sent using SSL connections between the trust engine 110 and applets downloaded in real time to browsers running on the user or vendor systems. In an alternate mode of operation, certain dedicated applications may be in use by the user and vendor which facilitate such arbitrage and insurance transactions. In another alternate mode of operation, secure email operations may be used to mediate the arbitrage described above, thereby allowing deferred evaluations and batch processing of authentications. Those of skill in the art will recognize that different communications modes may be used as are appropriate for the circumstances and authentication requirements of the vendor.

Figure 19:
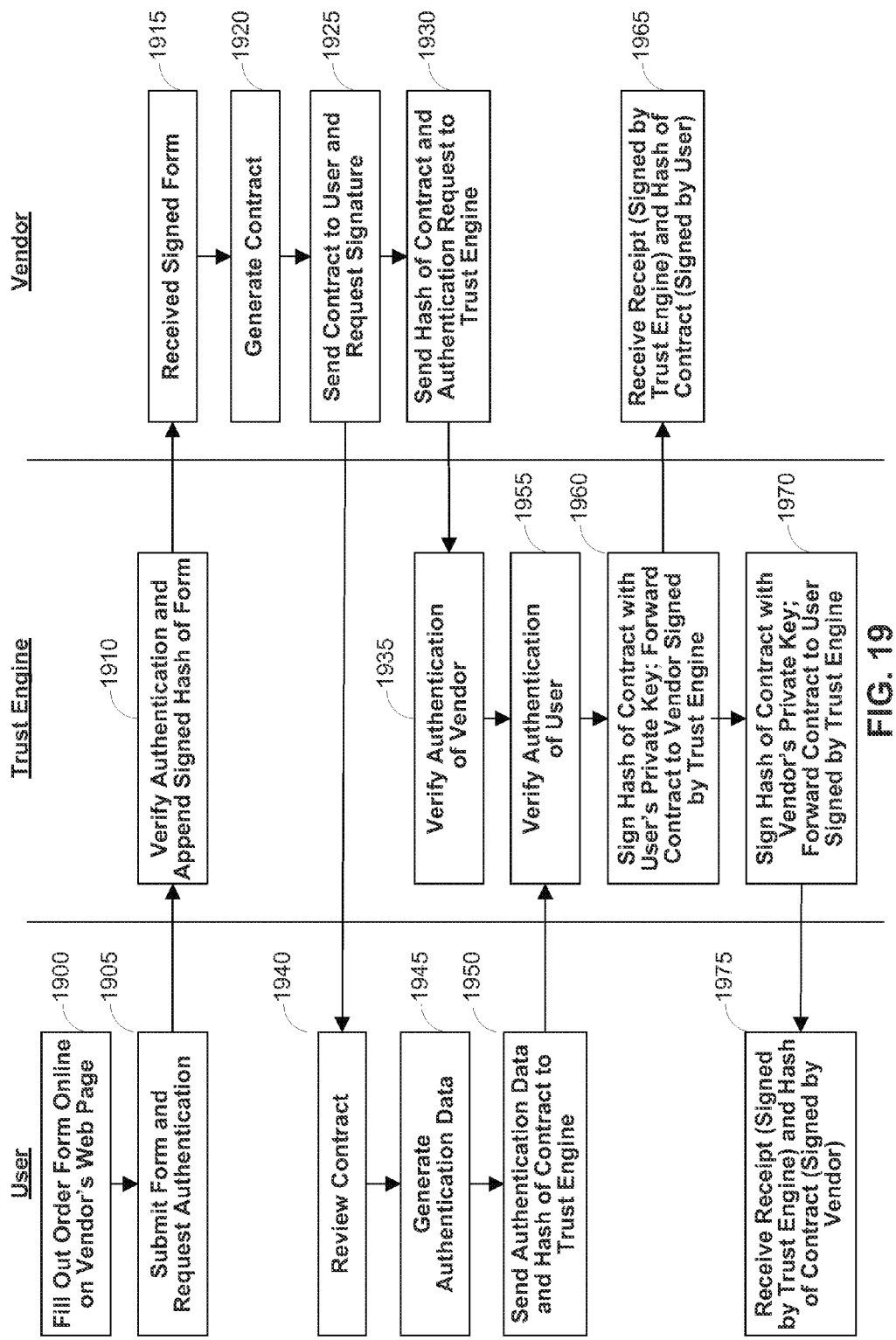
FIG. 19 illustrates a sample transaction between a user and a vendor according to aspects of an embodiment of the invention where an initial web based contact leads to a sales contract signed by both parties.

The following description with reference to FIG. 19 describes a sample transaction which integrates the various aspects of the present invention as described above. This example illustrates the overall process between a user and a vendor as mediates by the trust engine 110. Although the various steps and components as described in detail above may be used to carry out the following transaction, the process illustrated focuses on the interaction between the trust engine 110, user and vendor.

The transaction begins when the user, while viewing web pages online, fills out an order form on the web site of the vendor in step 1900. The user wishes to submit this order form to the vendor, signed with his digital signature. In order to do this, the user submits the order form with his request for a signature to the trust engine 110 in step 1905. The user will also provide authentication data which will be used as described above to authenticate his identity.

In step 1910 the authentication data is compared to the enrollment data by the trust engine 110 as discussed above, and if a positive authentication is produced, the hash of the order form, signed with the private key of the user, is forwarded to the vendor along with the order form itself.

The vendor receives the signed form in step 1915, and then the vendor will generate an invoice or other contract related to the purchase to be made in step 1920. This contract is sent back to the user with a request for a signature in step 1925. The vendor also sends an authentication request for this contract transaction to the trust engine 110 in step 1930 including a hash of the contract which will be signed by both parties. To allow the contract to be digitally signed by both parties, the vendor also includes authentication data for itself so that the vendor's signature upon the contract can later be verified if necessary.

As discussed above, the trust engine 110 then verifies the authentication data provided by the vendor to confirm the vendor's identity, and if the data produces a positive authentication in step 1935, continues with step 1955 when the data is received from the user. If the vendor's authentication data does not match the enrollment data of the vendor to the desired degree, a message is returned to the vendor requesting further authentication. Trust arbitrage may be performed here if necessary, as described above, in order for the vendor to successfully authenticate itself to the trust engine 110.

When the user receives the contract in step 1940, he reviews it, generates authentication data to sign it if it is acceptable in step 1945, and then sends a hash of the contract and his authentication data to the trust engine 110 in step 1950. The trust engine 110 verifies the authentication data in step 1955 and if the authentication is good, proceeds to process the contract as described below. As discussed above with reference to FIGS. 17 and 18, trust arbitrage may be performed as appropriate to close any trust gap which exists between the authentication confidence level and the required authentication level for the transaction.

The trust engine 110 signs the hash of the contract with the user's private key, and sends this signed hash to the vendor in step 1960, signing the complete message on its own behalf, i.e., including a hash of the complete message (including the user's signature) encrypted with the private key 510 of the trust engine 110. This message is received by the vendor in step 1965. The message represents a signed contract (hash of contract encrypted using user's private key) and a receipt from the trust engine 110 (the hash of the message including the signed contract, encrypted using the trust engine 110's private key).

The trust engine 110 similarly prepares a hash of the contract with the vendor's private key in step 1970, and forwards this to the user, signed by the trust engine 110. In this way, the user also receives a copy of the contract, signed by the vendor, as well as a receipt, signed by the trust engine 110, for delivery of the signed contract in step 1975.

Figure 20:
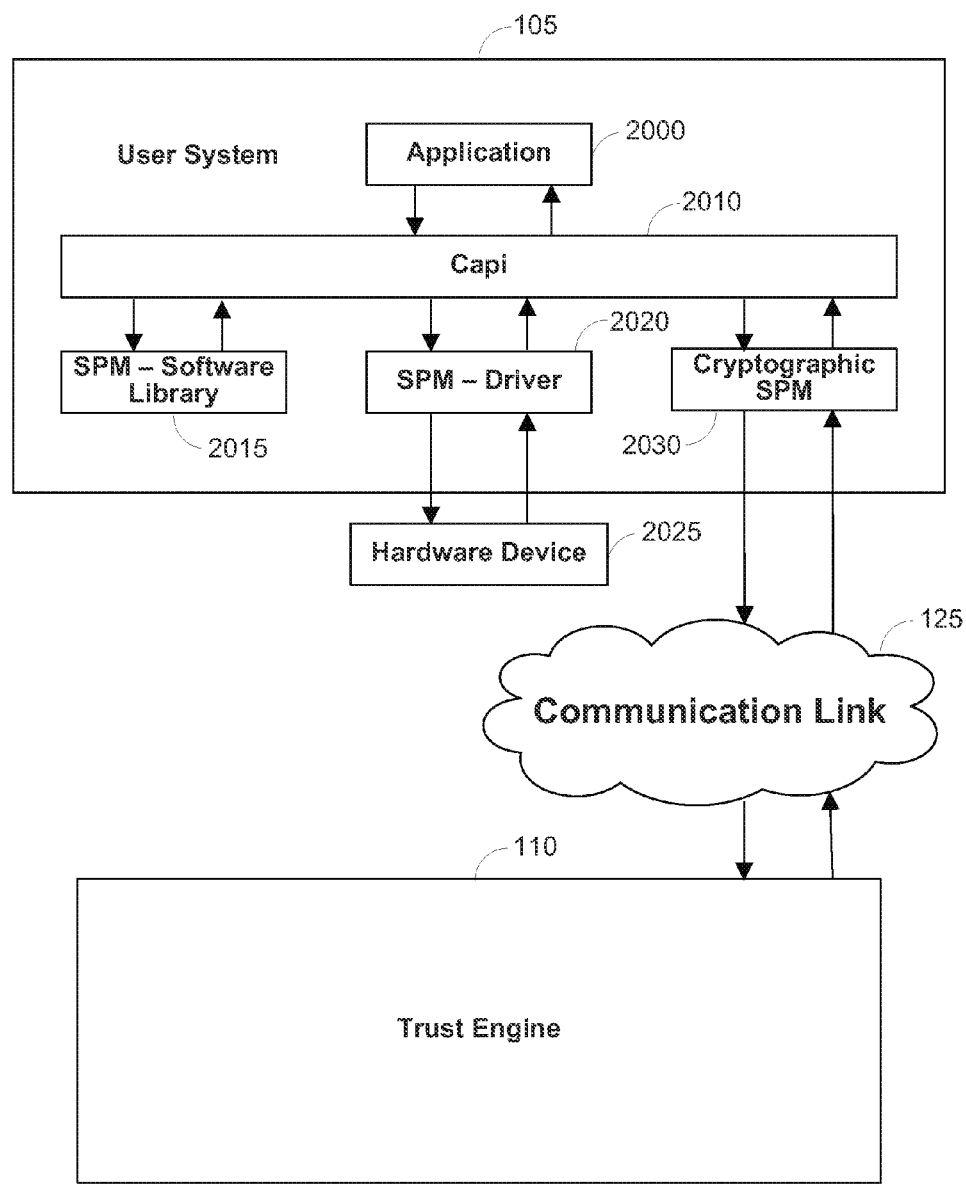
FIG. 20 illustrates a sample user system with a cryptographic service provider module which provides security functions to a user system.

In addition to the foregoing, an additional aspect of the invention provides a cryptographic Service Provider Module (SPM) which may be available to a client side application as a means to access functions provided by the trust engine 110 described above. One advantageous way to provide such a service is for the cryptographic SPM is to mediate communications between a third party Application Programming Interface (API) and a trust engine 110 which is accessible via a network or other remote connection. A sample cryptographic SPM is described below with reference to FIG. 20.

For example, on a typical system, a number of API's are available to programmers. Each API provides a set of function calls which may be made by an application 2000 running upon the system. Examples of API's which provide programming interfaces suitable for cryptographic functions, authentication functions, and other security function include the Cryptographic API (CAPI) 2010 provided by Microsoft with its Windows operating systems, and the Common Data Security Architecture (CDSA), sponsored by IBM, Intel and other members of the Open Group. CAPI will be used as an exemplary security API in the discussion that follows. However, the cryptographic SPM described could be used with CDSA or other security API's as are known in the art.

This API is used by a user system 105 or vendor system 120 when a call is made for a cryptographic function. Included among these functions may be requests associated with performing various cryptographic operations, such as encrypting a document with a particular key, signing a document, requesting a digital certificate, verifying a signature upon a signed document, and such other cryptographic functions as are described herein or known to those of skill in the art.

Such cryptographic functions are normally performed locally to the system upon which CAPI 2010 is located. This is because generally the functions called require the use of either resources of the local user system 105, such as a fingerprint reader, or software functions which are programmed using libraries which are executed on the local machine. Access to these local resources is normally provided by one or more Service Provider Modules (SPM's) 2015, 2020 as referred to above which provide resources with which the cryptographic functions are carried out. Such SPM's may include software libraries 2015 to perform encrypting or decrypting operations, or drivers and applications 2020 which are capable of accessing specialized hardware 2025, such as biometric scanning devices. In much the way that CAPI 2010 provides functions which may be used by an application 2000 of the system 105, the SPM's 2015, 2020 provide CAPI with access to the lower level functions and resources associated with the available services upon the system.

In accordance with the invention, it is possible to provide a cryptographic SPM 2030 which is capable of accessing the cryptographic functions provided by the trust engine 110 and making these functions available to an application 2000 through CAPI 2010. Unlike embodiments where CAPI 2010 is only able to access resources which are locally available through SPM's 2015, 2020, a cryptographic SPM 2030 as described herein would be able to submit requests for cryptographic operations to a remotely-located, network-accessible trust engine 110 in order to perform the operations desired.

For instance, if an application 2000 has a need for a cryptographic operation, such as signing a document, the application 2000 makes a function call to the appropriate CAPI 2010 function. CAPI 2010 in turn will execute this function, making use of the resources which are made available to it by the SPM's 2015, 2020 and the cryptographic SPM 2030. In the case of a digital signature function, the cryptographic SPM 2030 will generate an appropriate request which will be sent to the trust engine 110 across the communication link 125.

The operations which occur between the cryptographic SPM 2030 and the trust engine 110 are the same operations that would be possible between any other system and the trust engine 110. However, these functions are effectively made available to a user system 105 through CAPI 2010 such that they appear to be locally available upon the user system 105 itself. However, unlike ordinary SPM's 2015, 2020, the functions are being carried out on the remote trust engine 110 and the results relayed to the cryptographic SPM 2030 in response to appropriate requests across the communication link 125.

This cryptographic SPM 2030 makes a number of operations available to the user system 105 or a vendor system 120 which might not otherwise be available. These functions include without limitation: encryption and decryption of documents; issuance of digital certificates; digital signing of documents; verification of digital signatures; and such other operations as will be apparent to those of skill in the art.

In a separate embodiment, the present invention comprises a complete system for performing the data securing methods of the present invention on any data set. The computer system of this embodiment comprises a data splitting module that comprises the functionality shown in FIG. 8 and described herein. In one embodiment of the present invention, the data splitting module, sometimes referred to herein as a secure data parser, comprises a parser program or software suite which comprises data splitting, encryption and decryption, reconstitution or reassembly functionality. This embodiment may further comprise a data storage facility or multiple data storage facilities, as well. The data splitting module, or secure data parser, comprises a cross-platform software module suite which integrates within an electronic infrastructure, or as an add-on to any application which requires the ultimate security of its data elements. This parsing process operates on any type of data set, and on any and all file types, or in a database on any row, column or cell of data in that database.

The parsing process of the present invention may, in one embodiment, be designed in a modular tiered fashion, and any encryption process is suitable for use in the process of the present invention. The modular tiers of the parsing and splitting process of the present invention may include, but are not limited to, 1) cryptographic split, dispersed and securely stored in multiple locations; 2) encrypt, cryptographically split, dispersed and securely stored in multiple locations; 3) encrypt, cryptographically split, encrypt each share, then dispersed and securely stored in multiple locations; and 4) encrypt, cryptographically split, encrypt each share with a different type of encryption than was used in the first step, then dispersed and securely stored in multiple locations.

The process comprises, in one embodiment, splitting of the data according to the contents of a generated random number, or key and performing the same cryptographic splitting of the key used in the encryption of splitting of the data to be secured into two or more portions, or shares, of parsed and split data, and in one embodiment, preferably into four or more portions of parsed and split data, encrypting all of the portions, then scattering and storing these portions back into the database, or relocating them to any named device, fixed or removable, depending on the requestor's need for privacy and security. Alternatively, in another embodiment, encryption may occur prior to the splitting of the data set by the splitting module or secure data parser. The original data processed as described in this embodiment is encrypted and obfuscated and is secured. The dispersion of the encrypted elements, if desired, can be virtually anywhere, including, but not limited to, a single server or data storage device, or among separate data storage facilities or devices. Encryption key management in one embodiment may be included within the software suite, or in another embodiment may be integrated into an existing infrastructure or any other desired location.

A cryptographic split (cryptosplit) partitions the data into N number of shares. The partitioning can be on any size unit of data, including an individual bit, bits, bytes, kilobytes, megabytes, or larger units, as well as any pattern or combination of data unit sizes whether predetermined or randomly generated. The units can also be of different sized, based on either a random or predetermined set of values. This means the data can be viewed as a sequence of these units. In this manner the size of the data units themselves may render the data more secure, for example by using one or more predetermined or randomly generated pattern, sequence or combination of data unit sizes. The units are then distributed (either randomly or by a predetermined set of values) into the N shares. This distribution could also involve a shuffling of the order of the units in the shares. It is readily apparent to those of ordinary skill in the art that the distribution of the data units into the shares may be performed according to a wide variety of possible selections, including but not limited to size-fixed, predetermined sizes, or one or more combination, pattern or sequence of data unit sizes that are predetermined or randomly generated.

One example of this cryptographic split process, or cryptosplit, would be to consider the data to be 23 bytes in size, with the data unit size chosen to be one byte, and with the number of shares selected to be 4. Each byte would be distributed into one of the 4 shares. Assuming a random distribution, a key would be obtained to create a sequence of 23 random numbers (r1, r2, r3 through r23), each with a value between 1 and 4 corresponding to the four shares. Each of the units of data (in this example 23 individual bytes of data) is associated with one of the 23 random numbers corresponding to one of the four shares. The distribution of the bytes of data into the four shares would occur by placing the first byte of the data into share number r1, byte two into share r2, byte three into share r3, through the 23$^{rd}$ byte of data into share r23. It is readily apparent to those of ordinary skill in the art that a wide variety of other possible steps or combination or sequence of steps, including the size of the data units, may be used in the cryptosplit process of the present invention, and the above example is a non-limiting description of one process for cryptosplitting data. To recreate the original data, the reverse operation would be performed.

In another embodiment of the cryptosplit process of the present invention, an option for the cryptosplitting process is to provide sufficient redundancy in the shares such that only a subset of the shares are needed to reassemble or restore the data to its original or useable form. As a non-limiting example, the cryptosplit may be done as a "3 of 4" cryptosplit such that only three of the four shares are necessary to reassemble or restore the data to its original or useable form. This is also referred to as a "M of N cryptosplit" wherein N is the total number of shares, and M is at least one less than N. It is readily apparent to those of ordinary skill in the art that there are many possibilities for creating this redundancy in the cryptosplitting process of the present invention.

In one embodiment of the cryptosplitting process of the present invention, each unit of data is stored in two shares, the primary share and the backup share. Using the "3 of 4" cryptosplitting process described above, any one share can be missing, and this is sufficient to reassemble or restore the original data with no missing data units since only three of the total four shares are required. As described herein, a random number is generated that corresponds to one of the shares. The random number is associated with a data unit, and stored in the corresponding share, based on a key. One key is used, in this embodiment, to generate the primary and backup share random number. As described herein for the cryptosplitting process of the present invention, a set of random numbers (also referred to as primary share numbers) from 0 to 3 are generated equal to the number of data units. Then another set of random numbers is generated (also referred to as backup share numbers) from 1 to 3 equal to the number of data units. Each unit of data is then associated with a primary share number and a backup share number. Alternatively, a set of random numbers may be generated that is fewer than the number of data units, and repeating the random number set, but this may reduce the security of the sensitive data. The primary share number is used to determine into which share the data unit is stored. The backup share number is combined with the primary share number to create a third share number between 0 and 3, and this number is used to determine into which share the data unit is stored. In this example, the equation to determine the third share number is:

(primary share number+backup share number)MOD 4=third share number.

In the embodiment described above where the primary share number is between 0 and 3, and the backup share number is between 1 and 3 ensures that the third share number is different from the primary share number. This results in the data unit being stored in two different shares. It is readily apparent to those of ordinary skill in the art that there are many ways of performing redundant cryptosplitting and non-redundant cryptosplitting in addition to the embodiments disclosed herein. For example, the data units in each share could be shuffled utilizing a different algorithm. This data unit shuffling may be performed as the original data is split into the data units, or after the data units are placed into the shares, or after the share is full, for example.

The various cryptosplitting processes and data shuffling processes described herein, and all other embodiments of the cryptosplitting and data shuffling methods of the present invention may be performed on data units of any size, including but not limited to, as small as an individual bit, bits, bytes, kilobytes, megabytes or larger.

An example of one embodiment of source code that would perform the cryptosplitting process described herein is:

```
DATA [1:24] - array of bytes with the data to be split
SHARES[0:3; 1:24] - 2-dimensionalarray with each row
representing one of the shares
RANDOM[1:24] - array random numbers in the range of
0..3
S1 = 1;
S2 = 1;
S3 = 1;
S4 = 1;
For J = 1 to 24 do
Begin
IF RANDOM[J[ ==0 then
    Begin
    SHARES[1,S1] = DATA [J];
    S1 = S1 + 1;
    End
ELSE IF RANDOM[J[ ==1 then
    Begin
    SHARES[2,S2] = DATA [J];
    S2 = S2 + 1;
    END
ELSE IF RANDOM[J[ ==2 then
    Begin
    Shares[3,S3] = data [J];
    S3 = S3 + 1;
    End
Else  begin
    Shares[4,S4] = data [J];
    S4 = S4 + 1;
    End;
END;
```

An example of one embodiment of source code that would perform the cryptosplitting RAID process described herein is:

Generate two sets of numbers, PrimaryShare is 0 to 3, BackupShare is 1 to 3. Then put each data unit into share [primaryshare[1]] and share[(primaryshare[1]+backupshare[1]) mod 4, with the same process as in cryptosplitting described above. This method will be scalable to any size N, where only N−1 shares are necessary to restore the data.

The retrieval, recombining, reassembly or reconstituting of the encrypted data elements may utilize any number of authentication techniques, including, but not limited to, biometrics, such as fingerprint recognition, facial scan, hand scan, iris scan, retinal scan, ear scan, vascular pattern recognition or DNA analysis. The data splitting and/or parser modules of the present invention may be integrated into a wide variety of infrastructure products or applications as desired.

Traditional encryption technologies known in the art rely on one or more key used to encrypt the data and render it unusable without the key. The data, however, remains whole and intact and subject to attack. The secure data parser of the present invention, in one embodiment, addresses this problem by performing a cryptographic parsing and splitting of the encrypted file into two or more portions or shares, and in another embodiment, preferably four or more shares, adding another layer of encryption to each share of the data, then storing the shares in different physical and/or logical locations. When one or more data shares are physically removed from the system, either by using a removable device, such as a data storage device, or by placing the share under another party's control, any possibility of compromise of secured data is effectively removed.

Figure 21:
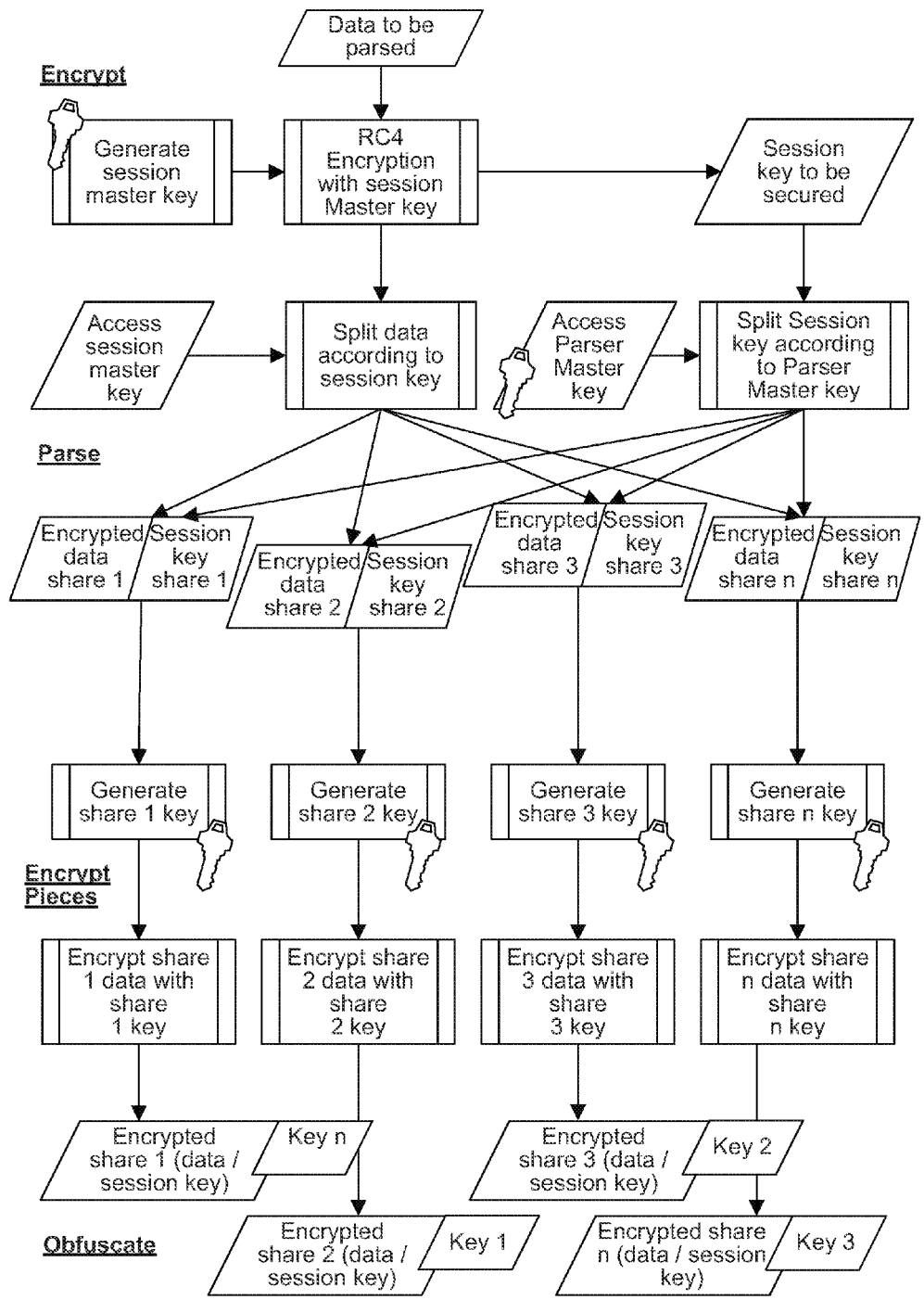
FIG. 21 illustrates a process for parsing, splitting and/or separating data with encryption and storage of the encryption master key with the data.

An example of one embodiment of the secure data parser of the present invention and an example of how it may be utilized is shown in FIG. 21 and described below. However, it is readily apparent to those of ordinary skill in the art that the secure data parser of the present invention may be utilized in a wide variety of ways in addition to the non-limiting example below. As a deployment option, and in one embodiment, the secure data parser may be implemented with external session key management or secure internal storage of session keys. Upon implementation, a Parser Master Key will be generated which will be used for securing the application and for encryption purposes. It should be also noted that the incorporation of the Parser Master key in the resulting secured data allows for a flexibility of sharing of secured data by individuals within a workgroup, enterprise or extended audience.

As shown in FIG. 21, this embodiment of the present invention shows the steps of the process performed by the secure data parser on data to store the session master key with the parsed data:

1. Generating a session master key and encrypt the data using RS1 stream cipher.
2. Separating the resulting encrypted data into four shares or portions of parsed data according to the pattern of the session master key.
3. In this embodiment of the method, the session master key will be stored along with the secured data shares in a data depository. Separating the session master key according to the pattern of the Parser Master Key and append the key data to the encrypted parsed data.
4. The resulting four shares of data will contain encrypted portions of the original data and portions of the session master key. Generate a stream cipher key for each of the four data shares.
5. Encrypting each share, then store the encryption keys in different locations from the encrypted data portions or shares: Share 1 gets Key 4, Share 2 gets Key 1, Share 3 gets Key 2, Share 4 gets Key 3.

To restore the original data format, the steps are reversed.

It is readily apparent to those of ordinary skill in the art that certain steps of the methods described herein may be performed in different order, or repeated multiple times, as desired. It is also readily apparent to those skilled in the art that the portions of the data may be handled differently from one another. For example, multiple parsing steps may be performed on only one portion of the parsed data. Each portion of parsed data may be uniquely secured in any desirable way provided only that the data may be reassembled, reconstituted, reformed, decrypted or restored to its original or other usable form.

Figure 22:
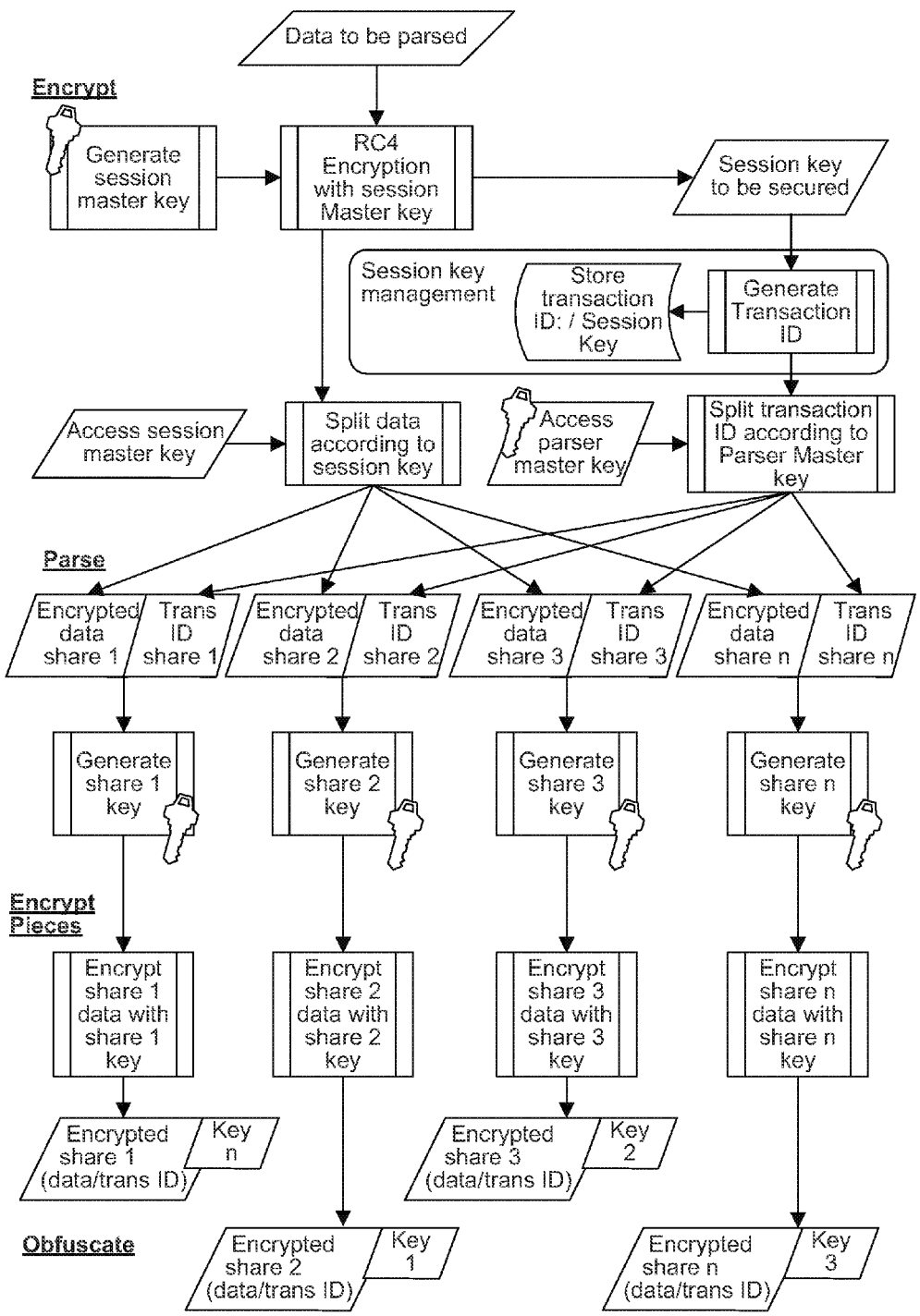
FIG. 22 illustrates a process for parsing, splitting and/or separating data with encryption and storing the encryption master key separately from the data.

As shown in FIG. 22 and described herein, another embodiment of the present invention comprises the steps of the process performed by the secure data parser on data to store the session master key data in one or more separate key management table:

1. Generating a session master key and encrypt the data using RS1 stream cipher.
2. Separating the resulting encrypted data into four shares or portions of parsed data according to the pattern of the session master key.
3. In this embodiment of the method of the present invention, the session master key will be stored in a separate key management table in a data depository. Generating a unique transaction ID for this transaction. Storing the transaction ID and session master key in a separate key management table. Separating the transaction ID according to the pattern of the Parser Master Key and append the data to the encrypted parsed or separated data.
4. The resulting four shares of data will contain encrypted portions of the original data and portions of the transaction ID.
5. Generating a stream cipher key for each of the four data shares.
6. Encrypting each share, then store the encryption keys in different locations from the encrypted data portions or shares: Share 1 gets Key 4, Share 2 gets Key 1, Share 3 gets Key 2, Share 4 gets Key 3.

To restore the original data format, the steps are reversed.

It is readily apparent to those of ordinary skill in the art that certain steps of the method described herein may be performed in different order, or repeated multiple times, as desired. It is also readily apparent to those skilled in the art that the portions of the data may be handled differently from one another. For example, multiple separating or parsing steps may be performed on only one portion of the parsed data. Each portion of parsed data may be uniquely secured in any desirable way provided only that the data may be reassembled, reconstituted, reformed, decrypted or restored to its original or other usable form.

Figure 23:
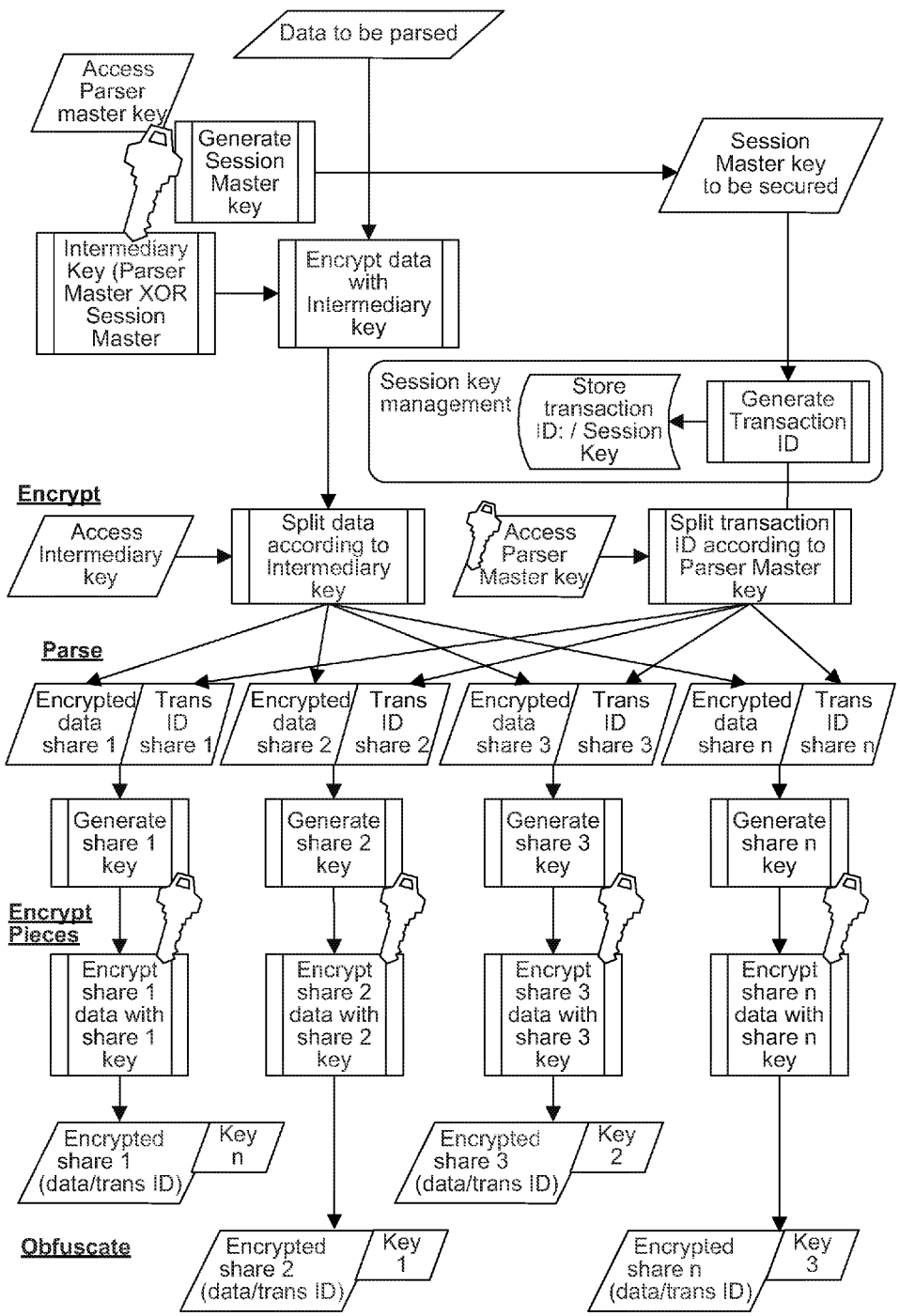
FIG. 23 illustrates the intermediary key process for parsing, splitting and/or separating data with encryption and storage of the encryption master key with the data.

As shown in FIG. 23, this embodiment of the present invention shows the steps of the process performed by the secure data parser on data to store the session master key with the parsed data:

1. Accessing the parser master key associated with the authenticated user
2. Generating a unique Session Master key
3. Derive an Intermediary Key from an exclusive OR function of the Parser Master Key and Session Master key
4. Optional encryption of the data using an existing or new encryption algorithm keyed with the Intermediary Key.
5. Separating the resulting optionally encrypted data into four shares or portions of parsed data according to the pattern of the Intermediary key.
6. In this embodiment of the method, the session master key will be stored along with the secured data shares in a data depository. Separating the session master key according to the pattern of the Parser Master Key and append the key data to the optionally encrypted parsed data shares.
7. The resulting multiple shares of data will contain optionally encrypted portions of the original data and portions of the session master key.
8. Optionally generate an encryption key for each of the four data shares.
9. Optionally encrypting each share with an existing or new encryption algorithm, then store the encryption keys in different locations from the encrypted data portions or shares: for example, Share 1 gets Key 4, Share 2 gets Key 1, Share 3 gets Key 2, Share 4 gets Key 3.

To restore the original data format, the steps are reversed.

It is readily apparent to those of ordinary skill in the art that certain steps of the methods described herein may be performed in different order, or repeated multiple times, as desired. It is also readily apparent to those skilled in the art that the portions of the data may be handled differently from one another. For example, multiple parsing steps may be performed on only one portion of the parsed data. Each portion of parsed data may be uniquely secured in any desirable way provided only that the data may be reassembled, reconstituted, reformed, decrypted or restored to its original or other usable form.

Figure 24:
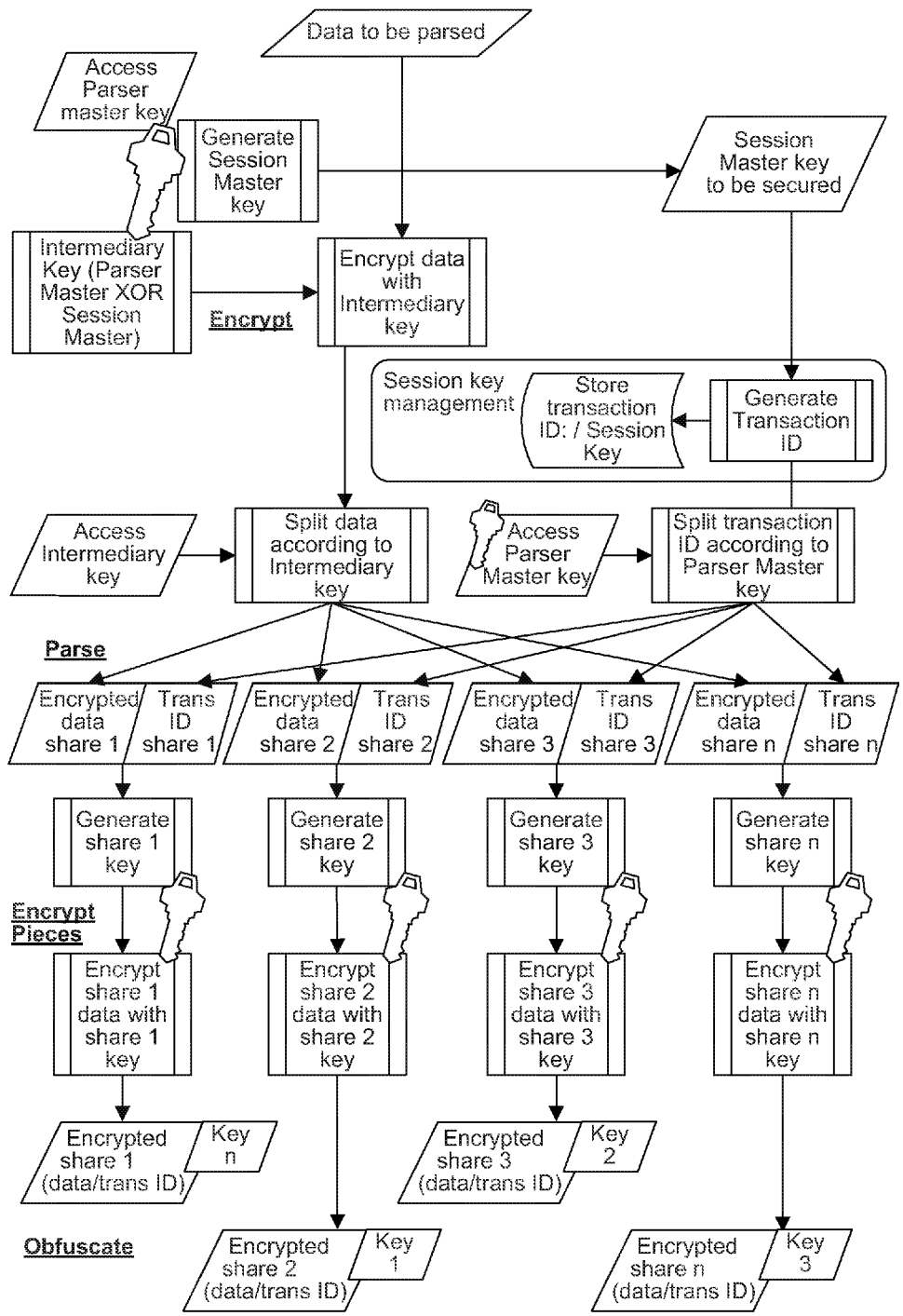
FIG. 24 illustrates the intermediary key process for parsing, splitting and/or separating data with encryption and storing the encryption master key separately from the data.

As shown in FIG. 24 and described herein, another embodiment of the present invention comprises the steps of the process performed by the secure data parser on data to store the session master key data in one or more separate key management table:

1. Accessing the Parser Master Key associated with the authenticated user
2. Generating a unique Session Master Key
3. Derive an Intermediary Key from an exclusive OR function of the Parser Master Key and Session Master key
4. Optionally encrypt the data using an existing or new encryption algorithm keyed with the Intermediary Key.
5. Separating the resulting optionally encrypted data into four shares or portions of parsed data according to the pattern of the Intermediary Key.
6. In this embodiment of the method of the present invention, the session master key will be stored in a separate key management table in a data depository. Generating a unique transaction ID for this transaction. Storing the transaction ID and session master key in a separate key management table or passing the Session Master Key and transaction ID back to the calling program for external management. Separating the transaction ID according to the pattern of the Parser Master Key and append the data to the optionally encrypted parsed or separated data.
7. The resulting four shares of data will contain optionally encrypted portions of the original data and portions of the transaction ID.
8. Optionally generate an encryption key for each of the four data shares.
9. Optionally encrypting each share, then store the encryption keys in different locations from the encrypted data portions or shares. For example: Share 1 gets Key 4, Share 2 gets Key 1, Share 3 gets Key 2, Share 4 gets Key 3.

To restore the original data format, the steps are reversed.

It is readily apparent to those of ordinary skill in the art that certain steps of the method described herein may be performed in different order, or repeated multiple times, as desired. It is also readily apparent to those skilled in the art that the portions of the data may be handled differently from one another. For example, multiple separating or parsing steps may be performed on only one portion of the parsed data. Each portion of parsed data may be uniquely secured in any desirable way provided only that the data may be reassembled, reconstituted, reformed, decrypted or restored to its original or other usable form.

A wide variety of encryption methodologies are suitable for use in the methods of the present invention, as is readily apparent to those skilled in the art. The One Time Pad algorithm, is often considered one of the most secure encryption methods, and is suitable for use in the method of the present invention. Using the One Time Pad algorithm requires that a key be generated which is as long as the data to be secured. The use of this method may be less desirable in certain circumstances such as those resulting in the generation and management of very long keys because of the size of the data set to be secured. In the One-Time Pad (OTP) algorithm, the simple exclusive-or function, XOR, is used. For two binary streams x and y of the same length, x XOR y means the bitwise exclusive-or of x and y.

At the Bit Level is Generated:
0 XOR 0=0
0 XOR 1=1
1 XOR 0=1
1 XOR 1=0

An example of this process is described herein for an n-byte secret, s, (or data set) to be split. The process will generate an n-byte random value, a, and then set:
b=a XOR s.

Note that one can derive "s" via the equation:
s=a XOR b.

The values a and b are referred to as shares or portions and are placed in separate depositories. Once the secret s is split into two or more shares, it is discarded in a secure manner.

The secure data parser of the present invention may utilize this function, performing multiple XOR functions incorporating multiple distinct secret key values: K1, K2, K3, Kn, K5. At the beginning of the operation, the data to be secured is passed through the first encryption operation, secure data=data XOR secret key 5:
S=D XOR K5

In order to securely store the resulting encrypted data in, for example, four shares, S1, S2, S3, Sn, the data is parsed and split into "n" segments, or shares, according to the value of K5. This operation results in "n" pseudorandom shares of the original encrypted data. Subsequent XOR functions may then be performed on each share with the remaining secret key values, for example: Secure data segment 1=encrypted data share 1 XOR secret key 1:
SD1=S1 XOR K1
SD2=S2 XOR K2
SD3=S3 XOR K3
SDn=Sn XOR Kn.

In one embodiment, it may not be desired to have any one depository contain enough information to decrypt the information held there, so the key required to decrypt the share is stored in a different data depository:
Depository 1: SD1, Kn
Depository 2: SD2, K1
Depository 3: SD3, K2
Depository n: SDn, K3.

Additionally, appended to each share may be the information required to retrieve the original session encryption key, K5. Therefore, in the key management example described herein, the original session master key is referenced by a transaction ID split into "n" shares according to the contents of the installation dependant Parser Master Key (TID1, TID2, TID3, TIDn):
Depository 1: SD1, Kn, TID1
Depository 2: SD2, K1, TID2
Depository 3: SD3, K2, TID3
Depository n: SDn, K3, TIDn.

In the incorporated session key example described herein, the session master key is split into "n" shares according to the contents of the installation dependant Parser Master Key (SK1, SK2, SK3, SKn):
Depository 1: SD1, Kn, SK1
Depository 2: SD2, K1, SK2
Depository 3: SD3, K2, SK3
Depository n: SDn, K3, SKn.

Unless all four shares are retrieved, the data cannot be reassembled according to this example. Even if all four shares are captured, there is no possibility of reassembling or restoring the original information without access to the session master key and the Parser Master Key.

This example has described an embodiment of the method of the present invention, and also describes, in another embodiment, the algorithm used to place shares into depositories so that shares from all depositories can be combined to form the secret authentication material. The computations needed are very simple and fast. However, with the One Time Pad (OTP) algorithm there may be circumstances that cause it to be less desirable, such as a large data set to be secured, because the key size is the same size as the data to be stored. Therefore, there would be a need to store and transmit about twice the amount of the original data which may be less desirable under certain circumstances.

Stream Cipher RS1

The stream cipher RS1 splitting technique is very similar to the OTP splitting technique described herein. Instead of an n-byte random value, an n'=min(n, 16)-byte random value is generated and used to key the RS1 Stream Cipher algorithm. The advantage of the RS1 Stream Cipher algorithm is that a pseudorandom key is generated from a much smaller seed number. The speed of execution of the RS1 Stream Cipher encryption is also rated at approximately 10 times the speed of the well known in the art Triple DES encryption without compromising security. The RS1 Stream Cipher algorithm is well known in the art, and may be used to generate the keys used in the XOR function. The RS1 Stream Cipher algorithm is interoperable with other commercially available stream cipher algorithms, such as the RC4™ stream cipher algorithm of RSA Security, Inc and is suitable for use in the methods of the present invention.

Using the key notation above, K1 thru K5 are now an n' byte random values and we set:

SD1=S1 XOR E(K1)
SD2=S2 XOR E(K2)
SD3=S3 XOR E(K3)
SDn=Sn XOR E(Kn)

where E(K1) thru E(Kn) are the first n' bytes of output from the RS1 Stream Cipher algorithm keyed by K1 thru Kn. The shares are now placed into data depositories as described herein.

In this stream cipher RS1 algorithm, the required computations needed are nearly as simple and fast as the OTP algorithm. The benefit in this example using the RS1 Stream Cipher is that the system needs to store and transmit on average only about 16 bytes more than the size of the original data to be secured per share. When the size of the original data is more than 16 bytes, this RS1 algorithm is more efficient than the OTP algorithm because it is simply shorter. It is readily apparent to those of ordinary skill in the art that a wide variety of encryption methods or algorithms are suitable for use in the present invention, including, but not limited to RS1, OTP, RC4™, Triple DES and AES.

There are major advantages provided by the data security methods and computer systems of the present invention over traditional encryption methods. One advantage is the security gained from moving shares of the data to different locations on one or more data depositories or storage devices, that may be in different logical, physical or geographical locations. When the shares of data are split physically and under the control of different personnel, for example, the possibility of compromising the data is greatly reduced.

Another advantage provided by the methods and system of the present invention is the combination of the steps of the method of the present invention for securing data to provide a comprehensive process of maintaining security of sensitive data. The data is encrypted with a secure key and split into one or more shares, and in one embodiment, four shares, according to the secure key. The secure key is stored safely with a reference pointer which is secured into four shares according to a secure key. The data shares are then encrypted individually and the keys are stored safely with different encrypted shares. When combined, the entire process for securing data according to the methods disclosed herein becomes a comprehensive package for data security.

The data secured according to the methods of the present invention is readily retrievable and restored, reconstituted, reassembled, decrypted, or otherwise returned into its original or other suitable form for use. In order to restore the original data, the following items may be utilized:

1. All shares or portions of the data set.
2. Knowledge of and ability to reproduce the process flow of the method used to secure the data.
3. Access to the session master key.
4. Access to the Parser Master Key.

Therefore, it may be desirable to plan a secure installation wherein at least one of the above elements may be physically separated from the remaining components of the system (under the control of a different system administrator for example).

Protection against a rogue application invoking the data securing methods application may be enforced by use of the Parser Master Key. A mutual authentication handshake between the secure data parser and the application may be required in this embodiment of the present invention prior to any action taken.

The security of the system dictates that there be no "backdoor" method for recreation of the original data. For installations where data recovery issues may arise, the secure data parser can be enhanced to provide a mirror of the four shares and session master key depository. Hardware options such as RAID (redundant array of inexpensive disks, used to spread information over several disks) and software options such as replication can assist as well in the data recovery planning.

Key Management

In one embodiment of the present invention, the data securing method uses three sets of keys for an encryption operation. Each set of keys may have individual key storage, retrieval, security and recovery options, based on the installation. The keys that may be used, include, but are not limited to:

The Parser Master Key

This key is an individual key associated with the installation of the secure data parser. It is installed on the server on which the secure data parser has been deployed. There are a variety of options suitable for securing this key including, but not limited to, a smart card, separate hardware key store, standard key stores, custom key stores or within a secured database table, for example.

The Session Master Key

A Session Master Key may be generated each time data is secured. The Session Master Key is used to encrypt the data prior to the parsing and splitting operations. It may also be incorporated (if the Session Master Key is not integrated into the parsed data) as a means of parsing the encrypted data. The Session Master Key may be secured in a variety of manners, including, but not limited to, a standard key store, custom key store, separate database table, or secured within the encrypted shares, for example.

The Share Encryption Keys

For each share or portions of a data set that is created, an individual Share Encryption Key may be generated to further encrypt the shares. The Share Encryption Keys may be stored in different shares than the share that was encrypted.

It is readily apparent to those of ordinary skill in the art that the data securing methods and computer system of the present invention are widely applicable to any type of data in any setting or environment. In addition to commercial applications conducted over the Internet or between customers and vendors, the data securing methods and computer systems of the present invention are highly applicable to non-commercial or private settings or environments. Any data set that is desired to be kept secure from any unauthorized user may be secured using the methods and systems described herein. For example, access to a particular database within a company or organization may be advantageously restricted to only selected users by employing the methods and systems of the present invention for securing data. Another example is the generation, modification or access to documents wherein it is desired to restrict access or prevent unauthorized or accidental access or disclosure outside a group of selected individuals, computers or workstations. These and other examples of the ways in which the methods and systems of data securing of the present invention are applicable to any non-commercial or commercial environment or setting for any setting, including, but not limited to any organization, government agency or corporation.

In another embodiment of the present invention, the data securing method uses three sets of keys for an encryption operation. Each set of keys may have individual key storage, retrieval, security and recovery options, based on the installation. The keys that may be used, include, but are not limited to:

1. The Parser Master Key

This key is an individual key associated with the installation of the secure data parser. It is installed on the server on which the secure data parser has been deployed. There are a variety of options suitable for securing this key including, but not limited to, a smart card, separate hardware key store, standard key stores, custom key stores or within a secured database table, for example.

2. The Session Master Key

A Session Master Key may be generated each time data is secured. The Session Master Key is used in conjunction with the Parser Master key to derive the Intermediary Key. The Session Master Key may be secured in a variety of manners, including, but not limited to, a standard key store, custom key store, separate database table, or secured within the encrypted shares, for example.

3. The Intermediary Key

An Intermediary Key may be generated each time data is secured. The Intermediary Key is used to encrypt the data prior to the parsing and splitting operation. It may also be incorporated as a means of parsing the encrypted data.

4. The Share Encryption Keys

For each share or portions of a data set that is created, an individual Share Encryption Key may be generated to further encrypt the shares. The Share Encryption Keys may be stored in different shares than the share that was encrypted.

It is readily apparent to those of ordinary skill in the art that the data securing methods and computer system of the present invention are widely applicable to any type of data in any setting or environment. In addition to commercial applications conducted over the Internet or between customers and vendors, the data securing methods and computer systems of the present invention are highly applicable to non-commercial or private settings or environments. Any data set that is desired to be kept secure from any unauthorized user may be secured using the methods and systems described herein. For example, access to a particular database within a company or organization may be advantageously restricted to only selected users by employing the methods and systems of the present invention for securing data. Another example is the generation, modification or access to documents wherein it is desired to restrict access or prevent unauthorized or accidental access or disclosure outside a group of selected individuals, computers or workstations. These and other examples of the ways in which the methods and systems of data securing of the present invention are applicable to any non-commercial or commercial environment or setting for any setting, including, but not limited to any organization, government agency or corporation.

Workgroup, Project, Individual PC/Laptop or Cross Platform Data Security

The data securing methods and computer systems of the present invention are also useful in securing data by workgroup, project, individual PC/Laptop and any other platform that is in use in, for example, businesses, offices, government agencies, or any setting in which sensitive data is created, handled or stored. The present invention provides methods and computer systems to secure data that is known to be sought after by organizations, such as the U.S. Government, for implementation across the entire government organization or between governments at a state or federal level.

The data securing methods and computer systems of the present invention provide the ability to not only parse and split flat files but also data fields, sets and or table of any type. Additionally, all forms of data are capable of being secured under this process, including, but not limited to, text, video, images, biometrics and voice data. Scalability, speed and data throughput of the methods of securing data of the present invention are only limited to the hardware the user has at their disposal.

In one embodiment of the present invention, the data securing methods are utilized as described below in a workgroup environment. In one embodiment, as shown in FIG. 23 and described below, the Workgroup Scale data securing method of the present invention uses the private key management functionality of the TrustEngine to store the user/group relationships and the associated private keys (Parser Group Master Keys) necessary for a group of users to share secure data. The method of the present invention has the capability to secure data for an enterprise, workgroup, or individual user, depending on how the Parser Master Key was deployed.

In one embodiment, additional key management and user/group management programs may be provided, enabling wide scale workgroup implementation with a single point of administration and key management. Key generation, management and revocation are handled by the single maintenance program, which all become especially important as the number of users increase. In another embodiment, key management may also be set up across one or several different system administrators, which may not allow any one person or group to control data as needed. This allows for the management of secured data to be obtained by roles, responsibilities, membership, rights, etc., as defined by an organization, and the access to secured data can be limited to just those who are permitted or required to have access only to the portion they are working on, while others, such as managers or executives, may have access to all of the secured data. This embodiment allows for the sharing of secured data among different groups within a company or organization while at the same time only allowing certain selected individuals, such as those with the authorized and predetermined roles and responsibilities, to observe the data as a whole. In addition, this embodiment of the methods and systems of the present invention also allows for the sharing of data among, for example, separate companies, or separate departments or divisions of companies, or any separate organization departments, groups, agencies, or offices, or the like, of any government or organization or any kind, where some sharing is required, but not any one party may be permitted to have access to all the data. Particularly apparent examples of the need and utility for such a method and system of the present invention are to allow sharing, but maintain security, in between government areas, agencies and offices, and between different divisions, departments or offices of a large company, or any other organization, for example.

An example of the applicability of the methods of the present invention on a smaller scale is as follows. A Parser Master key is used as a serialization or branding of the secure data parser to an organization. As the scale of use of the Parser Master key is reduced from the whole enterprise to a smaller workgroup, the data securing methods described herein are used to share files within groups of users.

Figure 25:
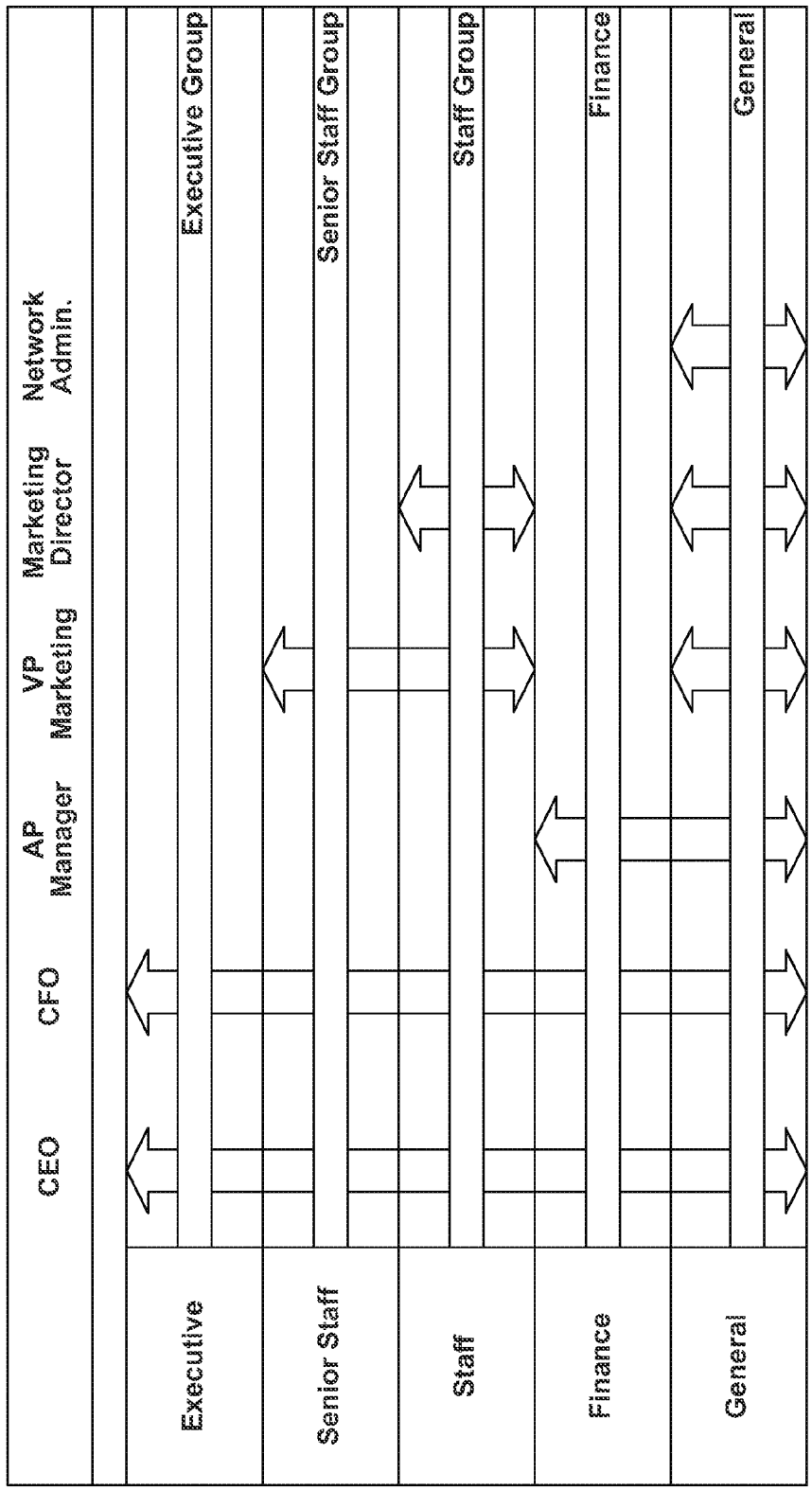
FIG. 25 illustrates utilization of the cryptographic methods and systems of the present invention with a small working group.

In the example shown in FIG. 25 and described below, there are six users defined along with their title or role within the organization. The side bar represents five possible groups that the users can belong to according to their role. The arrow represents membership by the user in one or more of the groups.

When configuring the secure data parser for use in this example, the system administrator accesses the user and group information from the operating system by a maintenance program. This maintenance program generates and assigns Parser Group Master Keys to users based on their membership in groups.

In this example, there are three members in the Senior Staff group. For this group, the actions would be:

1. Access Parser Group Master Key for the Senior Staff group (generate a key if not available);
2. Generate a digital certificate associating CEO with the Senior Staff group;
3. Generate a digital certificate associating CFO with the Senior Staff group;
4. Generate a digital certificate associating Vice President, Marketing with the Senior Staff group.

The same set of actions would be done for each group, and each member within each group. When the maintenance program is complete, the Parser Group Master Key becomes a shared credential for each member of the group. Revocation of the assigned digital certificate may be done automatically when a user is removed from a group through the maintenance program without affecting the remaining members of the group.

Once the shared credentials have been defined, the parsing and splitting process remains the same. When a file, document or data element is to be secured, the user is prompted for the target group to be used when securing the data. The resulting secured data is only accessible by other members of the target group. This functionality of the methods and systems of the present invention may be used with any other computer system or software platform, any may be, for example, integrated into existing application programs or used standalone for file security.

It is readily apparent to those of ordinary skill in the art that any one or combination of encryption algorithms are suitable for use in the methods and systems of the present invention. For example, the encryption steps may, in one embodiment, be repeated to produce a multi-layered encryption scheme. In addition, a different encryption algorithm, or combination of encryption algorithms, may be used in repeat encryption steps such that different encryption algorithms are applied to the different layers of the multi-layered encryption scheme. As such, the encryption scheme itself may become a component of the methods of the present invention for securing sensitive data from unauthorized use or access.

The secure data parser may include as an internal component, as an external component, or as both an error-checking component. For example, in one suitable approach, as portions of data are created using the secure data parser in accordance with the present invention, to assure the integrity of the data within a portion, a hash value is taken at preset intervals within the portion and is appended to the end of the interval. The hash value is a predictable and reproducible numeric representation of the data. If any bit within the data changes, the hash value would be different. A scanning module (either as a stand-alone component external to the secure data parser or as an internal component) may then scan the portions of data generated by the secure data parser. Each portion of data (or alternatively, less than all portions of data according to some interval or by a random or pseudo-random sampling) is compared to the appended hash value or values and an action may be taken. This action may include a report of values that match and do not match, an alert for values that do not match, or invoking of some external or internal program to trigger a recovery of the data. For example, recovery of the data could be performed by invoking a recovery module based on the concept that fewer than all portions may be needed to generate original data in accordance with the present invention.

Any other suitable integrity checking may be implemented using any suitable integrity information appended anywhere in all or a subset of data portions. Integrity information may include any suitable information that can be used to determine the integrity of data portions. Examples of integrity information may include hash values computed based on any suitable parameter (e.g., based on respective data portions), digital signature information, message authentication code (MAC) information, any other suitable information, or any combination thereof.

The secure data parser of the present invention may be used in any suitable application. Namely, the secure data parser described herein has a variety of applications in different areas of computing and technology. Several such areas are discussed below. It will be understood that these are merely illustrative in nature and that any other suitable applications may make use of the secure data parser. It will further be understood that the examples described are merely illustrative embodiments that may be modified in any suitable way in order to satisfy any suitable desires. For example, parsing and splitting may be based on any suitable units, such as by bits, by bytes, by kilobytes, by megabytes, by any combination thereof, or by any other suitable unit.

Figure 26:
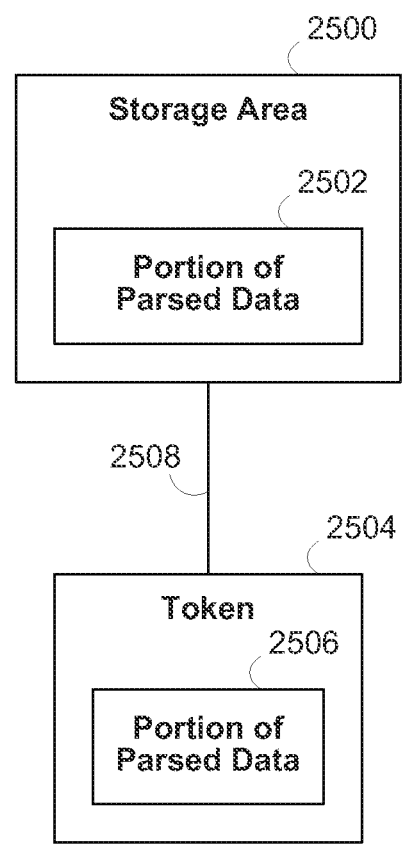
FIG. 26 is a block diagram of an illustrative physical token security system employing the secure data parser in accordance with one embodiment of the present invention.

The secure data parser of the present invention may be used to implement secure physical tokens, whereby data stored in a physical token may be required in order to access additional data stored in another storage area. In one suitable approach, a physical token, such as a compact USB flash drive, a floppy disk, an optical disk, a smart card, or any other suitable physical token, may be used to store one of at least two portions of parsed data in accordance with the present invention. In order to access the original data, the USB flash drive would need to be accessed. Thus, a personal computer holding one portion of parsed data would need to have the USB flash drive, having the other portion of parsed data, attached before the original data can be accessed. FIG. 26 illustrates this application. Storage area 2500 includes a portion of parsed data 2502. Physical token 2504, having a portion of parsed data 2506 would need to be coupled to storage area 2500 using any suitable communications interface 2508 (e.g., USB, serial, parallel, Bluetooth, IR, IEEE 1394, ethernet, or any other suitable communications interface) in order to access the original data. This is useful in a situation where, for example, sensitive data on a computer is left alone and subject to unauthorized access attempts. By removing the physical token (e.g., the USB flash drive), the sensitive data is inaccessible. It will be understood that any other suitable approach for using physical tokens may be used.

The secure data parser of the present invention may be used to implement a secure authentication system whereby user enrollment data (e.g., passwords, private encryption keys, fingerprint templates, biometric data or any other suitable user enrollment data) is parsed and split using the secure data parser. The user enrollment data may be parsed and split whereby one or more portions are stored on a smart card, a government Common Access Card, any suitable physical storage device (e.g., magnetic or optical disk, USB key drive, etc.), or any other suitable device. One or more other portions of the parsed user enrollment data may be stored in the system performing the authentication. This provides an added level of security to the authentication process (e.g., in addition to the biometric authentication information obtained from the biometric source, the user enrollment data must also be obtained via the appropriate parsed and split data portion).

Figure 27:
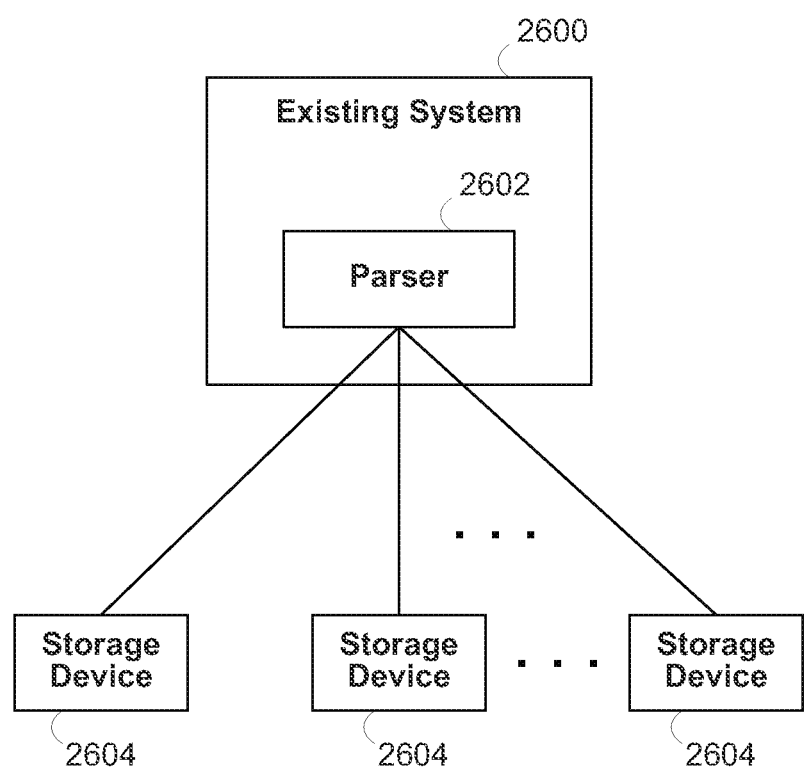
FIG. 27 is a block diagram of an illustrative arrangement in which the secure data parser is integrated into a system in accordance with one embodiment of the present invention.

The secure data parser of the present invention may be integrated into any suitable existing system in order to provide the use of its functionality in each system's respective environment. FIG. 27 shows a block diagram of an illustrative system 2600, which may include software, hardware, or both for implementing any suitable application. System 2600 may be an existing system in which secure data parser 2602 may be retrofitted as an integrated component. Alternatively, secure data parser 2602 may be integrated into any suitable system 2600 from, for example, its earliest design stage. Secure data parser 2600 may be integrated at any suitable level of system 2600. For example, secure data parser 2602 may be integrated into system 2600 at a sufficiently back-end level such that the presence of secure data parser 2602 may be substantially transparent to an end user of system 2600. Secure data parser 2602 may be used for parsing and splitting data among one or more storage devices 2604 in accordance with the present invention. Some illustrative examples of systems having the secure data parser integrated therein are discussed below.

The secure data parser of the present invention may be integrated into an operating system kernel (e.g., Linux, Unix, or any other suitable commercial or proprietary operating system). This integration may be used to protect data at the device level whereby, for example, data that would ordinarily be stored in one or more devices is separated into a certain number of portions by the secure data parser integrated into the operating system and stored among the one or more devices. When original data is attempted to be accessed, the appropriate software, also integrated into the operating system, may recombine the parsed data portions into the original data in a way that may be transparent to the end user.

The secure data parser of the present invention may be integrated into a volume manager or any other suitable component of a storage system to protect local and networked data storage across any or all supported platforms. For example, with the secure data parser integrated, a storage system may make use of the redundancy offered by the secure data parser (i.e., which is used to implement the feature of needing fewer than all separated portions of data in order to reconstruct the original data) to protect against data loss. The secure data parser also allows all data written to storage devices, whether using redundancy or not, to be in the form of multiple portions that are generated according to the parsing of the present invention. When original data is attempted to be accessed, the appropriate software, also integrated into the volume manager or other suitable component of the storage system, may recombine the parsed data portions into the original data in a way that may be transparent to the end user.

In one suitable approach, the secure data parser of the present invention may be integrated into a RAID controller (as either hardware or software). This allows for the secure storage of data to multiple drives while maintaining fault tolerance in case of drive failure.

The secure data parser of the present invention may be integrated into a database in order to, for example, protect sensitive table information. For example, in one suitable approach, data associated with particular cells of a database table (e.g., individual cells, one or more particular columns, one or more particular rows, any combination thereof, or an entire database table) may be parsed and separated according to the present invention (e.g., where the different portions are stored on one or more storage devices at one or more locations or on a single storage device). Access to recombine the portions in order to view the original data may be granted by traditional authentication methods (e.g., username and password query).

The secure parser of the present invention may be integrated in any suitable system that involves data in motion (i.e., transfer of data from one location to another). Such systems include, for example, email, streaming data broadcasts, and wireless (e.g., WiFi) communications. With respect to email, in one suitable approach, the secure parser may be used to parse outgoing messages (i.e., containing text, binary data, or both (e.g., files attached to an email message)) and sending the different portions of the parsed data along different paths thus creating multiple streams of data. If any one of these streams of data is compromised, the original message remains secure because the system may require that more than one of the portions be combined, in accordance with the present invention, in order to generate the original data. In another suitable approach, the different portions of data may be communicated along one path sequentially so that if one portion is obtained, it may not be sufficient to generate the original data. The different portions arrive at the intended recipient's location and may be combined to generate the original data in accordance with the present invention.

Figure 28:
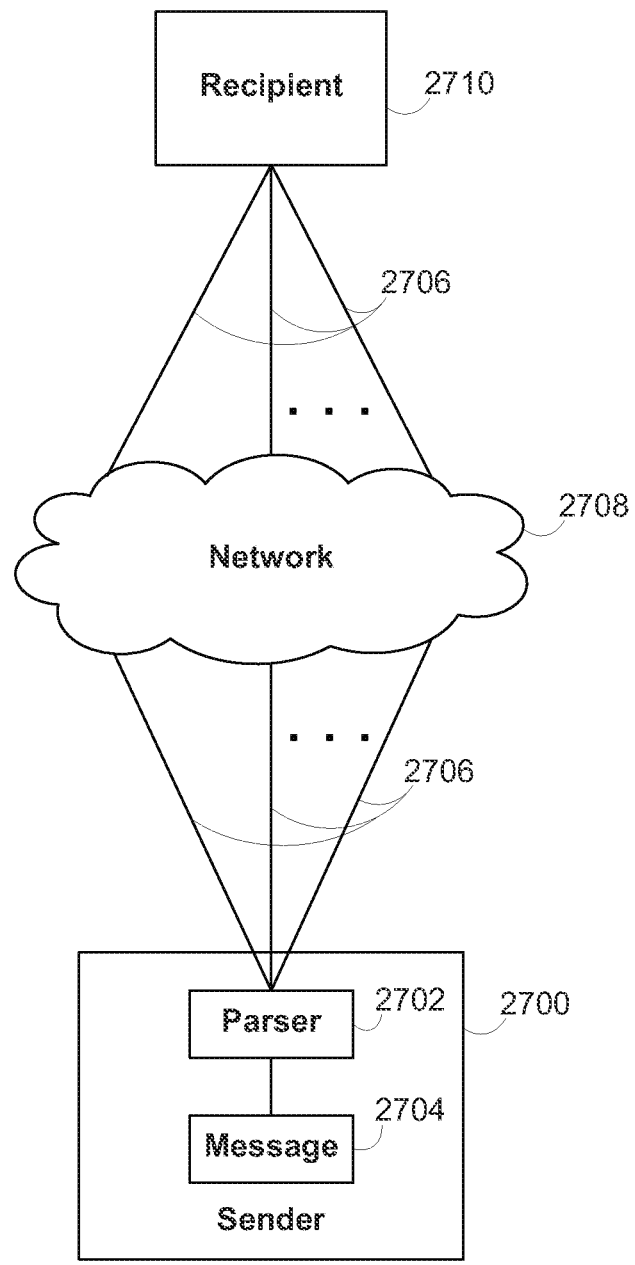
FIG. 28 is a block diagram of an illustrative data in motion system in accordance with one embodiment of the present invention.

FIGS. 27 and 28 are illustrative block diagrams of such email systems. FIG. 28 shows a sender system 2700, which may include any suitable hardware, such as a computer terminal, personal computer, handheld device (e.g., PDA, Blackberry), cellular telephone, computer network, any other suitable hardware, or any combination thereof. Sender system 2700 is used to generate and/or store a message 2704, which may be, for example, an email message, a binary data file (e.g., graphics, voice, video, etc.), or both. Message 2704 is parsed and split by secure data parser 2702 in accordance with the present invention. The resultant data portions may be communicated across one or more separate communications paths 2706 over network 2708 (e.g., the Internet, an intranet, a LAN, WiFi, Bluetooth, any other suitable hard-wired or wireless communications means, or any combination thereof) to recipient system 2710. The data portions may be communicated parallel in time or alternatively, according to any suitable time delay between the communication of the different data portions. Recipient system 2710 may be any suitable hardware as described above with respect to sender system 2700. The separate data portions carried along communications paths 2706 are recombined at recipient system 2710 to generate the original message or data in accordance with the present invention.

FIG. 28 shows a sender system 2800, which may include any suitable hardware, such as a computer terminal, personal computer, handheld device (e.g., PDA), cellular telephone, computer network, any other suitable hardware, or any combination thereof. Sender system 2800 is used to generate and/or store a message 2804, which may be, for example, an email message, a binary data file (e.g., graphics, voice, video, etc.), or both. Message 2804 is parsed and split by secure data parser 2802 in accordance with the present invention. The resultant data portions may be communicated across a single communications paths 2806 over network 2808 (e.g., the Internet, an intranet, a LAN, WiFi, Bluetooth, any other suitable communications means, or any combination thereof) to recipient system 2810. The data portions may be communicated serially across communications path 2806 with respect to one another. Recipient system 2810 may be any suitable hardware as described above with respect to sender system 2800. The separate data portions carried along communications path 2806 are recombined at recipient system 2810 to generate the original message or data in accordance with the present invention.

Figure 29:
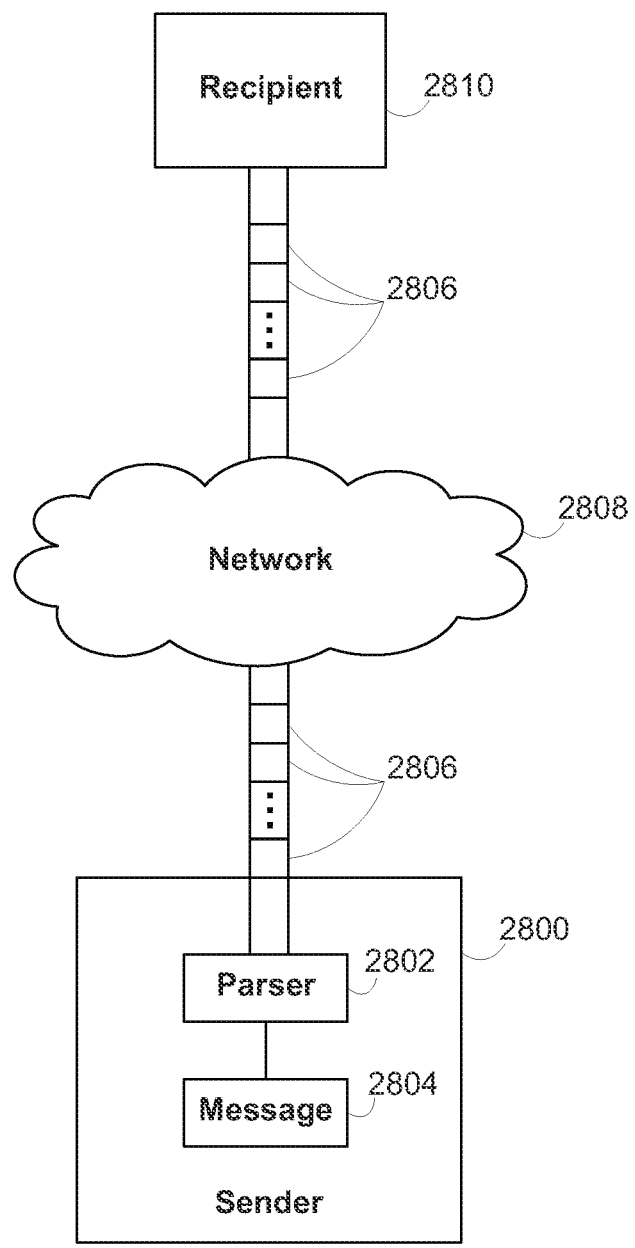
FIG. 29 is a block diagram of another illustrative data in motion system in accordance with one embodiment of the present invention.

It will be understood that the arrangement of FIGS. 27 and 28 are merely illustrative. Any other suitable arrangement may be used. For example, in another suitable approach, the systems of FIGS. 27 and 28 may be incorporated whereby the multi-path approach of FIG. 28 is used and in which one or more of communications paths 2706 are used to carry more than one portion of data as communications path 2806 does in the context of FIG. 29. In general The secure data parser may be integrated at any suitable level of a data-in motion system. For example, in the context of an email system, the secure parser may be integrated at the user-interface level (e.g., into Microsoft® Outlook) in which case, the user may have control over the use of the secure data parser features when using email. Alternatively, the secure parser may be implemented in a back-end component such as at the exchange server, in which case, messages may be automatically parsed, split, and communicated along different paths in accordance with the present invention without any user intervention.

Similarly, in the case of streaming broadcasts of data (e.g., audio, video), the outgoing data may be parsed and separated into multiple streams each containing a portion of the parsed data. The multiple streams may be transmitted along one or more paths and recombined at the recipient's location in accordance with the present invention. One of the benefits of this approach is that it avoids the relatively large overhead associated with traditional encryption of data followed by transmission of the encrypted data over a single communications channel. The secure parser of the present invention allows data in motion to be sent in multiple parallel streams, increasing speed and efficiency.

It will be understand that the secure data parser may be integrated for protection of and fault tolerance of any type of data in motion through any transport medium, including, for example, wired, wireless, or physical. For example, voice over Internet protocol (VoIP) applications may make use of the secure data parser of the present invention. Wireless or wired data transport from or to any suitable personal digital assistant (PDA) devices such as Blackberries and SmartPhones may be secured using the secure data parser of the present invention. Communications using wireless 802.11 protocols for peer to peer and hub based wireless networks, satellite communications, point to point wireless communications, Internet client/server communications, or any other suitable communications may involve the data in motion capabilities of the secure data parser in accordance with the present invention. Data communication between computer peripheral device (e.g., printer, scanner, monitor, keyboard, network router, biometric authentication device (e.g., fingerprint scanner), or any other suitable peripheral device) between a computer and a computer peripheral device, between a computer peripheral device and any other suitable device, or any combination thereof may make use of the data in motion features of the present invention.

The data in motion features of the present invention may also apply to physical transportation of secure shares using for example, separate routes, vehicles, methods, any other suitable physical transportation, or any combination thereof. For example, physical transportation of data may take place on digital/magnetic tapes, floppy disks, optical disks, physical tokens, USB drives, removable hard drives, consumer electronic devices with flash memory (e.g., Apple IPODs or other MP3 players), flash memory, any other suitable medium used for transporting data, or any combination thereof.

The secure data parser of the present invention may provide security with the ability for disaster recovery. According to the present invention, fewer than all portions of the separated data generated by the secure data parser may be necessary in order to retrieve the original data. That is, out of m portions stored, n may be the minimum number of these m portions necessary to retrieve the original data, where n<=m. For example, if each of four portions is stored in a different physical location relative to the other three portions, then, if n=2 in this example, two of the locations may be compromised whereby data is destroyed or inaccessible, and the original data may still be retrieved from the portions in the other two locations. Any suitable value for n or m may be used.

In addition, the n of m feature of the present invention may be used to create a "two man rule" whereby in order to avoid entrusting a single individual or any other entity with full access to what may be sensitive data, two or more distinct entities, each with a portion of the separated data parsed by the secure parser of the present invention may need to agree to put their portions together in order to retrieve the original data.

The secure data parser of the present invention may be used to provide a group of entities with a group-wide key that allows the group members to access particular information authorized to be accessed by that particular group. The group key may be one of the data portions generated by the secure parser in accordance with the present invention that may be required to be combined with another portion centrally stored, for example in order to retrieve the information sought. This feature allows for, for example, secure collaboration among a group. It may be applied in for example, dedicated networks, virtual private networks, intranets, or any other suitable network.

Specific applications of this use of the secure parser include, for example, coalition information sharing in which, for example, multi-national friendly government forces are given the capability to communicate operational and otherwise sensitive data on a security level authorized to each respective country over a single network or a dual network (i.e., as compared to the many networks involving relatively substantial manual processes currently used). This capability is also applicable for companies or other organizations in which information needed to be known by one or more specific individuals (within the organization or without) may be communicated over a single network without the need to worry about unauthorized individuals viewing the information.

Another specific application includes a multi-level security hierarchy for government systems. That is, the secure parser of the present invention may provide for the ability to operate a government system at different levels of classified information (e.g., unclassified, classified, secret, top secret) using a single network. If desired, more networks may be used (e.g., a separate network for top secret), but the present invention allows for substantially fewer than current arrangement in which a separate network is used for each level of classification.

It will be understood that any combination of the above described applications of the secure parser of the present invention may be used. For example, the group key application can be used together with the data in motion security application (i.e., whereby data that is communicated over a network can only be accessed by a member of the respective group and where, while the data is in motion, it is split among multiple paths (or sent in sequential portions) in accordance with the present invention).

The secure data parser of the present invention may be integrated into any middleware application to enable applications to securely store data to different database products or to different devices without modification to either the applications or the database. Middleware is a general term for any product that allows two separate and already existing programs to communicate. For example, in one suitable approach, middleware having the secure data parser integrated, may be used to allow programs written for a particular database to communicate with other databases without custom coding.

The secure data parser of the present invention may be implemented having any combination of any suitable capabilities, such as those discussed herein. In some embodiments of the present invention, for example, the secure data parser may be implemented having only certain capabilities whereas other capabilities may be obtained through the use of external software, hardware, or both interfaced either directly or indirectly with the secure data parser.

Figure 30:
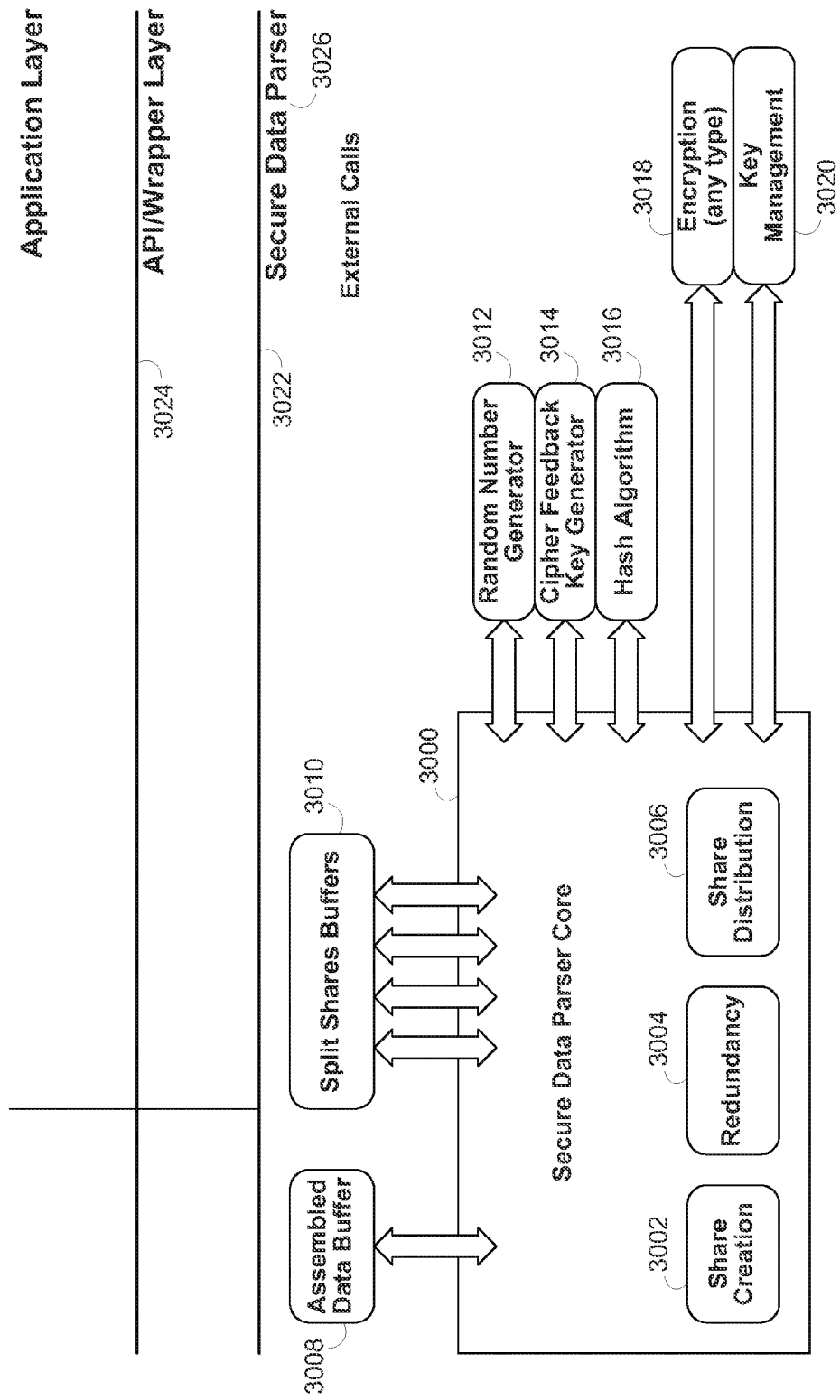
FIG. 30-32 are block diagrams of an illustrative system having the secure data parser integrated in accordance with one embodiment of the present invention.

FIG. 30, for example, shows an illustrative implementation of the secure data parser as secure data parser 3000. Secure data parser 3000 is implemented with very few built-in capabilities. As illustrated, secure data parser 3000 may include built-in capabilities for parsing and splitting data into portions (also referred to herein as shares) of data using module 3002 in accordance with the present invention. Secure data parser 3000 may also include built in capabilities for performing redundancy in order to be able to implement, for example, the m of n feature described above (i.e., recreating the original data using fewer than all shares of parsed and split data) using module 3004. Secure data parser 3000 may also include share distribution capabilities using module 3006 for placing the shares of data into buffers from which they are sent for communication to a remote location, for storage, etc. in accordance with the present invention. It will be understood that any other suitable capabilities may be built into secure data parser 3000.

Assembled data buffer 3008 may be any suitable memory used to store the original data (although not necessarily in its original form) that will be parsed and split by secure data parser 3000. In a splitting operation, assembled data buffer 3008 provides input to secure data parser 3008. In a restore operation, assembled data buffer 3008 may be used to store the output of secure data parser 3000.

Split shares buffers 3010 may be one or more memory modules that may be used to store the multiple shares of data that resulted from the parsing and splitting of original data. In a splitting operation, split shares buffers 3010 hold the output of the secure data parser. In a restore operation, split shares buffers hold the input to secure data parser 3000.

It will be understood that any other suitable arrangement of capabilities may be built-in for secure data parser 3000. Any additional features may be built-in and any of the features illustrated may be removed, made more robust, made less robust, or may otherwise be modified in any suitable way. Buffers 3008 and 3010 are likewise merely illustrative and may be modified, removed, or added to in any suitable way.

Any suitable modules implemented in software, hardware or both may be called by or may call to secure data parser 3000. If desired, even capabilities that are built into secure data parser 3000 may be replaced by one or more external modules. As illustrated, some external modules include random number generator 3012, cipher feedback key generator 3014, hash algorithm 3016, any one or more types of encryption 3018, and key management 3020. It will be understood that these are merely illustrative external modules. Any other suitable modules may be used in addition to or in place of those illustrated.

Cipher feedback key generator 3014 may, externally to secure data parser 3000, generate for each secure data parser operation, a unique key, or random number (using for example random number generator 3012), to be used as a seed value for an operation that extends an original session key size (e.g., a value of 128, 256, 512, or 1024 bits) into a value equal to the length of the data to be parsed and split. Any suitable algorithm may be used for the cipher feedback key generation, including, for example, the AES cipher feedback key generation algorithm.

In order to facilitate integration of secure data parser 3000 and its external modules (i.e., secure data parser layer 3026) into an application layer 3024 (e.g., email application, database application, etc.), a wrapping layer that may make use of, for example, API function calls may be used. Any other suitable arrangement for facilitating integration of secure data parser layer 3026 into application layer 3024 may be used.

Figure 31:
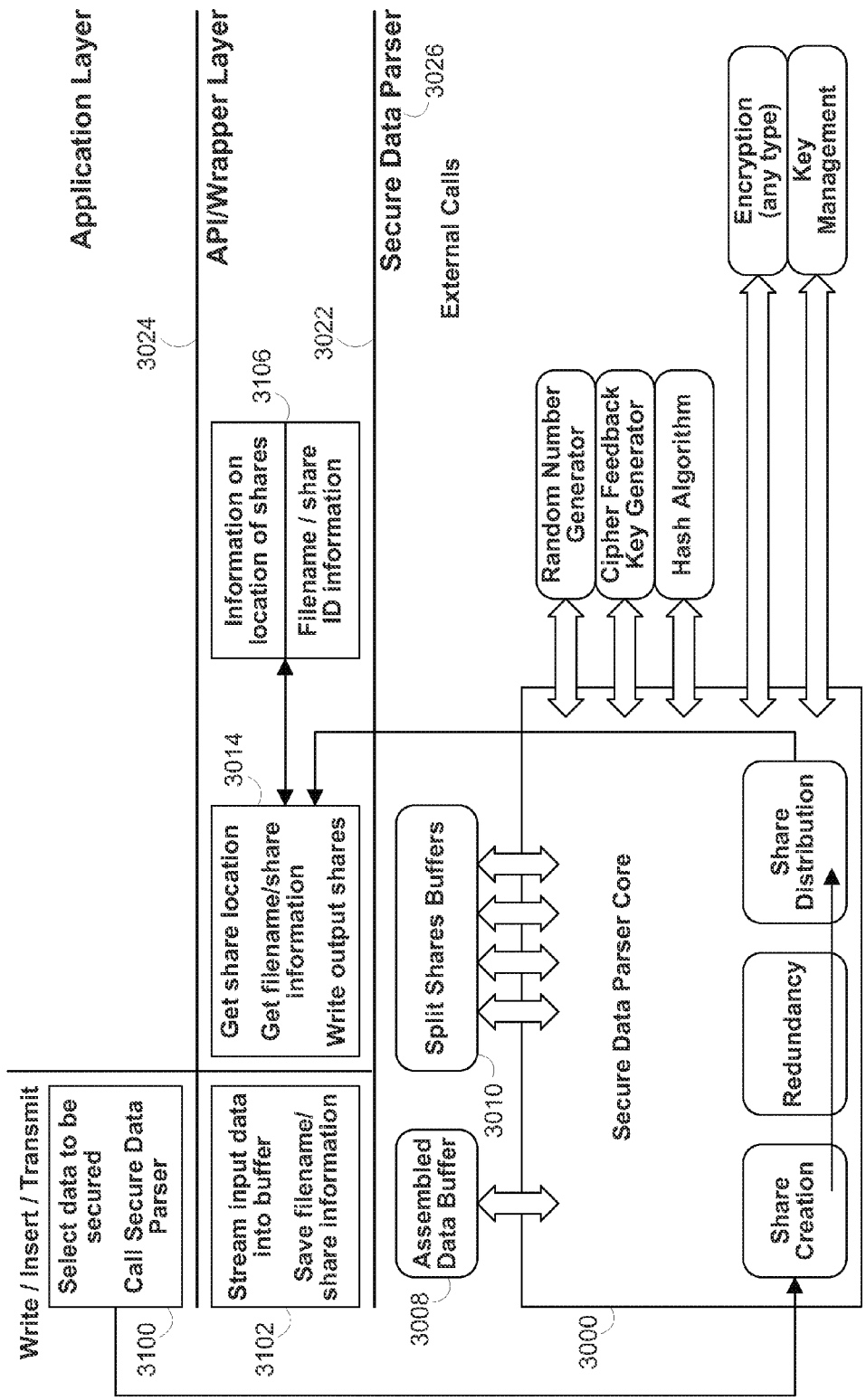

FIG. 31 illustratively shows how the arrangement of FIG. 30 may be used when a write (e.g., to a storage device), insert (e.g., in a database field), or transmit (e.g., across a network) command is issued in application layer 3024. At step 3100 data to be secured is identified and a call is made to the secure data parser. The call is passed through wrapper layer 3022 where at step 3102, wrapper layer 3022 streams the input data identified at step 3100 into assembled data buffer 3008. Also at step 3102, any suitable share information, filenames, any other suitable information, or any combination thereof may be stored (e.g., as information 3106 at wrapper layer 3022). Secure data processor 3000 then parses and splits the data it takes as input from assembled data buffer 3008 in accordance with the present invention. It outputs the data shares into split shares buffers 3010. At step 3104, wrapper layer 3022 obtains from stored information 3106 any suitable share information (i.e., stored by wrapper 3022 at step 3102) and share location(s) (e.g., from one or more configuration files). Wrapper layer 3022 then writes the output shares (obtained from split shares buffers 3010) appropriately (e.g., written to one or more storage devices, communicated onto a network, etc.).

Figure 32:
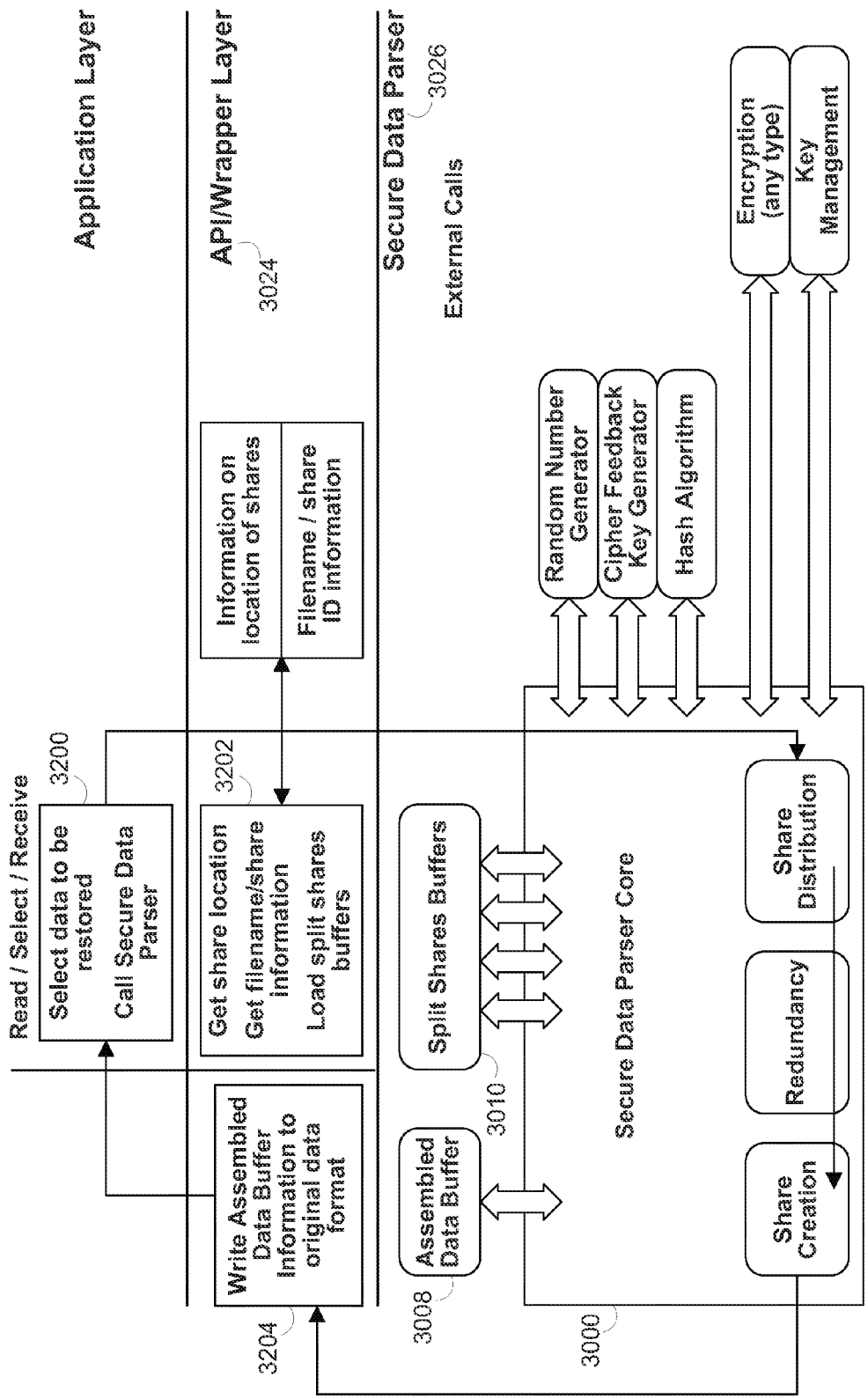

FIG. 32 illustratively shows how the arrangement of FIG. 30 may be used when a read (e.g., from a storage device), select (e.g., from a database field), or receive (e.g., from a network) occurs. At step 3200, data to be restored is identified and a call to secure data parser 3000 is made from application layer 3024. At step 3202, from wrapper layer 3022, any suitable share information is obtained and share location is determined. Wrapper layer 3022 loads the portions of data identified at step 3200 into split shares buffers 3010. Secure data parser 3000 then processes these shares in accordance with the present invention (e.g., if only three of four shares are available, then the redundancy capabilities of secure data parser 3000 may be used to restore the original data using only the three shares). The restored data is then stored in assembled data buffer 3008. At step 3204, application layer 3022 converts the data stored in assembled data buffer 3008 into its original data format (if necessary) and provides the original data in its original format to application layer 3024.

It will be understood that the parsing and splitting of original data illustrated in FIG. 31 and the restoring of portions of data into original data illustrated in FIG. 32 is merely illustrative. Any other suitable processes, components, or both may be used in addition to or in place of those illustrated.

Figure 33:
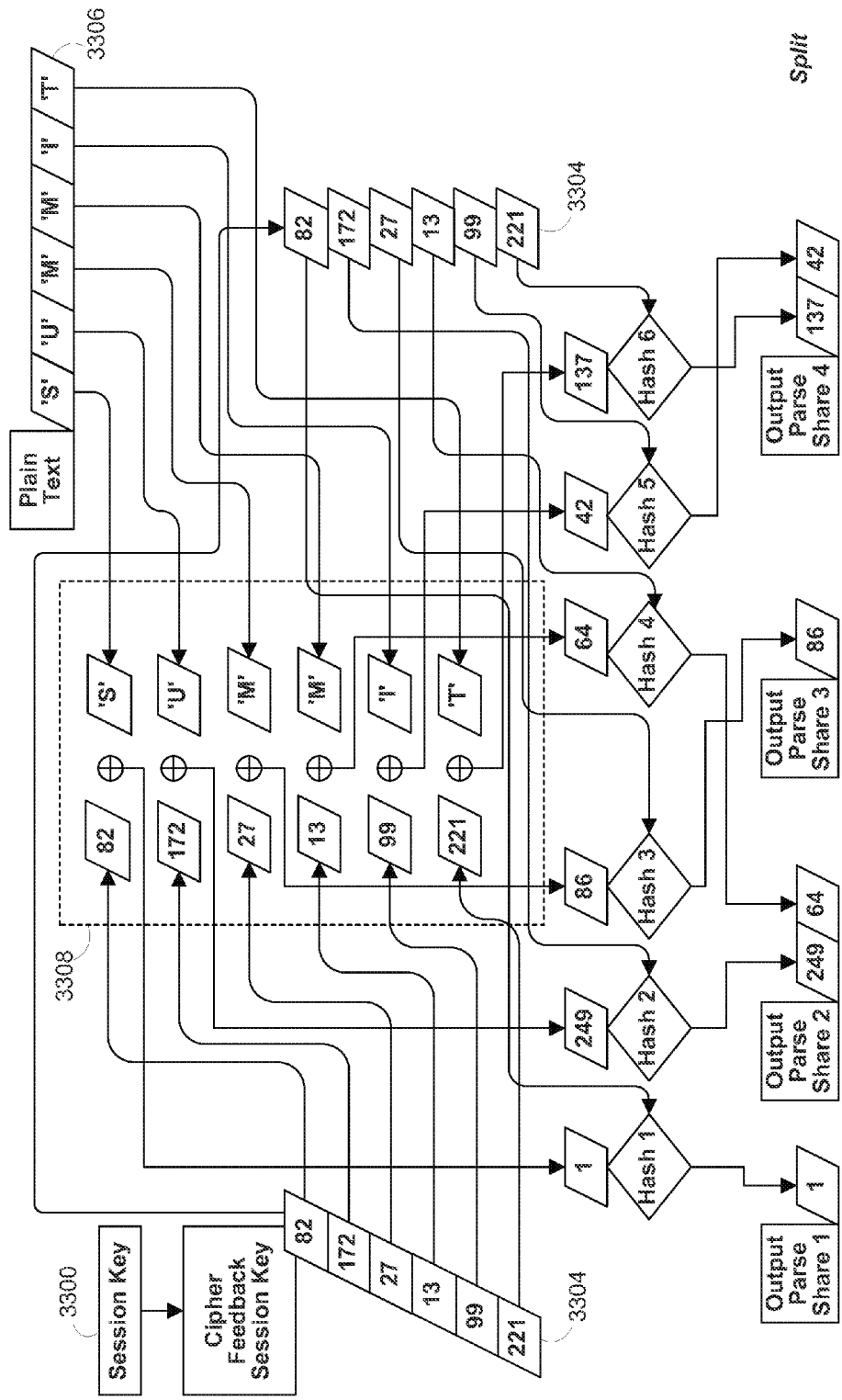
FIG. 33 is a process flow diagram of an illustrative process for parsing and splitting data in accordance with one embodiment of the present invention.

FIG. 33 is a block diagram of an illustrative process flow for parsing and splitting original data into two or more portions of data in accordance with one embodiment of the present invention. As illustrated, the original data desired to be parsed and split is plain text 3306 (i.e., the word "SUMMIT" is used as an example). It will be understood that any other type of data may be parsed and split in accordance with the present invention. A session key 3300 is generated. If the length of session key 3300 is not compatible with the length of original data 3306, then cipher feedback session key 3304 may be generated.

In one suitable approach, original data 3306 may be encrypted prior to parsing, splitting, or both. For example, as FIG. 33 illustrates, original data 3306 may be XORed with any suitable value (e.g., with cipher feedback session key 3304, or with any other suitable value). It will be understood that any other suitable encryption technique may be used in place of or in addition to the XOR technique illustrate. It will further be understood that although FIG. 33 is illustrated in terms of byte by byte operations, the operation may take place at the bit level or at any other suitable level. It will further be understood that, if desired, there need not be any encryption whatsoever of original data 3306.

The resultant encrypted data (or original data if no encryption took place) is then hashed to determine how to split the encrypted (or original) data among the output buckets (e.g., of which there are four in the illustrated example). In the illustrated example, the hashing takes place by bytes and is a function of cipher feedback session key 3304. It will be understood that this is merely illustrative. The hashing may be performed at the bit level, if desired. The hashing may be a function of any other suitable value besides cipher feedback session key 3304. In another suitable approach, hashing need not be used. Rather, any other suitable technique for splitting data may be employed.

Figure 34:
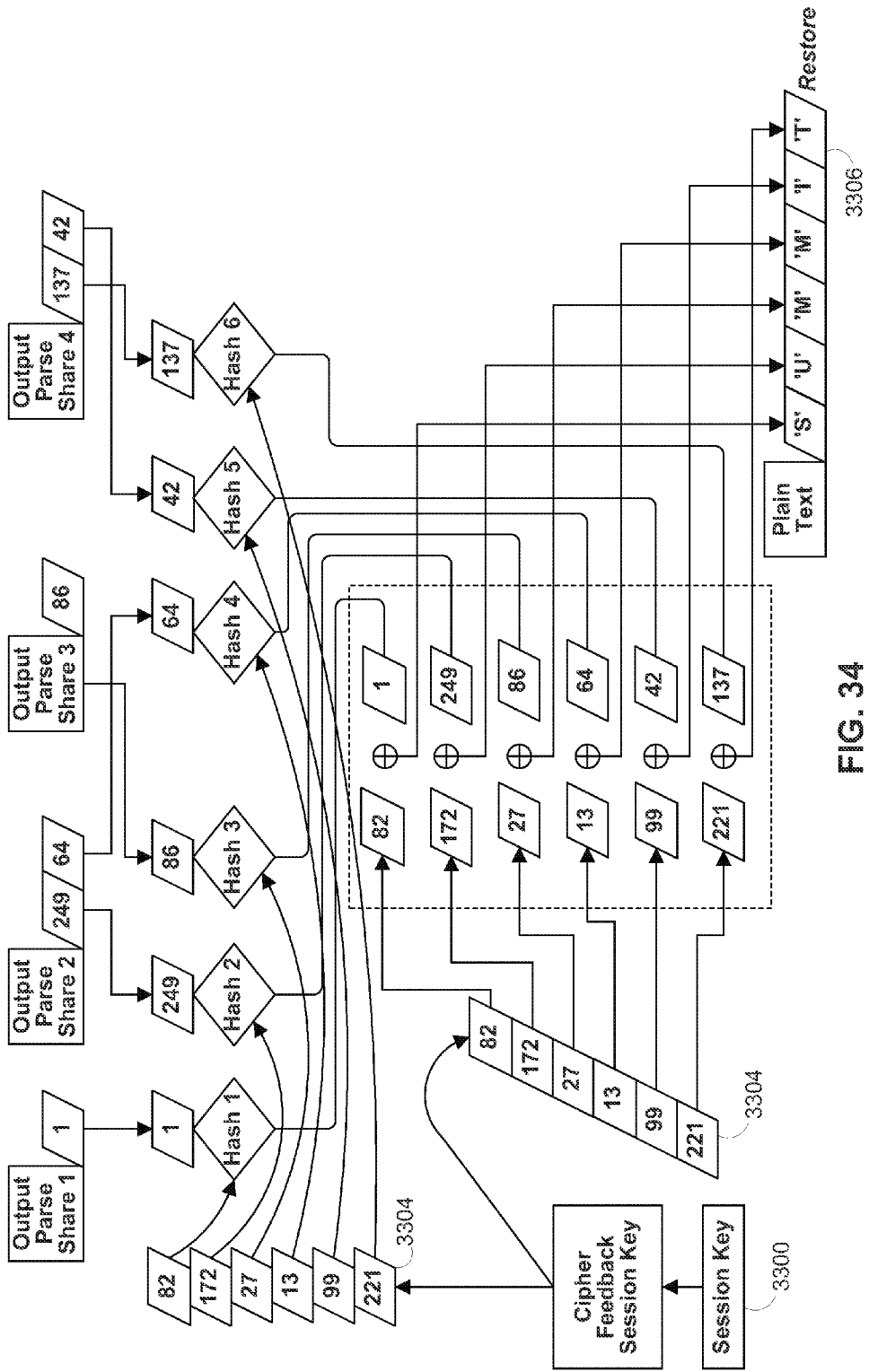
FIG. 34 is a process flow diagram of an illustrative process for restoring portions of data into original data in accordance with one embodiment of the present invention.

FIG. 34 is a block diagram of an illustrative process flow for restoring original data 3306 from two or more parsed and split portions of original data 3306 in accordance with one embodiment of the present invention. The process involves hashing the portions in reverse (i.e., to the process of FIG. 33) as a function of cipher feedback session key 3304 to restore the encrypted original data (or original data if there was no encryption prior to the parsing and splitting). The encryption key may then be used to restore the original data (i.e., in the illustrated example, cipher feedback session key 3304 is used to decrypt the XOR encryption by XORing it with the encrypted data). This the restores original data 3306.

Figure 35:
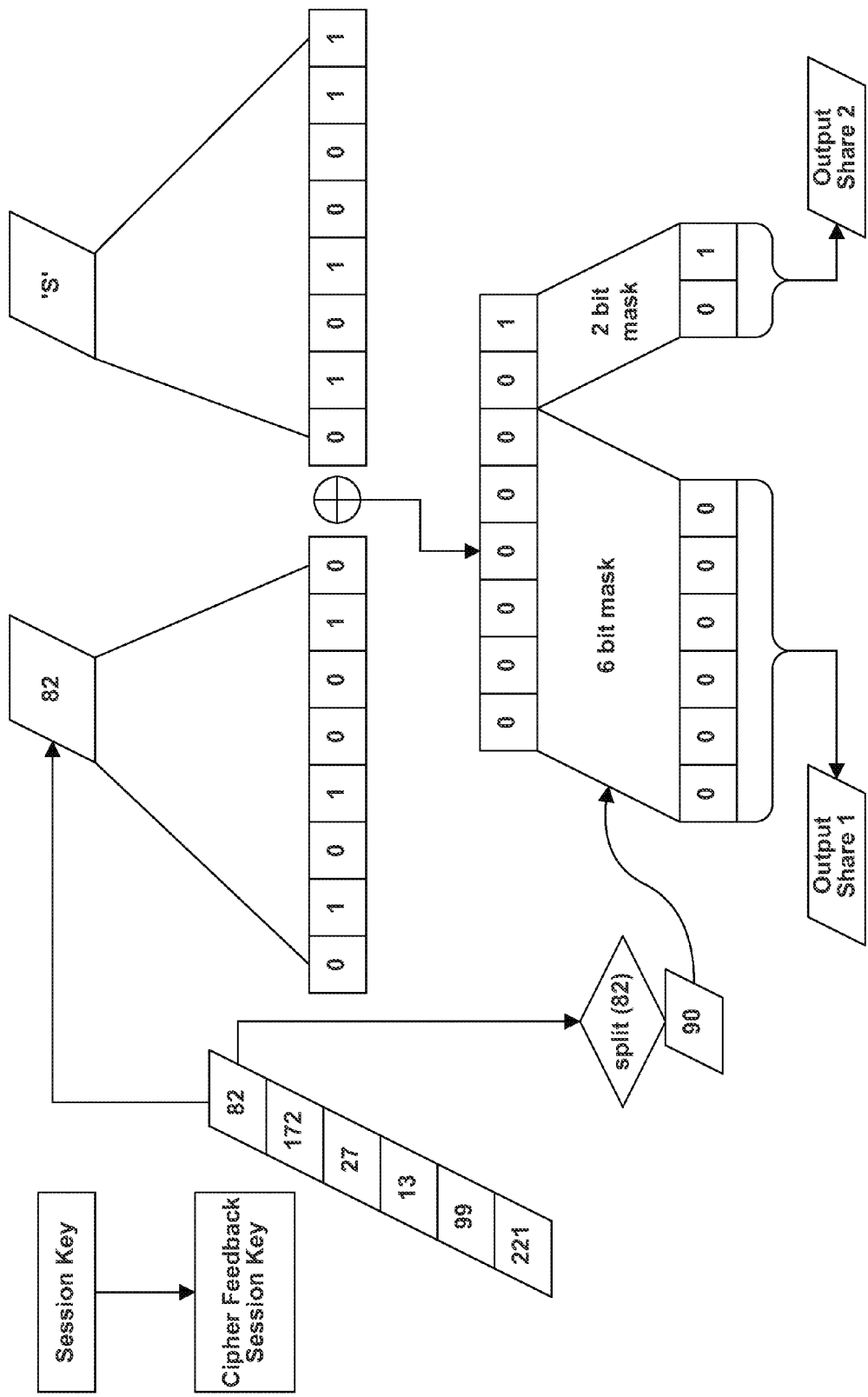
FIG. 35 is a process flow diagram of an illustrative process for splitting data at the bit level in accordance with one embodiment of the present invention.

FIG. 35 shows how bit-splitting may be implemented in the example of FIGS. 33 and 34. A hash may be used (e.g., as a function of the cipher feedback session key, as a function of any other suitable value) to determine a bit value at which to split each byte of data. It will be understood that this is merely one illustrative way in which to implement splitting at the bit level. Any other suitable technique may be used.

It will be understood that any reference to hash functionality made herein may be made with respect to any suitable hash algorithm. These include for example, MD5 and SHA-1. Different hash algorithms may be used at different times and by different components of the present invention.

After a split point has been determined in accordance with the above illustrative procedure or through any other procedure or algorithm, a determination may be made with regard to which data portions to append each of the left and right segments. Any suitable algorithm may be used for making this determination. For example, in one suitable approach, a table of all possible distributions (e.g., in the form of pairings of destinations for the left segment and for the right segment) may be created, whereby a destination share value for each of the left and right segment may be determined by using any suitable hash function on corresponding data in the session key, cipher feedback session key, or any other suitable random or pseudo-random value, which may be generated and extended to the size of the original data. For example, a hash function of a corresponding byte in the random or pseudo-random value may be made. The output of the hash function is used to determine which pairing of destinations (i.e., one for the left segment and one for the right segment) to select from the table of all the destination combinations. Based on this result, each segment of the split data unit is appended to the respective two shares indicated by the table value selected as a result of the hash function.

Redundancy information may be appended to the data portions in accordance with the present invention to allow for the restoration of the original data using fewer than all the data portions. For example, if two out of four portions are desired to be sufficient for restoration of data, then additional data from the shares may be accordingly appended to each share in, for example, a round-robin manner (e.g., where the size of the original data is 4 MB, then share 1 gets its own shares as well as those of shares 2 and 3; share 2 gets its own share as well as those of shares 3 and 4; share 3 gets its own share as well as those of shares 4 and 1; and share 4 gets its own shares as well as those of shares 1 and 2). Any such suitable redundancy may be used in accordance with the present invention.

It will be understood that any other suitable parsing and splitting approach may be used to generate portions of data from an original data set in accordance with the present invention. For example, parsing and splitting may be randomly or pseudo-randomly processed on a bit by bit basis. A random or pseudo-random value may be used (e.g., session key, cipher feedback session key, etc.) whereby for each bit in the original data, the result of a hash function on corresponding data in the random or pseudo-random value may indicate to which share to append the respective bit. In one suitable approach the random or pseudo-random value may be generated as, or extended to, 8 times the size of the original data so that the hash function may be performed on a corresponding byte of the random or pseudo-random value with respect to each bit of the original data. Any other suitable algorithm for parsing and splitting data on a bit by bit level may be used in accordance with the present invention. It will further be appreciated that redundancy data may be appended to the data shares such as, for example, in the manner described immediately above in accordance with the present invention.

In one suitable approach, parsing and splitting need not be random or pseudo-random. Rather, any suitable deterministic algorithm for parsing and splitting data may be used. For example, breaking up the original data into sequential shares may be employed as a parsing and splitting algorithm. Another example is to parse and split the original data bit by bit, appending each respective bit to the data shares sequentially in a round-robin manner. It will further be appreciated that redundancy data may be appended to the data shares such as, for example, in the manner described above in accordance with the present invention.

In one embodiment of the present invention, after the secure data parser generates a number of portions of original data, in order to restore the original data, certain one or more of the generated portions may be mandatory. For example, if one of the portions is used as an authentication share (e.g., saved on a physical token device), and if the fault tolerance feature of the secure data parser is being used (i.e., where fewer than all portions are necessary to restore the original data), then even though the secure data parser may have access to a sufficient number of portions of the original data in order to restore the original data, it may require the authentication share stored on the physical token device before it restores the original data. It will be understood that any number and types of particular shares may be required based on, for example, application, type of data, user, any other suitable factors, or any combination thereof.

In one suitable approach, the secure data parser or some external component to the secure data parser may encrypt one or more portions of the original data. The encrypted portions may be required to be provided and decrypted in order to restore the original data. The different encrypted portions may be encrypted with different encryption keys. For example, this feature may be used to implement a more secure "two man rule" whereby a first user would need to have a particular share encrypted using a first encryption and a second user would need to have a particular share encrypted using a second encryption key. In order to access the original data, both users would need to have their respective encryption keys and provide their respective portions of the original data. In one suitable approach, a public key may be used to encrypt one or more data portions that may be a mandatory share required to restore the original data. A private key may then be used to decrypt the share in order to be used to restore to the original data.

Any such suitable paradigm may be used that makes use of mandatory shares where fewer than all shares are needed to restore original data.

In one suitable embodiment of the present invention, distribution of data into a finite number of shares of data may be processed randomly or pseudo-randomly such that from a statistical perspective, the probability that any particular share of data receives a particular unit of data is equal to the probability that any one of the remaining shares will receive the unit of data. As a result, each share of data will have an approximately equal amount of data bits.

According to another embodiment of the present invention, each of the finite number of shares of data need not have an equal probability of receiving units of data from the parsing and splitting of the original data. Rather certain one or more shares may have a higher or lower probability than the remaining shares. As a result, certain shares may be larger or smaller in terms of bit size relative to other shares. For example, in a two-share scenario, one share may have a 1% probability of receiving a unit of data whereas the second share has a 99% probability. It should follow, therefore that once the data units have been distributed by the secure data parser among the two share, the first share should have approximately 1% of the data and the second share 99%. Any suitable probabilities may be used in accordance with the present invention.

It will be understood that the secure data parser may be programmed to distribute data to shares according to an exact (or near exact) percentage as well. For example, the secure data parser may be programmed to distribute 80% of data to a first share and the remaining 20% of data to a second share.

According to another embodiment of the present invention, the secure data parser may generate data shares, one or more of which have predefined sizes. For example, the secure data parser may split original data into data portions where one of the portions is exactly 256 bits. In one suitable approach, if it is not possible to generate a data portion having the requisite size, then the secure data parser may pad the portion to make it the correct size. Any suitable size may be used.

In one suitable approach, the size of a data portion may be the size of an encryption key, a splitting key, any other suitable key, or any other suitable data element.

As previously discussed, the secure data parser may use keys in the parsing and splitting of data. For purposes of clarity and brevity, these keys shall be referred to herein as "splitting keys." For example, the Session Master Key, previously introduced, is one type of splitting key. Also, as previously discussed, splitting keys may be secured within shares of data generated by the secure data parser. Any suitable algorithms for securing splitting keys may be used to secure them among the shares of data. For example, the Shamir algorithm may be used to secure the splitting keys whereby information that may be used to reconstruct a splitting key is generated and appended to the shares of data. Any other such suitable algorithm may be used in accordance with the present invention.

Similarly, any suitable encryption keys may be secured within one or more shares of data according to any suitable algorithm such as the Shamir algorithm. For example, encryption keys used to encrypt a data set prior to parsing and splitting, encryption keys used to encrypt a data portions after parsing and splitting, or both may be secured using, for example, the Shamir algorithm or any other suitable algorithm.

According to one embodiment of the present invention, an All or Nothing Transform (AoNT), such as a Full Package Transform, may be used to further secure data by transforming splitting keys, encryption keys, any other suitable data elements, or any combination thereof. For example, an encryption key used to encrypt a data set prior to parsing and splitting in accordance with the present invention may be transformed by an AoNT algorithm. The transformed encryption key may then be distributed among the data shares according to, for example, the Shamir algorithm or any other suitable algorithm. In order to reconstruct the encryption key, the encrypted data set must be restored (e.g., not necessarily using all the data shares if redundancy was used in accordance with the present invention) in order to access the necessary information regarding the transformation in accordance with AoNTs as is well known by one skilled in the art. When the original encryption key is retrieved, it may be used to decrypt the encrypted data set to retrieve the original data set. It will be understood that the fault tolerance features of the present invention may be used in conjunction with the AoNT feature. Namely, redundancy data may be included in the data portions such that fewer than all data portions are necessary to restore the encrypted data set.

It will be understood that the AoNT may be applied to encryption keys used to encrypt the data portions following parsing and splitting either in place of or in addition to the encryption and AoNT of the respective encryption key corresponding to the data set prior to parsing and splitting. Likewise, AoNT may be applied to splitting keys.

In one embodiment of the present invention, encryption keys, splitting keys, or both as used in accordance with the present invention may be further encrypted using, for example, a workgroup key in order to provide an extra level of security to a secured data set.

In one embodiment of the present invention, an audit module may be provided that tracks whenever the secure data parser is invoked to parse and/or split data.

Additionally, other combinations, additions, substitutions and modifications will be apparent to the skilled artisan in view of the disclosure herein. Accordingly, the present invention is not intended to be limited by the reaction of the preferred embodiments but is to be defined by a reference to the appended claims.

What is claimed is:

1. A method for securing a data set, the method comprising:
   determining a number of data portions into which to distribute the data set;
   distributing, using a hardware processor, substantially equal shares of data from the data set into each of the data portions according to a splitting key, such that at least one of the data portions contains a different number of shares than a remainder of the data portions;
   appending redundancy data to each of the data portions;
   storing each of the data portions separately; and
   restoring the data set from a subset of the data portions.

2. The method of claim 1 wherein distributing substantially equal shares of data from the data set comprises distributing the data set, one bit at a time, into each of the data portions, respectively, in a round-robin manner until all bits of the data set have been distributed.

3. The method of claim 1 wherein the redundancy data comprises data from one or more of the other data portions.

4. The method of claim 1 wherein restoring the data set requires at least a minimum number that is less than all of the data portions.

5. The method of claim 1 wherein at least one data portion is required in order to restore the data set.

6. The method of claim 5 wherein the at least one data portion comprises an authentication key.

7. The method of claim 5 wherein the at least one data portion is stored on a physical token device.

8. The method of claim 1 wherein the at least one data portion is encrypted with a workgroup key.

9. The method of claim 1 further comprising encrypting the data portions using at least one encryption key.

10. The method of claim 9 wherein the encryption key is a public key, and wherein the data portions may be decrypted using a private key.

11. The method of claim 9 wherein at least one of the data portions is encrypted with a first encryption key and at least one other data portion is encrypted using a second encryption key.

12. The method of claim 9 wherein restoring the data set comprises restoring an encrypted data set from a subset of the encrypted data portions and decrypting the encrypted data set.

13. A system for securing a data set, the system comprising:
   a hardware processor configured to:
      determine a number of data portions into which to distribute the data set;
      distribute substantially equal shares of data from the data set into each of the data portions according to a splitting key such that at least one of the data portions contains a different number of shares than a remainder of the data portions;
      append redundancy data to each of the data portions;
      restore the data set from a subset of the data portions; and
   two or more memories configured to store each of the data portions separately.

14. The system of claim 13 wherein distributing substantially equal shares of data from the data set comprises distributing the data set, one bit at a time, into each of the data portions, respectively, in a round-robin manner until all bits of the data set have been distributed.

15. The system of claim 13 wherein the redundancy data comprises data from one or more of the other data portions.

16. The system of claim 13 wherein restoring the data set requires at least a minimum number that is less than all of data portions.

17. The system of claim 13 wherein at least one data portion is required in order to restore the data set.

18. The system of claim 17 wherein the at least one data portion comprises an authentication key.

19. The system of claim 17 wherein the at least one data portion is stored on a physical token device.

20. The system of claim 17 wherein the at least one data portion is encrypted with a workgroup key.

21. The system of claim 13 wherein the processor is further configured to encrypt the data portions using at least one encryption key.

22. The system of claim 21 wherein the encryption key is a public key, and wherein the data portions may be decrypted using a private key.

23. The system of claim 21 wherein at least one of the data portions is encrypted with a first encryption key and at least one other data portion is encrypted using a second encryption key.

24. The system of claim 21 wherein restoring the data set comprises restoring an encrypted data set from a subset of the encrypted data portions and decrypting the encrypted data set.

* * * * *